United States Patent
Gross et al.

(10) Patent No.: US 12,435,375 B2
(45) Date of Patent: *Oct. 7, 2025

(54) METHYLATION MARKERS AND TARGETED METHYLATION PROBE PANEL

(71) Applicant: GRAIL, Inc., Menlo Park, CA (US)

(72) Inventors: Samuel S. Gross, Menlo Park, CA (US); Hamed Amini, Menlo Park, CA (US); Arash Jamshidi, Menlo Park, CA (US); Seyedmehdi Shojaee, Menlo Park, CA (US); Srinka Ghosh, Menlo Park, CA (US); Rongsu Qi, Menlo Park, CA (US); M. Cyrus Maher, Menlo Park, CA (US); Alexander P. Fields, Menlo Park, CA (US); Oliver Claude Venn, Menlo Park, CA (US)

(73) Assignee: GRAIL, Inc., Menlo Park, CA (US)

(*) Notice: Subject to any disclaimer, the term of this patent is extended or adjusted under 35 U.S.C. 154(b) by 507 days.

This patent is subject to a terminal disclaimer.

(21) Appl. No.: 17/061,013

(22) Filed: Oct. 1, 2020

(65) Prior Publication Data

US 2021/0017609 A1 Jan. 21, 2021

Related U.S. Application Data

(63) Continuation of application No. PCT/US2019/025358, filed on Apr. 2, 2019.

(60) Provisional application No. 62/651,643, filed on Apr. 2, 2018, provisional application No. 62/738,271, filed on Sep. 28, 2018.

(51) Int. Cl.
  *C12Q 1/68* (2018.01)
  *C12Q 1/6886* (2018.01)
  *C12Q 1/70* (2006.01)
  *C40B 40/06* (2006.01)

(52) U.S. Cl.
  CPC ............ *C12Q 1/6886* (2013.01); *C12Q 1/70* (2013.01); *C40B 40/06* (2013.01); *C12Q 2600/154* (2013.01)

(58) Field of Classification Search
  None
  See application file for complete search history.

(56) References Cited

U.S. PATENT DOCUMENTS

| | | | |
|---|---|---|---|
| 6,773,897 B2 | 8/2004 | Herman et al. |
| 6,773,987 B1 | 8/2004 | Rahim et al. |
| 7,041,455 B2 | 5/2006 | Magness et al. |
| 7,371,526 B2 | 5/2008 | Zon et al. |
| 7,413,855 B2 | 8/2008 | Bergmann et al. |
| 7,655,399 B2 | 2/2010 | Cantor et al. |
| 7,700,282 B2 | 4/2010 | Tetzner et al. |
| 7,700,324 B1 | 4/2010 | Issa et al. |
| 7,749,702 B2 | 7/2010 | Lofton-Day et al. |
| 7,785,798 B2 | 8/2010 | Cantor et al. |
| 7,899,626 B2 | 3/2011 | Kruglyak et al. |
| 8,076,063 B2 | 12/2011 | Fan |
| 8,133,986 B2 | 3/2012 | Issa et al. |
| 8,137,937 B2 | 3/2012 | Markert-Hahn |
| 8,143,001 B2 | 3/2012 | Kurn et al. |
| 8,150,626 B2 | 4/2012 | Fan et al. |
| 8,318,433 B2 | 11/2012 | Brenner |
| 8,318,460 B2 | 11/2012 | Cantor et al. |
| 8,415,100 B2 | 4/2013 | Markowitz |
| 8,455,190 B2 | 6/2013 | Makrigiorgos |
| 8,481,292 B2 | 7/2013 | Casbon et al. |
| 8,486,634 B2 | 7/2013 | Lim et al. |
| 8,541,207 B2 | 9/2013 | Kester |
| 8,586,310 B2 | 11/2013 | Mitra et al. |
| 8,673,555 B2 | 3/2014 | Taylor et al. |
| 8,728,764 B2 | 5/2014 | Boutell |
| 8,741,567 B2 | 6/2014 | He et al. |
| 8,771,939 B2 | 7/2014 | Tetzner et al. |
| 8,822,155 B2 | 9/2014 | Sukumar et al. |
| 8,865,410 B2 | 10/2014 | Shendure et al. |
| 8,880,350 B2 | 11/2014 | Von Hoff et al. |
| 8,900,829 B2 | 12/2014 | Distler |
| 8,927,209 B2 | 1/2015 | Hamamoto et al. |
| 9,040,239 B1 | 5/2015 | Zheng et al. |
| 9,115,386 B2 | 8/2015 | Rao et al. |
| 9,121,061 B2 | 9/2015 | Vaisvila et al. |
| 9,121,069 B2 | 9/2015 | Lo et al. |
| 9,128,086 B2 | 9/2015 | Bawden et al. |
| 9,183,349 B2 | 11/2015 | Kupershmidt et al. |
| 9,200,260 B2 | 12/2015 | Correa, Jr. et al. |
| 9,222,937 B2 | 12/2015 | Micallef |
| 9,260,745 B2 | 2/2016 | Rava et al. |

(Continued)

FOREIGN PATENT DOCUMENTS

| CA | 3008623 A1 | 6/2017 |
|---|---|---|
| EP | 1309728 A2 | 5/2003 |

(Continued)

OTHER PUBLICATIONS clinicaltrials.gov [retrieved on Jun. 1, 2021]. Retrieved from the Internet: <URL: www.clinicaltrials.gov/ct2/show/study/NCT02889978#armgroup>.*
Cheuk et al., Detection of Methylated Circulating DNA as Noninvasive Biomarkers for Breast Cancer Diagnosis. J. Breast Cancer 2017; 20(1): 12-17.
Laird. Early Detection: The power and the promise of DNA methylation markers. Nat Rev Cancer 3:253-266 (2003).
Warton et al., Methylation of cell-free circulating DNA in the diagnosis of cancer. Frontiers in Mol. Bio. 2015; vol. 2, Art. 13.
AACRmeeting abstract in Apr. 2017, Liu et al., "Identify tissue-of-origin incancer cfDNA by whole genome sequencing" Abstract 5689/13.

(Continued)

*Primary Examiner* — Jehanne S Sitton
(74) *Attorney, Agent, or Firm* — Greenberg Traurig, LLP

(57) ABSTRACT

The present description provides a cancer assay panel for targeted detection of cancer-specific methylation patterns. Further provided herein includes methods of designing, making, and using the cancer assay panel for diagnosis of cancer.

26 Claims, 21 Drawing Sheets

(56) References Cited

U.S. PATENT DOCUMENTS

| | | | |
|---|---|---|---|
| 9,267,117 B2 | 2/2016 | Guan et al. | |
| 9,290,803 B2 | 3/2016 | Laird et al. | |
| 9,290,807 B2 | 3/2016 | Booth et al. | |
| 9,292,660 B2 | 3/2016 | Von Hoff et al. | |
| 9,315,853 B2 | 4/2016 | Domanico et al. | |
| 9,371,566 B2 | 6/2016 | Lo et al. | |
| 9,394,332 B2 | 7/2016 | Markert-Hahn et al. | |
| 9,400,276 B2 | 7/2016 | Micallef | |
| 9,447,452 B2 | 9/2016 | Rao et al. | |
| 9,464,277 B2 | 10/2016 | Zheng et al. | |
| 9,476,095 B2 | 10/2016 | Vogelstein et al. | |
| 9,580,754 B2 | 2/2017 | Markowitz | |
| 9,598,731 B2 | 3/2017 | Talasaz | |
| 9,670,530 B2 | 6/2017 | Kostem et al. | |
| 9,702,002 B2 | 7/2017 | Boutell | |
| 9,702,004 B2 | 7/2017 | Van Eijk et al. | |
| 9,732,390 B2 | 8/2017 | Lo et al. | |
| 9,745,614 B2 | 8/2017 | Schroeder | |
| 9,745,627 B2 | 8/2017 | Van Eijk et al. | |
| 9,752,188 B2 | 9/2017 | Schmitt et al. | |
| 9,816,986 B2 | 11/2017 | Rao et al. | |
| 9,834,822 B2 | 12/2017 | Talasaz | |
| 9,840,743 B2 | 12/2017 | Talasaz | |
| 9,850,523 B1 | 12/2017 | Chudova et al. | |
| 9,862,995 B2 | 1/2018 | Patel | |
| 9,868,756 B2 | 1/2018 | Markert-Hahn et al. | |
| 9,896,725 B2 | 2/2018 | Lee et al. | |
| 9,896,726 B2 | 2/2018 | Vaisvila et al. | |
| 9,902,992 B2 | 2/2018 | Talasaz et al. | |
| 9,920,363 B2 | 3/2018 | Gao et al. | |
| 9,920,366 B2 | 3/2018 | Eltoukhy et al. | |
| 9,938,575 B2 | 4/2018 | Tischfield et al. | |
| 9,984,201 B2 | 5/2018 | Zhang et al. | |
| 10,011,878 B2 | 7/2018 | Ahlquist et al. | |
| 10,031,131 B2 | 7/2018 | Rao et al. | |
| 10,093,986 B2 | 10/2018 | Zhang et al. | |
| 10,144,953 B2 | 12/2018 | Domanico et al. | |
| 10,297,342 B2 | 5/2019 | Lo et al. | |
| 10,392,666 B2 | 8/2019 | Lo et al. | |
| 10,435,754 B2 | 10/2019 | Lo et al. | |
| 10,435,755 B2 | 10/2019 | Ahlquist et al. | |
| 10,704,083 B2 | 7/2020 | Domanico et al. | |
| 10,718,026 B2 | 7/2020 | Weinhausel et al. | |
| 11,410,750 B2 * | 8/2022 | Gross | C12N 15/1072 |
| 11,685,958 B2 | 6/2023 | Gross et al. | |
| 11,725,251 B2 | 8/2023 | Gross et al. | |
| 11,795,513 B2 | 10/2023 | Gross et al. | |
| 2002/0192698 A1 | 12/2002 | Pinkel et al. | |
| 2003/0104464 A1 | 6/2003 | Berlin et al. | |
| 2005/0196792 A1 | 9/2005 | Fodor et al. | |
| 2005/0221314 A1 | 10/2005 | Berlin et al. | |
| 2006/0286576 A1 | 12/2006 | Lofton-Day et al. | |
| 2006/0292585 A1 | 12/2006 | Nautiyal et al. | |
| 2007/0087358 A1 | 4/2007 | Ehrlich et al. | |
| 2007/0141582 A1 | 6/2007 | Li et al. | |
| 2007/0161031 A1 | 7/2007 | Trinklein et al. | |
| 2007/0264640 A1 * | 11/2007 | Barrett | C12Q 1/6837 435/6.14 |
| 2008/0081338 A1 | 4/2008 | Lo et al. | |
| 2008/0102450 A1 * | 5/2008 | Barrett | C12Q 1/6827 435/6.12 |
| 2008/0286787 A1 | 11/2008 | Campan et al. | |
| 2008/0305481 A1 | 12/2008 | Whitman | |
| 2009/0280479 A1 | 11/2009 | Hoon et al. | |
| 2010/0068720 A1 | 3/2010 | Li et al. | |
| 2010/0120022 A1 | 5/2010 | Ayalon-Soffer et al. | |
| 2010/0304978 A1 | 12/2010 | Deng et al. | |
| 2011/0027771 A1 | 2/2011 | Deng | |
| 2011/0165565 A1 | 7/2011 | Wang et al. | |
| 2011/0237444 A1 | 9/2011 | Clancy et al. | |
| 2012/0053062 A1 | 3/2012 | Brooks | |
| 2012/0149593 A1 | 6/2012 | Hicks et al. | |
| 2012/0157324 A1 | 6/2012 | Lizardi et al. | |
| 2012/0190023 A1 * | 7/2012 | Wasserstrom | C12Q 1/6876 435/6.11 |
| 2012/0208711 A1 | 8/2012 | Cortese | |
| 2012/0221249 A1 | 8/2012 | Lizardi et al. | |
| 2013/0017958 A1 | 1/2013 | Benz et al. | |
| 2013/0059734 A1 | 3/2013 | Molloy et al. | |
| 2013/0129668 A1 | 5/2013 | Firestein et al. | |
| 2013/0130924 A1 | 5/2013 | Walrafen | |
| 2013/0186639 A1 | 7/2013 | Zhao et al. | |
| 2013/0203605 A1 | 8/2013 | Shendure et al. | |
| 2013/0261984 A1 | 10/2013 | Eberle et al. | |
| 2013/0337447 A1 | 12/2013 | Porreca et al. | |
| 2014/0024537 A1 | 1/2014 | Rigatti et al. | |
| 2014/0080715 A1 | 3/2014 | Lo et al. | |
| 2014/0256574 A1 | 9/2014 | Herold et al. | |
| 2014/0274740 A1 | 9/2014 | Srinivasan et al. | |
| 2014/0274748 A1 | 9/2014 | Ahlquist | |
| 2014/0274752 A1 | 9/2014 | Blume et al. | |
| 2014/0274767 A1 | 9/2014 | Yegnasubramanian et al. | |
| 2014/0342940 A1 * | 11/2014 | Oliphant | C12Q 1/6858 506/9 |
| 2014/0357497 A1 | 12/2014 | Zhang et al. | |
| 2014/0364323 A1 | 12/2014 | Fan et al. | |
| 2015/0038352 A1 | 2/2015 | Cao et al. | |
| 2015/0099670 A1 | 4/2015 | Li et al. | |
| 2015/0104793 A1 | 4/2015 | Quake et al. | |
| 2015/0159212 A1 | 6/2015 | Pantoja et al. | |
| 2015/0197798 A1 | 7/2015 | Xu et al. | |
| 2015/0197809 A1 | 7/2015 | Myers et al. | |
| 2015/0209786 A1 | 7/2015 | Hage et al. | |
| 2015/0259743 A1 | 9/2015 | Burgess et al. | |
| 2015/0299781 A1 | 10/2015 | Ost | |
| 2015/0322513 A1 | 11/2015 | Gromminger et al. | |
| 2015/0368708 A1 | 12/2015 | Talasaz | |
| 2016/0003848 A1 | 1/2016 | Holdenrieder | |
| 2016/0004814 A1 | 1/2016 | Stamatoyannopoulos | |
| 2016/0017396 A1 | 1/2016 | Cann et al. | |
| 2016/0017419 A1 | 1/2016 | Chiu et al. | |
| 2016/0040218 A1 | 2/2016 | Guttman et al. | |
| 2016/0040229 A1 | 2/2016 | Talasaz et al. | |
| 2016/0047001 A1 * | 2/2016 | Larisch | C12Q 1/6886 514/245 |
| 2016/0138079 A1 | 5/2016 | Guan et al. | |
| 2016/0144378 A1 | 5/2016 | Huang et al. | |
| 2016/0168648 A1 | 6/2016 | Allawi et al. | |
| 2016/0186267 A1 | 6/2016 | So et al. | |
| 2016/0210403 A1 | 7/2016 | Zhang et al. | |
| 2016/0232290 A1 | 8/2016 | Rava et al. | |
| 2016/0239604 A1 | 8/2016 | Chudova et al. | |
| 2016/0251704 A1 | 9/2016 | Talasaz et al. | |
| 2016/0258014 A1 | 9/2016 | Booth et al. | |
| 2016/0265027 A1 | 9/2016 | Sanches-Kuiper et al. | |
| 2016/0265042 A1 | 9/2016 | Schroeder et al. | |
| 2016/0275240 A1 * | 9/2016 | Huelga | C12Q 1/6869 |
| 2016/0281175 A1 | 9/2016 | Weinhausel et al. | |
| 2016/0298183 A1 | 10/2016 | Wen et al. | |
| 2016/0319345 A1 | 11/2016 | Gnerre et al. | |
| 2016/0333417 A1 | 11/2016 | Talasaz | |
| 2016/0333420 A1 | 11/2016 | Stern et al. | |
| 2016/0340740 A1 | 11/2016 | Zhang | |
| 2016/0340749 A1 | 11/2016 | Stelzer et al. | |
| 2016/0348152 A1 | 12/2016 | Zheng et al. | |
| 2016/0357903 A1 * | 12/2016 | Shendure | G06N 20/00 |
| 2016/0362748 A1 | 12/2016 | Mongan et al. | |
| 2017/0024513 A1 | 1/2017 | Lo et al. | |
| 2017/0029900 A1 | 2/2017 | Lo et al. | |
| 2017/0101685 A1 | 4/2017 | Lo et al. | |
| 2017/0121767 A1 | 5/2017 | Dor et al. | |
| 2017/0137871 A1 | 5/2017 | Lai et al. | |
| 2017/0175205 A1 | 6/2017 | Toung et al. | |
| 2017/0176420 A1 | 6/2017 | Rao et al. | |
| 2017/0191119 A1 | 7/2017 | Rao et al. | |
| 2017/0198344 A1 | 7/2017 | Vaisvila et al. | |
| 2017/0211143 A1 | 7/2017 | Shendure et al. | |
| 2017/0218338 A1 | 8/2017 | Rao et al. | |
| 2017/0219589 A1 | 8/2017 | Rao et al. | |
| 2017/0233829 A1 | 8/2017 | Lo et al. | |
| 2017/0235877 A1 | 8/2017 | Lo et al. | |
| 2017/0240973 A1 | 8/2017 | Eltoukhy et al. | |
| 2017/0249421 A1 | 8/2017 | Eberle et al. | |
| 2017/0260590 A1 | 9/2017 | Eltoukhy et al. | |

(56) References Cited

U.S. PATENT DOCUMENTS

| | | |
|---|---|---|
| 2017/0275689 A1 | 9/2017 | Maguire |
| 2017/0292147 A1 | 10/2017 | Kostem et al. |
| 2017/0321276 A1 | 11/2017 | Cantor et al. |
| 2017/0327869 A1 | 11/2017 | Schutz et al. |
| 2017/0356053 A1 | 12/2017 | Otto et al. |
| 2017/0362638 A1 | 12/2017 | Chudova et al. |
| 2018/0010176 A1 | 1/2018 | Patel |
| 2018/0010192 A1 | 1/2018 | Zhang |
| 2018/0023125 A1 | 1/2018 | Talasaz et al. |
| 2018/0044632 A1 | 2/2018 | Rao et al. |
| 2018/0044633 A1 | 2/2018 | Rao et al. |
| 2018/0044731 A1 | 2/2018 | Valouev et al. |
| 2018/0045727 A1 | 2/2018 | Spetzler et al. |
| 2018/0066306 A1 | 3/2018 | Namsaraev et al. |
| 2018/0082012 A1 | 3/2018 | Jiang et al. |
| 2018/0094325 A1 | 4/2018 | Zhang et al. |
| 2018/0105884 A1 | 4/2018 | Lo et al. |
| 2018/0119113 A1 | 5/2018 | Rao et al. |
| 2018/0119225 A1 | 5/2018 | Rao et al. |
| 2018/0119230 A1 | 5/2018 | Velculescu et al. |
| 2018/0120304 A1 | 5/2018 | Rao et al. |
| 2018/0171397 A1 | 6/2018 | Vaisvila et al. |
| 2018/0179587 A1 | 6/2018 | Rao et al. |
| 2018/0180602 A1 | 6/2018 | Rao et al. |
| 2018/0216195 A1 | 8/2018 | Elnitski |
| 2018/0237867 A1 | 8/2018 | Bajic et al. |
| 2018/0327859 A1 | 11/2018 | Van Engeland |
| 2018/0341745 A1 | 11/2018 | Zhang et al. |
| 2019/0032116 A1 | 1/2019 | Shuber |
| 2019/0032149 A1 | 1/2019 | Van Engeland |
| 2019/0136327 A1 | 5/2019 | Zhang et al. |
| 2019/0256921 A1 | 8/2019 | Mueller |
| 2019/0287652 A1 | 9/2019 | Gross et al. |
| 2020/0239964 A1 | 7/2020 | Gross et al. |
| 2021/0017609 A1 | 1/2021 | Gross |
| 2021/0025011 A1 | 1/2021 | Gross |
| 2021/0238693 A1 | 8/2021 | Gross et al. |
| 2021/0238694 A1 | 8/2021 | Gross |
| 2022/0064737 A1 | 3/2022 | Gross |
| 2022/0090207 A1 | 3/2022 | Venn et al. |
| 2022/0098672 A1 | 3/2022 | Venn |
| 2022/0119890 A1 | 4/2022 | Venn et al. |
| 2022/0380857 A1 | 12/2022 | Gross et al. |
| 2023/0140937 A1 | 5/2023 | Gross et al. |
| 2024/0084396 A1 | 3/2024 | Gross et al. |

FOREIGN PATENT DOCUMENTS

| | | |
|---|---|---|
| EP | 1342794 B1 | 12/2005 |
| EP | 1394173 B1 | 10/2007 |
| EP | 1644519 B1 | 12/2008 |
| EP | 1567669 B1 | 3/2010 |
| EP | 2771483 A1 | 9/2014 |
| EP | 2391729 B1 | 9/2016 |
| EP | 2825675 B1 | 12/2017 |
| EP | 3265562 A2 | 1/2018 |
| EP | 3087204 B1 | 2/2018 |
| EP | 3288455 A1 | 3/2018 |
| EP | 3094747 B1 | 11/2018 |
| EP | 2893040 B1 | 1/2019 |
| EP | 3497220 | 6/2019 |
| EP | 3497220 A1 | 6/2019 |
| EP | 3207134 B1 | 7/2019 |
| EP | 3218523 B1 | 2/2020 |
| EP | 3289097 B1 | 3/2020 |
| WO | 2001081620 A2 | 11/2001 |
| WO | WO-0181620 A2 | 11/2001 |
| WO | WO-2003054219 A2 | 7/2003 |
| WO | WO-2004110246 A2 | 12/2004 |
| WO | WO-2005017207 A2 | 2/2005 |
| WO | WO-2005019477 A2 | 3/2005 |
| WO | WO-2005118852 A2 | 12/2005 |
| WO | WO-2006128192 A2 | 11/2006 |
| WO | WO-2007106802 A2 | 9/2007 |
| WO | WO-2008038000 A1 | 4/2008 |
| WO | WO-2008048508 A2 | 4/2008 |
| WO | WO-2008073303 A2 | 6/2008 |
| WO | WO-2008084219 A1 | 7/2008 |
| WO | WO-2010037001 A2 | 4/2010 |
| WO | WO-2010085343 A1 | 7/2010 |
| WO | WO-2011038507 A1 | 4/2011 |
| WO | WO-2011127136 A1 | 10/2011 |
| WO | WO-2012031329 A1 | 3/2012 |
| WO | WO-2012138973 A2 | 10/2012 |
| WO | WO-2012149171 A1 | 11/2012 |
| WO | WO-2012178074 A1 | 12/2012 |
| WO | WO-2013060762 A1 | 5/2013 |
| WO | WO-2013163207 A1 | 10/2013 |
| WO | WO-2013186639 A2 | 12/2013 |
| WO | WO-2014026768 A1 | 2/2014 |
| WO | WO-2014043763 A1 | 3/2014 |
| WO | WO-2014135469 A2 | 9/2014 |
| WO | WO-2014151117 A1 | 9/2014 |
| WO | WO-2014184684 A2 | 11/2014 |
| WO | WO-2014205981 A1 | 12/2014 |
| WO | WO-2015101515 A2 | 7/2015 |
| WO | WO-2015116837 A1 | 8/2015 |
| WO | WO-2015124955 A1 | 8/2015 |
| WO | WO-2015145133 A1 | 10/2015 |
| WO | WO-2015153284 A1 | 10/2015 |
| WO | WO-2015179672 A1 | 11/2015 |
| WO | WO-2016008451 A1 | 1/2016 |
| WO | WO-2016015058 A2 | 1/2016 |
| WO | WO-2016016639 A1 | 2/2016 |
| WO | WO-2016034908 A1 | 3/2016 |
| WO | WO-2016063034 A1 | 4/2016 |
| WO | WO-2016063059 A1 | 4/2016 |
| WO | WO-2016094813 A1 | 6/2016 |
| WO | WO-2016097251 A1 | 6/2016 |
| WO | WO-2016101258 A1 | 6/2016 |
| WO | WO-2016115530 A1 | 7/2016 |
| WO | WO-2016127844 A1 | 8/2016 |
| WO | WO-2016127944 A1 | 8/2016 |
| WO | WO-2016141324 A2 | 9/2016 |
| WO | WO-2016170319 A1 | 10/2016 |
| WO | WO-2016179049 A1 | 11/2016 |
| WO | 2016/207656 A1 | 12/2016 |
| WO | WO-2016189288 A1 | 12/2016 |
| WO | WO-2016210224 A1 | 12/2016 |
| WO | WO-2017008912 A1 | 1/2017 |
| WO | WO-2017012544 A1 | 1/2017 |
| WO | WO-2017027835 A1 | 2/2017 |
| WO | WO-2017048932 A1 | 3/2017 |
| WO | WO-2017062970 A1 | 4/2017 |
| WO | WO-2017083562 A1 | 5/2017 |
| WO | WO-2017106481 A1 | 6/2017 |
| WO | 2017127741 A1 | 7/2017 |
| WO | WO-2017136603 A1 | 8/2017 |
| WO | WO-2017176630 A1 | 10/2017 |
| WO | WO-2017181079 A2 | 10/2017 |
| WO | WO-2017181111 A2 | 10/2017 |
| WO | WO-2017181134 A2 | 10/2017 |
| WO | WO-2017181146 A1 | 10/2017 |
| WO | WO-2017181202 A2 | 10/2017 |
| WO | WO-2017194668 A1 | 11/2017 |
| WO | WO-2017201102 A1 | 11/2017 |
| WO | WO-2017212428 A1 | 12/2017 |
| WO | WO-2018005983 A1 | 1/2018 |
| WO | WO-2018009696 A1 | 1/2018 |
| WO | WO-2018009702 A1 | 1/2018 |
| WO | WO-2018009703 A1 | 1/2018 |
| WO | WO-2018009705 A1 | 1/2018 |
| WO | WO-2018009709 A1 | 1/2018 |
| WO | WO-2018022890 A1 | 2/2018 |
| WO | WO-2018022906 A1 | 2/2018 |
| WO | WO-2018031760 A1 | 2/2018 |
| WO | WO-2018039463 A1 | 3/2018 |
| WO | WO-2018119216 A1 | 6/2018 |
| WO | WO-2018119452 A2 | 6/2018 |
| WO | WO-2018136881 A1 | 7/2018 |
| WO | WO-2018161031 A1 | 9/2018 |
| WO | WO-2018195211 A1 | 10/2018 |
| WO | WO-2018195217 A1 | 10/2018 |
| WO | WO-2018204764 A1 | 11/2018 |

(56) References Cited

FOREIGN PATENT DOCUMENTS

| WO | WO-2018209361 A2 | 11/2018 |
|---|---|---|
| WO | 2019074700 A1 | 4/2019 |
| WO | WO-2019064063 A1 | 4/2019 |
| WO | WO-2019178277 A1 | 9/2019 |
| WO | WO-2019195268 A2 | 10/2019 |
| WO | WO-2019199696 A1 | 10/2019 |
| WO | WO-2020069350 A1 | 4/2020 |
| WO | WO-2020154682 A2 | 7/2020 |
| WO | 2020163403 A1 | 8/2020 |
| WO | 2020163410 A1 | 8/2020 |
| WO | 2020/232109 A1 | 11/2020 |

OTHER PUBLICATIONS

Ashford, Molika. UCSD Methylation Haplotype Method Tracks cfDNA Origin; Singlera to Commercialize. Genome Web. Published Mar. 8, 2017. Accessed Dec. 7, 2020. Available at: https://www.genomeweb.com/molecular-diagnostics/ucsd-methylation-haplotype-method-tracks-cfdna-origin-singlera-commercialize#.X9P0pmiQGUk.
Diep et al. Library-free methylation sequencing with bisulfite padlock probes. Nature Methods 9(3):270-272 (2012).
EZ DNA Methylation-Lightning Kit, Instruction Manual. Zymo Research, ver. 1.0.5.
Kang et al., "CancerLocator: non-invasive cancer diagnosis and tissue-of-origin prediction using methylation profiles of cell-free DNA," Genome Biology vol. 18, Article No. 53 (2017).
Li et al. CancerDetector: ultrasensitive and non-invasive cancer detection at the resolution of individual reads using cell-free DNA methylation sequencing data. Nucleic Acids Research, vol. 46, Issue 15, Sep. 6, 2018, p. e89, https://doi.org/10.1093/nar/gky423.
Liu et al. Methylation-sensitive enrichment of minor DNA alleles using a double-strand DNA-specific nuclease. Nucleic Acids Research, 2017 vol. 45(6): e39.
Mouliere et al. Selecting short DNA fragments in plasma improves detection of circulating tumour DNA. May 2017. bioRxiv 134437; doi: https://doi.org/10.1101/134437.
Oncomine ™ cfDNA Assays Part I: Library Preparation User Guide (2016).
Oncomine™ cfDNA Assays part II: Plan a Run, Template Preparation, and Sequencing User Guide (2016).
Ross, JP et al. Identification of differentially methylated regions usign streptavidin bisulfite ligand methylation enrichment (SuBLIME), a new method to enrich for methylated DNA prior to deep bisulfite genomic sequencing. Epigenetics, 8(1):113-127 (Jan. 2013) E-pub: Dec. 20, 2012.
Toyota et al. Identification of differentially methylated sequences in colorectal cancer by methylated CpG island amplification. Cancer Research. May 1999. 59(10).
Widschwendter, et al. Methylation patterns in serum DNA for early identification of disseminated breast cancer. Genome Medicine vol. 9, Article No. 115 (2017).
Handbook of Chemistry and Physics, 49th Edition, 1968, Weast (ed.), The Chemical Rubber Co., Cleveland, Ohio, p. 245.
U.S. Appl. No. 17/061,048 Office Action dated Feb. 1, 2021.
Avraham, A. et al. Tissue Specific DNA Methylation in Normal Human Breast Epithelium and in Breast Cancer. PLOS One, 9(3):e91805:1-8 (Mar. 20, 2014).
Burnham, et al. Single-stranded DNA library preparation uncovers the origin and diversity of ultrashort cell-free DNA in plasma. Sci Rep. Jun. 14, 2016;6:27859. doi: 10.1038/srep27859.
Chan, K.C. et al. Noninvasive detection of cancer-associated genome-wide hypomethylation and copy number aberrations by plasma DNA bisulfite sequencing. Proc. Natl. Acad. Sci. USA 110(47):18761-18768 (Nov. 19, 2013).
Chhibber et al. Single-molecule polymerase chain reaction reduces bias: Application to DNA methylation analysis by bisulfite sequencing. Anal. Biochem. vol. 377, Issue 1, Jun. 1, 2008, pp. 46-54.

Cohen, et al., Detection and localization of surgically resectable cancers with a multi-analyte blood test. Science Feb. 23, 2018:vol. 359, Issue 6378, pp. 926-930. DOI: 10.1126/science.aar3247.
Co-pending U.S. Appl. No. 17/061,048, inventors Gross; Samuel et al., filed on Oct. 1, 2020.
Frimer et al. HPV16 methylation is a consistent biomarker of cervical intraepithelial neoplasia (CIN) 3 using a novel next-generation bisulfite-sequencing technology. Gynecologic Oncology. Jul. 2013, 130(1):e51-e52. Doi: https://doi.org/10.1016/j.ygyno.2013.04.182.
GenBank submission AC067721, Mar. 7, 2003 [online]. [Retrieved on Jun. 17, 2020].A Retrieved from the internet at< url: https://www.ncbi.nim.nih.gov/nuccore/AC067721< /url:>.
GenBank submission AC093151.2, Jun. 25, 2002 [online]. [Retrieved on Jun. 17, 2020]. Retrieved from the internet at< url: https://www.ncbi.nlm.nih.gov/nuccore/AC093151</url:>.
Guo, S. et al. Identification of methylation haplotype blocks aids in deconvolution of heterogeneous tissue samples and tumor tissue-of-origin mapping from plasma DNA. Nat Genet 2017;49:635-42.
Hao et al. DNA methylation markers for diagnosis and prognosis of common cancers. PNAS USA 114(28):7414-7419 (w/Supplemental Information) (2017).
Huang et al., The Epigenome: Molecular Hide and Seek. Feb. 21, 2003, Chapter3, pp. 39-64. Doi: https://doi.org/10.1002/3527601511.ch3.
Husseiny, M. et al. Tissue-Specific Methylation of Human Insulin Gene and PCR Assay for Monitoring Beta Cell Death. PLoS One, 9(4):e9459:1-9 (Apr. 10, 2014).
Husseiny, M.I. et al. Development of a Quantitative Methylation-Specific Polymerase Chain Reaction Method for Monitoring Beta Cell Death in Type 1 Diabetes. PLoS One. PLoS One 7(10): e47942 (Oct. 29, 2012).
Lebastchi, J. et al. Immune Therapy and β-Cell Death in Type 1 Diabetes. Diabetes, Brief Report 62(5):1676-1680 (May 2013).
Lehmann-Werman, R. et al. Identification of tissue-specific cell death using methylation patterns of circulating DNA. Proc Natl Acad Sci U S A 2016;113:E1826-34.
Liu et al. Targeted methylation sequencing of plasma cell-free DNA for cancer detection and classification. Annals of Oncology 29: 1445-1453, 2018.
Madi, T. et al. The determination of tissue-specific DNA methylation patterns in forensic biofluids using bisulfite modification and pyrosequencing. Electrophoresis, 33(12):1736-1745 (Jul. 2012).
Miura et al., Highly sensitive targeted methylome sequencing by post-bisulfite adaptor tagging. DNA Research, vol. 22, Issue 1, Feb. 2015, pp. 13-18,https://doi.org/10.1093/dnares/dsu034.
PCT/US19/25358 International Search Report & Written Opinion dated Dec. 30, 2019.
Poon, Leo, L.M., et al., "Differential DNA Methylation between Fetus and Mother as a Strategy for Detecting Fetal DNA in Maternal Plasma," Clinical Chemistry, 2002, vol. 48, No. 1, pp. 35-41.
Raine, A. et al. Splinted Ligation Adapter Tagging (SPLAT), a novel library preparation method for whole genome bisulphite sequencing. Nucleic Acids Research, 110:1-15 (Nov. 28, 2016).
Shen et al., FACETS: allele-specific copy number and clonal heterogeneity analysis tool for high-throughput DNA sequencing. Nucleic Acids Research, 2016: 44(16) e131.
Shoemaker, et al., Allele-specific methylation is prevalent and is contributed by CpG-SNPs in the human genome. Genome Res. 2010.20:883-889.
Tanic, et al., Epigenome-wide association studies for cancer biomarker discovery in circulating cell-free DNA: technical advances and challenges. Current Opinion in Genetics & Development 2017, 42:48-55.
Varley, K.E. et al. Bisulfite Patch PCR enables multiplexed sequencing of promoter methylation across cancer samples. Genome Research 20:1279-1287 (2010).
Vrba et al., "A suite of DNA methylation markers that can detect most common human cancers", Epigenetics, 2018, pp. 1-13.
Yong, Ed. Written in Blood: DNA circulating in the bloodstream could guide cancer treatment—if researchers can work out how best to use it. Nature 2014: 511; 524-526.

(56) References Cited

OTHER PUBLICATIONS

Co-pending U.S. Appl. No. 17/214,038, inventors Gross; Samuel S. et al., filed on Mar. 26, 2021.
Co-pending U.S. Appl. No. 17/214,105, inventors Gross; Samuel et al., filed on Mar. 26, 2021.
Co-pending U.S. Appl. No. 17/214,190, inventors Gross; Samuel S. et al., filed on Mar. 26, 2021.
Co-pending U.S. Appl. No. 17/214,682, inventors Xiang; Jing et al., filed on Mar. 26, 2021.
PCT/US2019/053509 International Search Report dated Jan. 29, 2020.
Bejar, R., et al., Clinical Effect of Point Mutations in Myelodysplastic Syndromes, The New England Journal of Medicine, Jun. 2011, pp. 2496-2506.
Brandon, et al., "Mitochondrial mutations in cancer", Oncogene 25(34), 2006, 4647-4662.
Zhai, et al., "Genome-wide DNA Methylation Profiling of Cell-Free Serum DNA in Esophageal Adenocarcinoma and Barrett Esophagus" Neoplasia, 14(1), 29-33, 2012.
Genome Reference Consortium with a reference number, GRCh37/hg19, and also available from Genome Browser provided by Santa Cruz Genomics Institute, Nucleic Acids REsearch, 2021, vol. 49, Nov. 22, 2020.
Harris, et al., "Single-Molecule DNA Sequencing of a Viral Genome", Science, vol. 320, 2008, 106-109.
Hashimoto , et al. , "5'-end SAGE for the analysis of transcriptional start sites" , Nature Biotechnology, 22 , 2004 , 1146-1149.
Illumina, Data Sheet; Epigenetics "Infinfium HumanMethylation450 BeadChip", 4 pgs., 2012.
International Classification of Diseases for Oncology (ICD-O-3) (codes.iarc.fr).
Kivioja , et al. , "Counting absolute numbers of molecules using unique molecular identifiers" , Nat Methods, 9(1) , 2011 , 72-4.
Leygo, et al., "DNA Methylation as a Noninvasive Epigenetic Biomarker for the Detection of Cancer" Dis Markers.; 2017: 3726595.
Li et al., Post-conversion targeted capture of modified cytosines in mammalian and plant genomes, Nucleic Acids Research, 2015, vol. 43, No. 12.
Mardis, E. R., et al., Recurring Mutations Found by Sequencing an Acute Myeloid Leukemia Genome, The New England Journal of Medicine, 2009, pp. 1058-1066.
Masser, et al., Bisulfite oligonucleotide-capture sequencing for targeted baseand strand-specific absolute 5-methylcytosine quantitation, American Aging Association , 2016.
Okamura, et al., Lists of HumanMethylation450 BeadChip probes with nucleotide-variant information obtained from the Phase 3 data of the 1000 Genomes Project, Genomics Data 7, 67-69, 2016.
Papaemmanuil, E., et al., Somatic SF3B1 Mutation in Myelodysplasia with Ring Sideroblasts, The New England Journal of Medicine, Sep. 26, 2011, pp. 1384-1395.
Reidmiller M, Braun H. Rprop—A Fast Adaptive Learning Algorithm. Proceedings of the International Symposium on Computer and Information Science VII, 1992).
Surveillance, Epidemiology, and End Results Program (SEER) (seer.cancer.gov).
The STRIVE Study: Development of a Blood Test for Early Detection of Multiple Cancer Types, CinicalTrials.gov Identifier: NCT03085888, 6 pages, 2017.
Walter, M., Clonal Architecture of Secondary Acute Myeloid Leukemia, The New England Journal of Medicine, , Mar. 14, 2012, pp. 1090-1098.
Liu, et al.,"An Efficient one-step site-directed deletion, insertion, single and multiple-site plasmid mutagensis protocol", BMC Technology, Dec. 4, 2008, Biomed Central.
A Guide to Reference Genome Selection, Oxford Genomics Centre, pp. 1-4, published Mar. 7, 2017. Retrieved from the internet: <URL: https://www.well.ox.ac.uk/ogc/guide-reference-genome-selection/> [retrieved on Apr. 12, 2022].
McInnes et al., "Genome-wide methylation analysis identifies a core set of hypermethylated genes in CIMP-H colorectal cancer," BMC Cancer, 17:228 (2017).
Pidsley et al., "Critical evaluation of the Illumina MethylationEPIC BeadChip microarray for whole-genome DNA methylation profiling," Genome Biology, 17:208 (2016).
Tost, "Current and Emerging Technologies for the Analysis of the Genome-Wide and Locus-Specific DNA Methylation Patterns," DNA Methyltransferases—Role and Function, Jeltsch et al.eds., Springer International Publishing, Switzerland, 2016, pp. 343-430.
Illumina, Data Sheet; Epigenetics "Infinium MethylationEPIC BeadChip", 4 pgs., 2012. Retrieved from the internet on Dec. 12, 2022: <https://filgen.jp/Product/Bioscience/Methyl/humanmethylationepic-data-sheet-1070-2015-008.pdf>.
Colella et al., "QuantiSNP: an Objective Bayes Hidden-Markov Model to detect and accurately map copy number variation using SNP genotyping data," *Nucleic Acids Res*, 35(6):2013-2025 (2007).
Crisp et al., "Pencil-and-Paper Neural Networks: An Undergraduate Laboratory Exercise in Computational Neuroscience," *J Undergrad Neurosci Educ*, 14(1):A13-22 (2015).
Hodges et al., "High definition profiling of mammalian DNA methylation by array capture and single molecule bisulfite sequencing," Genomic Research, 19(9): 1593-1605 (2009).
Liang et al., "Non-invasive diagnosis of early-stage lung cancer using high-throughput targeted DNA methylation sequencing of circulating tumor DNA (ctDNA)," *Theranostics*, 9(7):2056-2070 (2019).
Schwarzenbach et al., "Cell-free nucleic acids as biomarkers in cancer patients," *Nat Rev Cancer*, 11: 426-437 (2011).
Simon et al., "Roadmap for developing and validating therapeutically relevant genomic classifiers," *J. Clin. Oncol.*, 23(29):7332-7341 (2005).
Teschendorff et al., "Differential variability improves the identification of cancer risk markers in DNA methylation studies profiling precursor cancer lesions," *Bioinformatics*, 28(11):1487-1494 (2012).
Yuan et al., "Prediction of tumor metastasis from sequencing data in the era of genome sequencing," *Brief Funct Genomics*, 18(6):412-418 (2019).
Zhang et al., "Specific breast cancer prognosis-subtype distinctions based on DNA methylation patterns," *Mol. Oncol.*, 12(7):1047-1060 (2018).

* cited by examiner

Generate data structure for a control group
*300*

```
Generate set of methylation state vectors
for a control group
100
        │
        ▼
For each methylation state vector, subdivide
into strings of methylation sites
310
        │
        ▼
Tally strings for each position and methylation
state combination
320
        │
        ▼
Create data structure storing counts of all
possible strings from the control group
330
        ┆
        ▼
Validate data structure consistency
340
```

*FIG. 3A*

Validate data structure consistency
*340*

```
┌─────────────────────────────────────┐
│ Generate set of methylation state vectors │
│        for a validation group        │
│                 100                  │
└─────────────────────────────────────┘
                  │
                  ▼
┌─────────────────────────────────────┐
│    Calculate a p-value score for each   │
│ methylation state vector with control group │
│            data structure            │
│                 350                  │
└─────────────────────────────────────┘
                  │
                  ▼
┌─────────────────────────────────────┐
│ Build cumulative density function (CDF) of all │
│   p-values from the validation group   │
│                 360                  │
└─────────────────────────────────────┘
                  │
                  ▼
┌─────────────────────────────────────┐
│        Validate consistency of CDF      │
│                 370                  │
└─────────────────────────────────────┘
```

*FIG. 3B*

Calculate P-Value with Markov Chain Model
500

Test Methylation State Vector
505

$< M_{23}, M_{24}, M_{25}, U_{26} >$

→ 410
  420 →

| P | $< M_{23}, M_{24}, M_{25}, M_{26} >$ | $= P(M_{26} \mid M_{23}, M_{24}, M_{25}) * P(M_{25} \mid M_{23}, M_{24}) * P(M_{24} \mid M_{23}) * P(M_{23})$<br>$\approx P(M_{26} \mid M_{24}, M_{25}) * P(M_{25} \mid M_{23}, M_{24}) * P(M_{24} \mid M_{23}) * P(M_{23})$ |
|---|---|---|
| P | $< M_{23}, M_{24}, M_{25}, U_{26} >$ | |

• • •

| P | $< U_{23}, U_{24}, U_{25}, U_{26} >$ | $= P(U_{26} \mid U_{23}, U_{24}, U_{25}) * P(U_{25} \mid U_{23}, U_{24}) * P(U_{24} \mid U_{23}) * P(U_{23})$<br>$\approx P(U_{26} \mid U_{24}, U_{25}) * P(U_{25} \mid U_{23}, U_{24}) * P(U_{24} \mid U_{23}) * P(U_{23})$ |

Probabilities of Possible Methylation State Vectors
515

→ 430 →

| p-value | $< M_{23}, M_{24}, M_{25}, U_{26} >$ | $= \Sigma [\,All\ probabilities \leq P(\,<M_{23}, M_{24}, M_{25}, U_{26}>\,)\,]$ |
|---|---|---|

P-Value of Test Methylation State Vector
525

FIG. 5

Computing pairwise information gain
680

For each sample, define a feature vector for each cancer type at each region based on count of fragments above a log-likelihood ratio above various thresholds
690

Calculate an informative score for each CpG site describing ability to distinguish between pairs of cancer type
695

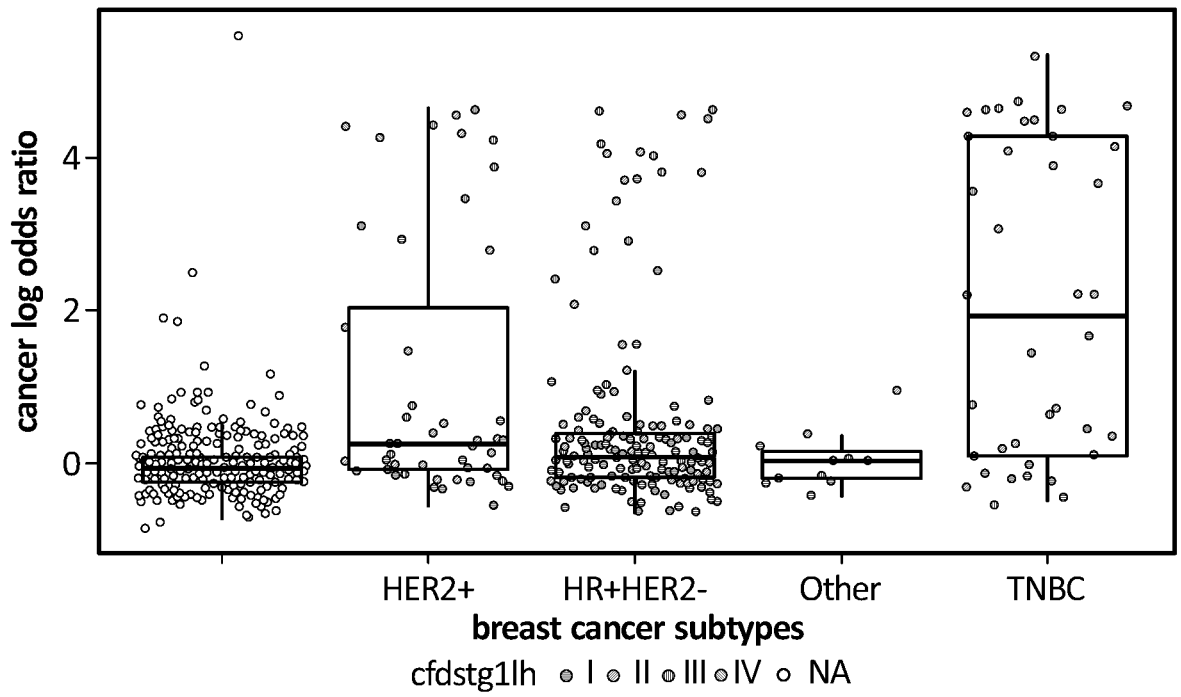
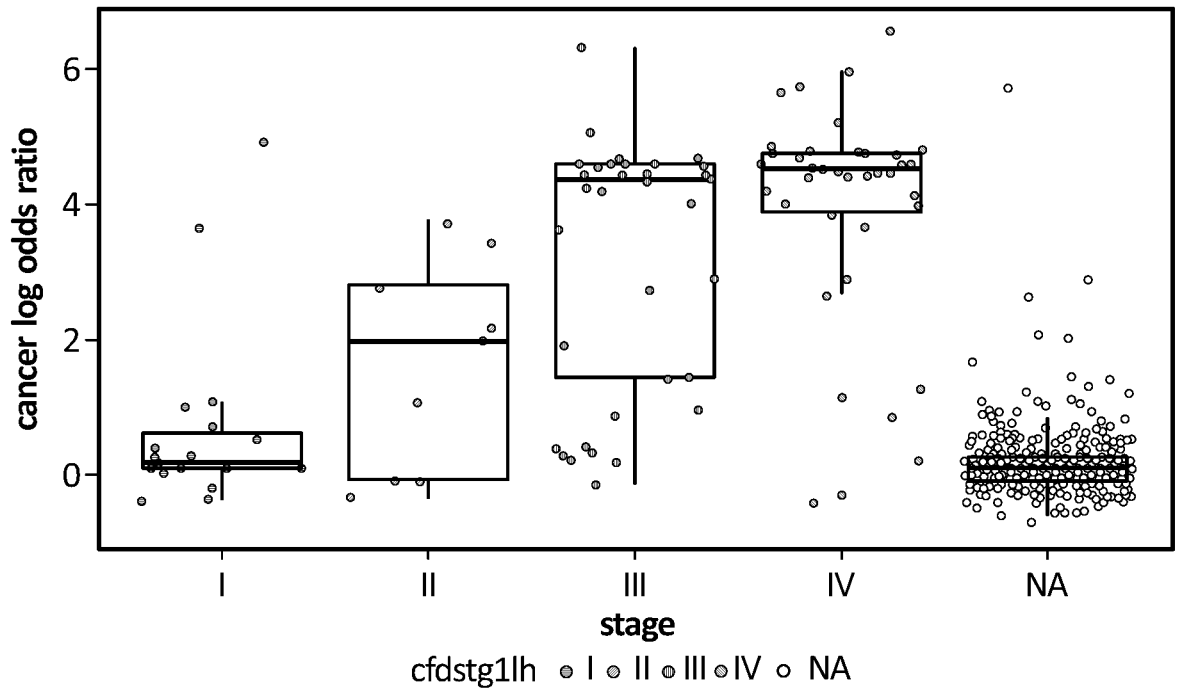
FIG. 11B

| metric | Sn_95Sp |
|---|---|
| Mscore.testV1 | 0.3606 |
| Mscore.testV1.cv | 0.3526 |
| Mscore.testV1.cv.panel | 0.3566 |

METHYLATION MARKERS AND TARGETED METHYLATION PROBE PANEL

CROSS REFERENCE TO RELATED APPLICATIONS

This is a continuation application, which claims priority to International Patent Application No. PCT/US2019/025358, filed Apr. 2, 2019, which claims the benefit of U.S. Provisional Patent Application No. 62/651,643, filed Apr. 2, 2018 and U.S. Provisional Patent Application No. 62/738,271, filed Sep. 28, 2018, both of which are hereby incorporated by reference in their entireties.

BACKGROUND

DNA methylation plays an important role in regulating gene expression. Aberrant DNA methylation has been implicated in many disease processes, including cancer. DNA methylation profiling using methylation sequencing (e.g., whole genome bisulfite sequencing (WGBS)) is increasingly recognized as a valuable diagnostic tool for detection, diagnosis, and/or monitoring of cancer. For example, specific patterns of differentially methylated regions may be useful as molecular markers for various diseases.

However, WGBS is not ideally suitable for a product assay. The reason is that the vast majority of the genome is either not differentially methylated in cancer, or the local CpG density is too low to provide a robust signal. Only a few percent of the genome is likely to be useful in classification.

Furthermore, there have been various challenges in identifying differentially methylated regions in various diseases. First off, determining differentially methylated regions in a disease group only holds weight in comparison with a group of control subjects, such that if the control group is small in number, the determination loses confidence with the small control group. Additionally, among a group of control subjects, methylation status can vary which can be difficult to account for when determining whether the regions are differentially methylated in a disease group. On another note, methylation of a cytosine at a CpG site is strongly correlated with methylation at a subsequent CpG site. To encapsulate this dependency is a challenge in itself.

Accordingly, a cost-effective method of accurately diagnosing a disease by detecting differentially methylated regions has not yet been available.

SUMMARY

Early detection of cancer in subjects is important as it allows for earlier treatment and therefore a greater chance for survival. Targeted detection of methylation patterns specific to cancer or tissue of origin, i.e., the organ, organ group, body region or cell type that the cancer arises or origins from, using cell-free DNA (cfDNA) fragments can make early detection of cancer possible by providing a cost-effective and non-invasive method for analyzing information relevant to cancer classification. By using a targeted genomic region panel rather than sequencing all nucleic acids in a test sample, also known as "whole genome sequencing," the method can increase sequencing depth of the target regions and lower costs compared to whole genome sequencing (WGS) or whole genome bisulfite sequencing (WGBS).

Towards that end, the present description provides cancer assay panels (e.g., bait sets) for detecting cancer and various tissue or origins by detecting methylation patterns of targeted genomic regions. The cancer assay panel can detect and differentiate methylation patterns specific to cancer in general or to different cancer types, such as, e.g., (1) blood cancer, (2) breast cancer, (3) colorectal cancer, (4) esophageal cancer, (5) head and neck cancer, (6) hepatobiliary cancer, (7) lung cancer, (8) ovarian cancer, and (9) pancreatic cancer.

Cancer assay panels can further provide information relevant to a cancer stage for each cancer type. The present description also provides a method of using cancer assay panels for diagnosis of cancer, wherein the diagnosis of cancer further includes a cancer type and/or cancer stage. Further provided herein are methods of identifying genomic sites having methylation patterns specific to cancer or various types of cancer as well as a list of genomic sites that can be used for the diagnosis of cancer and/or cancer tissue of origin. The methods described herein further include methods of designing probes to enrich for nucleic acids derived from the selected genomic regions efficiently without pulling down an excessive amount of undesired or non-targeted nucleic acid and methods of making the cancer assay panel with the probes. Also described are methods for enriching nucleic acids derived from the selected genomic regions by means other than hybridization capture.

Disclosed herein are assay panels for enriching cfDNA molecules for cancer diagnosis, the assay panel comprising at least 500 different pairs of polynucleotide probes, wherein each pair of the at least 500 pairs of probes (i) comprises two different probes configured to overlap with each other by an overlapping sequence of 30 or more nucleotides and (ii) is configured to hybridize to a modified fragment obtained from processing of the cfDNA molecules, wherein each of the cfDNA molecules corresponds to or is derived from one or more genomic regions and wherein each of the one or more genomic regions comprises at least five methylation sites and has an anomalous methylation pattern in cancerous training samples.

In some embodiments, the overlapping sequence comprises at least 40, 50, 75, or 100 nucleotides. In some embodiments, the assay panels comprise at least 50, 60, 70, 80, 90, 100, 120, 150, 200, 300 or 400 pairs of probes. In some embodiments, the assay panels comprise at least 1,000, 2,000, 2,500, 5,000, 6,000, 7,500, 10,000, 15,000, 20,000 or 25,000 pairs of probes.

Further disclosed herein are assay panels for enriching cfDNA molecules for cancer diagnosis, comprising at least 1,000 polynucleotide probes, wherein each of the at least 1,000 probes is configured to hybridize to a modified polynucleotide obtained from processing of the cfDNA molecules, wherein each of the cfDNA molecules corresponds to or is derived from, one or more genomic regions and wherein each of the one or more genomic regions comprises at least five methylation sites, and has an anomalous methylation pattern in cancerous training samples.

In some embodiments, the processing of the cfDNA molecules comprises converting unmethylated C (cytosine) to U (uracil) in the cfDNA molecules. In some embodiments, each of the polynucleotide probes in the panel is conjugated to an affinity moiety. In some embodiments, the affinity moiety is a biotin moiety. In some embodiments, the training samples are samples originating from a plurality of subjects determined to have cancer. The assay panel of any one of the above claims, wherein a genomic region has an anomalous methylation pattern in cancerous training samples when a methylation state vector representing the genomic region in the cancerous training samples is present less frequently in reference samples than a threshold value.

In some embodiments, the threshold value is 0.1, 0.01, 0.001, or 0.0001. In some embodiments, each of the one or more genomic regions is either hypermethylated or hypomethylated in the cancerous training samples.

In some embodiments, at least 80, 85, 90, 92, 95, or 98% of the at least five methylation sites are either methylated or unmethylated in the cancerous training samples. In some embodiments, at least 3%, 5%, 10%, 15%, or 20%, 30%, or 40% of the probes on the panel comprise no G (Guanine). In some embodiments, at least 80, 85, 90, 92, 95, 98% of the probes on the panel have exclusively either CpG or CpA on CpG detection sites. In some embodiments, each of the probes on the panel comprises less than 20, 15, 10, 8, or 6 CpG detection sites. In some embodiments, each of the entire probes on the panel is designed to have sequence homology or sequence complementarity with fewer than 20, 15, 10, or 8 off-target genomic regions. In some embodiments, the fewer than 20 off-target genomic regions are identified using a k-mer seeding strategy. In some embodiments, the fewer than 20 off-target genomic regions are identified using k-mer seeding strategy combined to local alignment at seed locations.

In some embodiments, the assay panels comprise at least 1,000, 2,000, 2,500, 5,000, 10,000, 12,000, 15,000, 20,000, or 25,000 probes. In some embodiments, the at least 1,000 probes, or the at least 500 pairs of probes, together comprise at least 0.2 million, 0.4 million, 0.6 million, 0.8 million, 1 million, 2 million, or 4 million nucleotides. In some embodiments, each of the probes on the panel comprises at least 50, 75, 100, or 120 nucleotides. In some embodiments, each of the probes on the panel comprises less than 300, 250, 200, or 150 nucleotides. In some embodiments, each of the probes on the panel comprises 100-150 nucleotides. In some embodiments, at least 30% of the genomic regions are in exons or introns. In some embodiments, at least 15% of the genomic regions are in exons. In some embodiments, at least 20% of the genomic regions are in exons. In some embodiments, less than 10% of the genomic regions are in intergenic regions.

In some embodiments, the cancer panels further comprise a plurality of virus-specific probes, wherein each of the virus-specific probes is configured to hybridize to a viral genome fragment from cfDNA. In some embodiments, the viral genome fragment is from MCV, EBV, HBV, HCMV, HCV, HEWS, HPV16, or HPV18. In some embodiments, the cancer panels comprise at least 50, 100, 200, 500, 1000, 2000, or 3000 virus-specific probes.

In some embodiments, each of the one or more genomic regions is selected from one of Tables 1 or 11-15 (or combinations thereof). In some embodiments, each of the one or more genomic regions are selected from Table 13. In some embodiments, each of the one or more genomic regions are selected from Table 14. In some embodiments, each of the one or more genomic regions are selected from Table 15.

In some embodiments, the entire probes on the panel together are configured to hybridize to modified fragments obtained from the cfDNA molecules corresponding to or derived from at least 30%, 40%, 50%, 60%, 70%, 80%, 90% or 95% of the genomic regions in one or more of Tables 1 and 11-15.

In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one of the genomic regions of Table 13. In some embodiments, an entirety of entire probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 14.

In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 15.

In some embodiments, an entirety of probes on the panel together are configured to hybridize to modified fragments obtained from the cfDNA molecules corresponding to or derived from at least 500, 1,000, 5000, 10,000 or 15,000 genomic regions in in one or more of Tables 1 and 11-15. In some embodiments, an entirety of probes on the panel together are configured to hybridize to modified fragments obtained from the cfDNA molecules corresponding to or derived from at least 500, 1,000, 5000, 10,000 or 15,000 genomic regions in Table 13. In some embodiments, an entirety of probes on the panel together are configured to hybridize to modified fragments obtained from the cfDNA molecules corresponding to or derived from at least 500, 1,000, 5000, 10,000 or 15,000 genomic regions in Table 14. In some embodiments, an entirety of probes on the panel together are configured to hybridize to modified fragments obtained from the cfDNA molecules corresponding to or derived from at least 500, 1,000, 5000, 10,000 or 15,000 genomic regions in Table 15.

Further disclosed herein are assay panels for enriching cfDNA molecules for cancer diagnosis, comprising a plurality of polynucleotide probes, wherein each of the polynucleotide probes is configured to hybridize to a modified fragment obtained from processing of the cfDNA molecules, wherein each of the cfDNA molecules corresponds to or is derived from one or more genomic regions selected from any one of Tables 1-24.

In some embodiments, each of the cfDNA molecules corresponds to or is derived from one or more genomic regions selected from any one of Tables 2-10 or 16-24 (or a combination thereof). In some embodiments, each of the cfDNA molecules corresponds to or is derived from one or more genomic regions selected from any one of Tables 13, 14, or 15. In some embodiments, each of the cfDNA molecules corresponds to or is derived from one or more genomic regions selected from Table 13. In some embodiments, each of the cfDNA molecules corresponds to or is derived from one or more genomic regions selected from Table 14. In some embodiments, each of the cfDNA molecules corresponds to or is derived from one or more genomic regions selected from Table 15.

In some embodiments, an entirety of probes on the panel together are configured to hybridize to modified fragments obtained from the cfDNA molecules corresponding to or is derived from at least 30%, 40%, 50%, 60%, 70%, 80%, 90% or 95% of the genomic regions in any one of Tables 1-24. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in any one of Tables 2-10 or 16-24 (or combinations thereof). In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 13. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 14. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 15.

In some embodiments, an entirety of probes on the panel are configured to hybridize to modified fragments obtained from the cfDNA molecules corresponding to or derived from at least 50, 60, 70, 80, 90, 100, 120, 150, 200, 500, 1,000, 5000, 10,000 or 15,000 genomic regions in any one of Tables 1-24. In some embodiments, the entire probes on the panel are configured to hybridize to modified fragments obtained from the cfDNA molecules corresponding to or derived from at least 50, 60, 70, 80, 90, 100, 120, 150, or 200 genomic regions from any one of Tables 2-10 or 16-24.

In some embodiments, an entirety of probes on the panel are configured to hybridize to modified fragments obtained from the cfDNA molecules corresponding to or derived from at least 500, 1,000, 5000, 10,000 or 15,000 genomic regions in Table 13. In some embodiments, an entirety of probes on the panel are configured to hybridize to modified fragments obtained from the cfDNA molecules corresponding to or derived from at least 500, 1,000, 5000, 10,000 or 15,000 genomic regions in Table 14. In some embodiments, an entirety of probes on the panel are configured to hybridize to modified fragments obtained from the cfDNA molecules corresponding to or derived from at least 500, 1,000, 5000, 10,000 or 15,000 genomic regions in Table 15.

In some embodiments, the processing of the cfDNA molecules comprises converting unmethylated C (cytosine) to U (uracil) in the cfDNA molecules. In some embodiments, each of probes on the panel is conjugated to an affinity moiety, wherein the affinity moiety is not a nucleic acid affinity moiety. In some embodiments, the affinity moiety is a biotin moiety. In some embodiments, at least 3%, 5%, 10%, 15%, 20%, 30%, or 40% of the probes on the panel comprise no G (Guanine). In some embodiments, at least 80%, 85%, 90%, 92%, 95%, or 98% of the probes on the panel have exclusively either CpG or CpA on CpG detection sites.

Further disclosed herein are methods for providing sequence information informative of a presence or absence of cancer, comprising the steps of obtaining a test sample comprising a plurality of cfDNA test molecules; processing the cfDNA test molecules, thereby obtaining bisulfate-converted test fragments; contacting the bisulfate-converted test fragments with an assay panel, thereby enriching a subset of the bisulfate-converted test fragments by hybridization capture; and sequencing the subset of the bisulfate-converted test fragments, thereby obtaining a set of sequence reads. In some embodiments, the assay panel is selected from any of the panels described above.

In some embodiments, some methods further comprise the later step of: determining a cancer classification by evaluating the set of sequence reads, wherein the cancer classification is a presence or absence of cancer; a stage of cancer; a presence or absence of a type of cancer; or a presence or absence of at least 1, 2, 3, 4, or 5 different types of cancer.

In some embodiments, the assay panel comprises a plurality of polynucleotide probes, wherein each of the polynucleotide probes is configured to hybridize to a bisulfate-converted fragment obtained from processing of cfDNA molecules, wherein each of the cfDNA molecules corresponds to or is derived from one or more genomic regions selected from one of Tables 1, 12, 13, 14, and 15, wherein the cancer classification is a presence or absence of cancer or a stage of cancer. In some embodiments, the polynucleotide probes together are configured to hybridize to bisulfite-converted fragments obtained from the cfDNA molecules corresponding to or derived from at least 30%, 40%, 50%, 60%, 70%, 80%, 90% or 95% of the genomic regions in one of Tables 1, 12, 13, 14, and 15.

In some embodiments, wherein the assay panel comprises a plurality of polynucleotide probes, wherein each of the polynucleotide probes is configured to hybridize to a bisulfate-converted fragment obtained from processing of cfDNA molecules, wherein each of the cfDNA molecules corresponds to or is derived from one or more genomic regions selected from Table 2, wherein the cancer classification is a presence or absence of blood cancer or a stage of blood cancer. In some embodiments, the polynucleotide probes together are configured to hybridize to bisulfate-converted fragments obtained from the cfDNA molecules corresponding to or derived from at least 30%, 40%, 50%, 60%, 70%, 80%, 90% or 95% of the genomic regions in Table 2.

In some embodiments, the assay panel comprises a plurality of polynucleotide probes, wherein each of the polynucleotide probes is configured to hybridize to a bisulfate-converted fragment obtained from processing of cfDNA molecules, wherein each of the cfDNA molecules corresponds to or is derived from one or more genomic regions selected from Table 3, wherein the cancer classification is a presence or absence of breast cancer or a stage of breast cancer. In some embodiments, the polynucleotide probes together are configured to hybridize to bisulfate-converted fragments obtained from the cfDNA molecules corresponding to or derived from at least 30%, 40%, 50%, 60%, 70%, 80%, 90% or 95% of the genomic regions in Table 3.

In some embodiments, the assay panel comprises a plurality of polynucleotide probes, wherein each of the polynucleotide probes is configured to hybridize to a bisulfate-converted fragment obtained from processing of cfDNA molecules, wherein each of the cfDNA molecules corresponds to or is derived from one or more genomic regions selected from Table 4, wherein the cancer classification is a presence or absence of colorectal cancer or a stage of colorectal cancer. In some embodiments, the polynucleotide probes together are configured to hybridize to bisulfate-converted fragments obtained from the cfDNA molecules corresponding to or derived from at least 30%, 40%, 50%, 60%, 70%, 80%, 90% or 95% of the genomic regions in Table 4.

In some embodiments, the assay panel comprises a plurality of polynucleotide probes, wherein each of the polynucleotide probes is configured to hybridize to a bisulfite-converted fragment obtained from processing of cfDNA molecules, wherein each of the cfDNA molecules corresponds to or is derived from one or more genomic regions selected from Table 5, wherein the cancer classification is a presence or absence of esophageal cancer or a stage of esophageal cancer. In some embodiments, the polynucleotide probes together are configured to hybridize to bisulfite-converted fragments obtained from the cfDNA molecules corresponding to or derived from at least 30%, 40%, 50%, 60%, 70%, 80%, 90% or 95% of the genomic regions in Table 5.

In some embodiments, the assay panel comprises a plurality of polynucleotide probes, wherein each of the polynucleotide probes is configured to hybridize to a bisulfate-converted fragment obtained from processing of cfDNA molecules, wherein each of the cfDNA molecules corresponds to or is derived from one or more genomic regions selected from Table 6, wherein the cancer classification is a presence or absence of head and neck cancer or a stage of head and neck cancer. In some embodiments, the polynucleotide probes together are configured to hybridize to bisulfate-converted fragments obtained from the cfDNA molecules corresponding to or derived from at least 30%, 40%, 50%, 60%, 70%, 80%, 90% or 95% of the genomic regions in Table 6.

In some embodiments, the assay panel comprises a plurality of polynucleotide probes, wherein each of the polynucleotide probes is configured to hybridize to a bisulfate-converted fragment obtained from processing of cfDNA molecules, wherein each of the cfDNA molecules corresponds to or is derived from one or more genomic regions selected from Table 7, wherein the cancer classification is a presence or absence of hepatobiliary cancer or a stage of hepatobiliary cancer. In some embodiments, the polynucleotide probes together are configured to hybridize to bisulfate-converted fragments obtained from the cfDNA molecules corresponding to or derived from at least 30%, 40%, 50%, 60%, 70%, 80%, 90% or 95% of the genomic regions in Table 7.

In some embodiments, the assay panel comprises a plurality of polynucleotide probes, wherein each of the polynucleotide probes is configured to hybridize to a bisulfate-converted fragment obtained from processing of cfDNA molecules, wherein each of the cfDNA molecules corresponds to or is derived from one or more genomic regions selected from Table 8, wherein the cancer classification is a presence or absence of lung cancer or a stage of lung cancer. In some embodiments, the polynucleotide probes together are configured to hybridize to bisulfite-converted fragments obtained from the cfDNA molecules corresponding to or derived from at least 30%, 40%, 50%, 60%, 70%, 80%, 90% or 95% of the genomic regions in Table 8.

In some embodiments, the assay panel comprises a plurality of polynucleotide probes, wherein each of the polynucleotide probes is configured to hybridize to a bisulfite-converted fragment obtained from processing of cfDNA molecules, wherein each of the cfDNA molecules corresponds to or is derived from one or more genomic regions selected from Table 9, wherein the cancer classification is a presence or absence of ovarian cancer or a stage of ovarian cancer. In some embodiments, the polynucleotide probes together are configured to hybridize to bisulfite-converted fragments obtained from the cfDNA molecules corresponding to or derived from at least 30%, 40%, 50%, 60%, 70%, 80%, 90% or 95% of the genomic regions in Table 9.

In some embodiments, the assay panel comprises a plurality of polynucleotide probes, wherein each of the polynucleotide probes is configured to hybridize to a bisulfate-converted fragment obtained from processing of cfDNA molecules, wherein each of the cfDNA molecules corresponds to or is derived from one or more genomic regions selected from Table 10, wherein the cancer classification is a presence or absence of pancreatic cancer or a stage of pancreatic cancer. In some embodiments, the polynucleotide probes together are configured to hybridize to bisulfate-converted fragments obtained from the cfDNA molecules corresponding to or derived from at least 30%, 40%, 50%, 60%, 70%, 80%, 90% or 95% of the genomic regions in Table 10.

In some embodiments, wherein the assay panel comprises a plurality of polynucleotide probes, wherein each of the polynucleotide probes is configured to hybridize to a bisulfate-converted fragment obtained from processing of cfDNA molecules, wherein each of the cfDNA molecules corresponds to or is derived from one or more genomic regions selected from Table 16, wherein the cancer classification is a presence or absence of blood cancer or a stage of blood cancer. In some embodiments, the polynucleotide probes together are configured to hybridize to bisulfate-converted fragments obtained from the cfDNA molecules corresponding to or derived from at least 30%, 40%, 50%, 60%, 70%, 80%, 90% or 95% of the genomic regions in Table 16.

In some embodiments, the assay panel comprises a plurality of polynucleotide probes, wherein each of the polynucleotide probes is configured to hybridize to a bisulfate-converted fragment obtained from processing of cfDNA molecules, wherein each of the cfDNA molecules corresponds to or is derived from one or more genomic regions selected from Table 17, wherein the cancer classification is a presence or absence of breast cancer or a stage of breast cancer. In some embodiments, the polynucleotide probes together are configured to hybridize to bisulfate-converted fragments obtained from the cfDNA molecules corresponding to or derived from at least 30%, 40%, 50%, 60%, 70%, 80%, 90% or 95% of the genomic regions in Table 17.

In some embodiments, the assay panel comprises a plurality of polynucleotide probes, wherein each of the polynucleotide probes is configured to hybridize to a bisulfate-converted fragment obtained from processing of cfDNA molecules, wherein each of the cfDNA molecules corresponds to or is derived from one or more genomic regions selected from Table 18, wherein the cancer classification is a presence or absence of colorectal cancer or a stage of colorectal cancer. In some embodiments, the polynucleotide probes together are configured to hybridize to bisulfate-converted fragments obtained from the cfDNA molecules corresponding to or derived from at least 30%, 40%, 50%, 60%, 70%, 80%, 90% or 95% of the genomic regions in Table 18.

In some embodiments, the assay panel comprises a plurality of polynucleotide probes, wherein each of the polynucleotide probes is configured to hybridize to a bisulfate-converted fragment obtained from processing of cfDNA molecules, wherein each of the cfDNA molecules corresponds to or is derived from one or more genomic regions selected from Table 19, wherein the cancer classification is a presence or absence of esophageal cancer or a stage of esophageal cancer. In some embodiments, the polynucleotide probes together are configured to hybridize to bisulfate-converted fragments obtained from the cfDNA molecules corresponding to or derived from at least 30%, 40%, 50%, 60%, 70%, 80%, 90% or 95% of the genomic regions in Table 19.

In some embodiments, the assay panel comprises a plurality of polynucleotide probes, wherein each of the polynucleotide probes is configured to hybridize to a bisulfate-converted fragment obtained from processing of cfDNA molecules, wherein each of the cfDNA molecules corresponds to or is derived from one or more genomic regions selected from Table 20, wherein the cancer classification is a presence or absence of head and neck cancer or a stage of head and neck cancer. In some embodiments, the polynucleotide probes together are configured to hybridize to bisulfate-converted fragments obtained from the cfDNA molecules corresponding to or derived from at least 30%, 40%, 50%, 60%, 70%, 80%, 90% or 95% of the genomic regions in Table 20.

In some embodiments, the assay panel comprises a plurality of polynucleotide probes, wherein each of the polynucleotide probes is configured to hybridize to a bisulfite-converted fragment obtained from processing of cfDNA molecules, wherein each of the cfDNA molecules corresponds to or is derived from one or more genomic regions selected from Table 21, wherein the cancer classification is a presence or absence of hepatobiliary cancer or a stage of hepatobiliary cancer. In some embodiments, the polynucleotide probes together are configured to hybridize to bisulfate-converted fragments obtained from the cfDNA molecules corresponding to or derived from at least 30%, 40%, 50%, 60%, 70%, 80%, 90% or 95% of the genomic regions in Table 21.

In some embodiments, the assay panel comprises a plurality of polynucleotide probes, wherein each of the polynucleotide probes is configured to hybridize to a bisulfate-converted fragment obtained from processing of cfDNA molecules, wherein each of the cfDNA molecules corresponds to or is derived from one or more genomic regions selected from Table 22, wherein the cancer classification is a presence or absence of lung cancer or a stage of lung cancer. In some embodiments, the polynucleotide probes together are configured to hybridize to bisulfate-converted fragments obtained from the cfDNA molecules corresponding to or derived from at least 30%, 40%, 50%, 60%, 70%, 80%, 90% or 95% of the genomic regions in Table 22.

In some embodiments, the assay panel comprises a plurality of polynucleotide probes, wherein each of the polynucleotide probes is configured to hybridize to a bisulfate-converted fragment obtained from processing of cfDNA molecules, wherein each of the cfDNA molecules corresponds to or is derived from one or more genomic regions selected from Table 23, wherein the cancer classification is a presence or absence of ovarian cancer or a stage of ovarian cancer. In some embodiments, the polynucleotide probes together are configured to hybridize to bisulfate-converted fragments obtained from the cfDNA molecules corresponding to or derived from at least 30%, 40%, 50%, 60%, 70%, 80%, 90% or 95% of the genomic regions in Table 23.

In some embodiments, the assay panel comprises a plurality of polynucleotide probes, wherein each of the polynucleotide probes is configured to hybridize to a bisulfate-converted fragment obtained from processing of cfDNA molecules, wherein each of the cfDNA molecules corresponds to or is derived from one or more genomic regions selected from Table 24, wherein the cancer classification is a presence or absence of pancreatic cancer or a stage of pancreatic cancer. In some embodiments, the polynucleotide probes together are configured to hybridize to bisulfate-converted fragments obtained from the cfDNA molecules corresponding to or derived from at least 30%, 40%, 50%, 60%, 70%, 80%, 90% or 95% of the genomic regions in Table 24.

In some embodiments, the step of determining a cancer classification is performed by the method comprising generating a test feature vector based on the set of sequence reads; and applying the test feature vector to a model obtained by a training process with a cancer set of fragments from one or more training subjects with cancer and a non-cancer set of fragments from one or more training subjects without cancer, wherein both cancer set of fragments and the non-cancer set of fragments comprise a plurality of training fragments.

In some embodiments, the training process comprises obtaining sequence information of training fragments from a plurality of training subjects; for each training fragment, determining whether that training fragment is hypomethylated or hypermethylated, wherein each of the hypomethylated and hypermethylated training fragments comprises at least a threshold number of CpG sites with at least a threshold percentage of the CpG sites being unmethylated or methylated, respectively, for each training subject, generating a training feature vector based on the hypomethylated training fragments and a training feature vector based on the hypermethylated training fragments, and training the model with the training feature vectors from the one or more training subjects without cancer and the training feature vectors from the one or more training subjects with cancer.

In some embodiments, the training process comprises obtaining sequence information of training fragments from a plurality of training subjects; for each training fragment, determining whether that training fragment is hypomethylated or hypermethylated, wherein each of the hypomethylated and hypermethylated training fragments comprises at least a threshold number of CpG sites with at least a threshold percentage of the CpG sites being unmethylated or methylated, respectively, for each training subject, generating a training feature vector based on the hypomethylated training fragments and a training feature vector based on the hypermethylated training fragments, and training the model with the training feature vectors from the one or more training subjects without cancer and the training feature vectors from the one or more training subjects with cancer.

In some embodiments, the training process comprises obtaining sequence information of training fragments from a plurality of training subjects; for each training fragment, determining whether that training fragment is hypomethylated or hypermethylated, wherein each of the hypomethylated and hypermethylated training fragments comprises at least a threshold number of CpG sites with at least a threshold percentage of the CpG sites being unmethylated or methylated, respectively, for each of a plurality of CpG sites in a reference genome: quantifying a count of hypomethylated training fragments which overlap the CpG site and a count of hypermethylated training fragments which overlap the CpG site; and generating a hypomethylation score and a hypermethylation score based on the count of hypomethylated training fragments and hypermethylated training fragments; for each training fragment, generating an aggregate hypomethylation score based on the hypomethylation score of the CpG sites in the training fragment and an aggregate hypermethylation score based on the hypermethylation score of the CpG sites in the training fragment; for each training subject: ranking the plurality of training fragments based on aggregate hypomethylation score and ranking the plurality of training fragments based on aggregate hypermethylation score; and generating a feature vector based on the ranking of the training fragments; obtaining training feature vectors for one or more training subjects without cancer and training feature vectors for the one or more training subjects with cancer; and training the model with the feature vectors for the one or more training subjects without cancer and the feature vectors for the one or more training subjects with cancer. In some embodiments, the model comprises one of a kernel logistic regression classifier, a random forest classifier, a mixture model, a convolutional neural network, and an autoencoder model.

In some embodiments, the methods further comprises obtaining a cancer probability for the test sample based on the model; and comparing the cancer probability to a threshold probability to determine whether the test sample is from a subject with cancer or without cancer. In some embodiments, the methods further comprising administering an anti-cancer agent to the subject. In some embodiments, the methods comprise administering an anti-cancer agent to a subject who has been identified as a cancer subject by the methods disclosed herein. In some embodiments, the anti-cancer agent is a chemotherapeutic agent selected from the group consisting of alkylating agents, antimetabolites, anthracyclines, anti-tumor antibiotics, cytoskeletal disruptors (taxans), topoisomerase inhibitors, mitotic inhibitors, corticosteroids, kinase inhibitors, nucleotide analogs, and platinum-based agents.

Further disclosed herein are methods comprising obtaining a set of sequence reads of modified test fragments, wherein the modified test fragments are or have been obtained by processing a set of nucleic acid fragments from a test subject, wherein each of the nucleic acid fragments corresponds to or is derived from a plurality of genomic regions selected from one of Tables 1-24; and applying the set of sequence reads or a test feature vector obtained based on the set of sequence reads to a model obtained by a training process with a cancer set of fragments from one or more training subjects with cancer and a non-cancer set of fragments from one or more training subjects without cancer, wherein both cancer set of fragments and the non-cancer set of fragments comprise a plurality of training fragments.

In some embodiments, the methods further comprise the step of obtaining the test feature vector comprising: for each of the nucleic acid fragments, determining whether the nucleic acid fragment is hypomethylated or hypermethylated, wherein each of the hypomethylated and hypermethylated nucleic acid fragments comprises at least a threshold number of CpG sites with at least a threshold percentage of the CpG sites being unmethylated or methylated, respectively; for each of a plurality of CpG sites in a reference genome: quantifying a count of hypomethylated nucleic acid fragments which overlap the CpG site and a count of hypermethylated nucleic acid fragments which overlap the CpG site; and generating a hypomethylation score and a hypermethylation score based on the count of hypomethylated nucleic acid fragments and hypermethylated nucleic acid fragments; for each nucleic acid fragment, generating an aggregate hypomethylation score based on the hypomethylation score of the CpG sites in the nucleic acid fragment and an aggregate hypermethylation score based on the hypermethylation score of the CpG sites in the nucleic acid fragment; ranking the plurality of nucleic acid fragments based on aggregate hypomethylation score and ranking the plurality of nucleic acid fragments based on aggregate hypermethylation score; and generating the test feature vector based on the ranking of the nucleic acid fragments.

In some embodiments, the training process comprises: for each training fragment, determining whether that training fragment is hypomethylated or hypermethylated, wherein each of the hypomethylated and hypermethylated training fragments comprises at least a threshold number of CpG sites with at least a threshold percentage of the CpG sites being unmethylated or methylated, respectively, for each training subject, generating a training feature vector based on the hypomethylated training fragments and a training feature vector based on the hypermethylated training fragments, and training the model with the training feature vectors from the one or more training subjects without cancer and the feature vectors from the one or more training subjects with cancer.

In some embodiments, the training process comprises: for each training fragment, determining whether that training fragment is hypomethylated or hypermethylated, wherein each of the hypomethylated and hypermethylated training fragments comprises at least a threshold number of CpG sites with at least a threshold percentage of the CpG sites being unmethylated or methylated, respectively, for each of a plurality of CpG sites in a reference genome: quantifying a count of hypomethylated training fragments which overlap the CpG site and a count of hypermethylated training fragments which overlap the CpG site; and generating a hypomethylation score and a hypermethylation score based on the count of hypomethylated training fragments and hypermethylated training fragments; for each training fragment, generating an aggregate hypomethylation score based on the hypomethylation score of the CpG sites in the training fragment and an aggregate hypermethylation score based on the hypermethylation score of the CpG sites in the training fragment; for each training subject: ranking the plurality of training fragments based on aggregate hypomethylation score and ranking the plurality of training fragments based on aggregate hypermethylation score; and generating a feature vector based on the ranking of the training fragments; obtaining training feature vectors for one or more training subjects without cancer and training feature vectors for the one or more training subjects with cancer; and training the model with the feature vectors for the one or more training subjects without cancer and the feature vectors for the one or more training subjects with cancer.

In some embodiments, for each CpG site in a reference genome, the methods comprise quantifying a count of hypomethylated training fragments which overlap that CpG site and a count of hypermethylated training fragments which overlap that CpG site further comprises: quantifying a cancer count of hypomethylated training fragments from the one or more training subjects with cancer that overlap that CpG site and a non-cancer count of hypomethylated training fragments from the one or more training subjects without cancer that overlap that CpG site; and quantifying a cancer count of hypermethylated training fragments from the one or more training subjects with cancer that overlap that CpG site and a non-cancer count of hypermethylated training fragments from the one or more training subjects without cancer that overlap that CpG site.

In some embodiments, for each CpG site in a reference genome, the methods comprise generating a hypomethylation score and a hypermethylation score based on the count of hypomethylated training fragments and hypermethylated training fragments further comprises: for generating the hypomethylation score, calculating a hypomethylation ratio of the cancer count of hypomethylated training fragments over a hypomethylation sum of the cancer count of hypomethylated training fragments and the non-cancer count of hypomethylated training fragments; and for generating the hypermethylation score, calculating a hypermethylation ratio of the cancer count of hypermethylated training fragments over a hypermethylation sum of the cancer count of hypermethylated training fragments and the non-cancer count of hypermethylated training fragments.

In some embodiments, the model comprises one of a kernel logistic regression classifier, a random forest classifier, a mixture model, a convolutional neural network, and an autoencoder model. In some embodiments, the set of sequence reads is obtained by using the assay panel of any one of the described panels above.

Further disclosed herein are methods for designing an assay panel for cancer diagnosis, comprising the steps of: identifying a plurality of genomic regions, wherein each of the plurality of genomic regions (i) comprises at least 30 nucleotides, and (ii) comprises at least five methylation sites, selecting a subset of the genomic regions, wherein the selection is made when cfDNA molecules corresponding to, or derived from each of the genomic regions in cancer training samples have an anomalous methylation pattern, wherein the anomalous methylation pattern comprises at least five methylation sites known to be, or identified as either hypomethylated or hypermethylated, and designing the assay panel comprising a plurality of probes, wherein each of the probes is configured to hybridize to a modified fragment obtained from processing cfDNA molecules corresponding to, or derived from one or more of the subset of the genomic regions. In some embodiments, the processing of the cfDNA molecules comprises converting unmethylated C (cytosine) to U (uracil) in the cfDNA molecules.

Further disclosed herein are bait sets for hybridization capture, the bait set comprising at least 50 different polynucleotide-containing probes, wherein each of the polynucleotide-containing probes has a nucleic acid sequence that is either (1) identical in sequence to a sequence within a genomic region selected from any genomic region listed in any one of Tables 1-24 or (2) varies with respect to a sequence within the genomic region only by one or more transitions, wherein each respective transition in the one or more transitions occurs at a nucleotide corresponding to a CpG site in the genomic region.

In some embodiments, each of the polynucleotide-containing probes has a nucleic acid sequence of at least 45 base pairs in length. In some embodiments, the polynucleotide-containing probes have a nucleic acid sequence of no more than 200 base pairs in length. In some embodiments, the at least 50 different polynucleotide-containing probes are organized into at least 25 pairs of polynucleotide-containing probes, wherein each pair of probes comprises a first probe and a second probe that differs from the first probe, wherein the first probe overlaps in sequence with the second probe by at least 30 nucleotides. In some embodiments, the first probe overlaps in sequence with the second probe by at least 40, 50, 75, or 100 nucleotides.

In some embodiments, the polynucleotide-containing probes are organized into at least 50, 60, 70, 80, 90, 100, 120, 150, or 200 pairs of polynucleotide containing probes. In some embodiments, the polynucleotide-containing probes are organized into at least 1,000, 2,000, 2,500, 5,000, 6,000, 7,500, 10,000, 15,000, 20,000, or 25,000 pairs of polynucleotide containing probes. In some embodiments, a uracil or thymine is positioned at the transition. In some embodiments, each of the polynucleotide-containing probes is conjugated to an affinity moiety, wherein the affinity moiety is not a nucleic acid affinity moiety. In some embodiments, the affinity moiety comprises biotin. In some embodiments, each of the polynucleotide-containing probes comprises less than 20, 15, 10, 8, or 6 CpG detection sites. In some embodiments, the bait set has no probes that are homologous to or complementary in sequence with more than 8, 10, 15, or 20 off-target genomic regions.

In some embodiments, the bait set has at least 50, 60, 70, 80, 90, 100, 120, 150, or 200 polynucleotide-containing probes. In some embodiments, the bait set has at least 1,000, 2,000, 2,500, 5,000, 10,000, 12,000, 15,000, 20,000, or 25,000 polynucleotide-containing probes. In some embodiments, at least 3%, 5%, 10%, 15%, 20%, 30%, or 40% of all of the polynucleotide-containing probes in the bait set lack G (Guanine). In some embodiments, the polynucleotide-containing probes together comprise at least 0.01 million, 0.02 million, 0.05 million, 0.2 million, 0.4 million, 0.6 million, 0.8 million, 1 million, 2 million, or 4 million nucleotides. In some embodiments, each probe of the plurality of polynucleotide probes comprises at least 50, 75, 100, or 120 nucleotides. In some embodiments, each probe of the plurality of polynucleotide probes has less than 300, 250, 200, or 150 nucleotides. In some embodiments, each probe of the plurality of polynucleotide probes has from 100 to 150 nucleotides.

In some embodiments, at least 80%, 85%, 90%, 92%, 95%, or 98% of the plurality of polynucleotide-containing probes have exclusively either CpG or CpA on CpG detection sites. In some embodiments, the polynucleotide-containing probes of the bait set correspond with a total number of genomic regions selected from the genomic regions of any one of Tables 1-24, wherein at least 30% of the genomic regions are in exons or introns. In some embodiments, the polynucleotide-containing probes of the bait set correspond with a total number of genomic regions, wherein at least 15% of the genomic regions are in exons. In some embodiments, the polynucleotide-containing probes of the bait set correspond with a total number of genomic regions, wherein at least 20% of the genomic regions are in exons. In some embodiments, the polynucleotide-containing probes of the bait set correspond with a total number of genomic regions, wherein less than 10% of the genomic regions are intergenic regions.

In some embodiments, the bait sets further comprise a plurality of virus-specific probes, wherein each of the virus-specific probes is configured to hybridize to a viral genome fragment. In some embodiments, the viral genome fragment is from MCV, EBV, HBV, HCMV, HCV, HHV5, HPV16, or HPV18. In some embodiments, the plurality of virus-specific probes comprises at least 50, 100, 200, 500, 1,000, 2,000, or 3,000 virus-specific probes. In some embodiments, each of the plurality of polynucleotide-containing probes either (1) is identical in sequence to a sequence within a genomic region selected from Table 2 or (2) varies with respect to a sequence within a genomic region selected from Table 2 only by one or more transitions, wherein each respective transition of the one or more transitions occurs at a nucleotide corresponding to a CpG site in the genomic region.

In some embodiments, each of the plurality of polynucleotide-containing probes either (1) is identical in sequence to a sequence within a genomic region selected from Table 3 or (2) varies with respect to a sequence within a genomic region selected from Table 3 only by one or more transitions, wherein each respective transition of the one or more transitions occurs at a nucleotide corresponding to a CpG site in the genomic region. In some embodiments, each of the plurality of polynucleotide-containing probes either (1) is identical in sequence to a sequence within a genomic region selected from Table 4 or (2) varies with respect to a sequence within a genomic region selected from Table 4 only by one or more transitions, wherein each respective transition of the one or more transitions occurs at a nucleotide corresponding to a CpG site in the genomic region.

In some embodiments, each of the plurality of polynucleotide-containing probes either (1) is identical in sequence to a sequence within a genomic region selected from Table 5 or (2) varies with respect to a sequence within a genomic region selected from Table 5 only by one or more transitions, wherein each respective transition of the one or more transitions occurs at a nucleotide corresponding to a CpG site in the genomic region. In some embodiments, each of the plurality of polynucleotide-containing probes either (1) is identical in sequence to a sequence within a genomic region selected from Table 6 or (2) varies with respect to a sequence within a genomic region selected from Table 6 only by one or more transitions, wherein each respective transition of the one or more transitions occurs at a nucleotide corresponding to a CpG site in the genomic region.

In some embodiments, each of the plurality of polynucleotide-containing probes either (1) is identical in sequence to a sequence within a genomic region selected from Table 7 or (2) varies with respect to a sequence within a genomic region selected from Table 7 only by one or more transitions, wherein each respective transition of the one or more transitions occurs at a nucleotide corresponding to a CpG site in the genomic region. In some embodiments, each of the plurality of polynucleotide-containing probes either (1) is identical in sequence to a sequence within a genomic region selected from Table 8 or (2) varies with respect to a sequence within a genomic region selected from Table 8 only by one or more transitions, wherein each respective transition of the one or more transitions occurs at a nucleotide corresponding to a CpG site in the genomic region.

In some embodiments, each of the plurality of polynucleotide-containing probes either (1) is identical in sequence to a sequence within a genomic region selected from Table 9 or (2) varies with respect to a sequence within a genomic region selected from Table 9 only by one or more transitions, wherein each respective transition of the one or more transitions occurs at a nucleotide corresponding to a CpG site in the genomic region. In some embodiments, each of the plurality of polynucleotide-containing probes either (1) is identical in sequence to a sequence within a genomic region selected from Table 10 or (2) varies with respect to a sequence within a genomic region selected from Table 10 only by one or more transitions, wherein each respective transition of the one or more transitions occurs at a nucleotide corresponding to a CpG site in the genomic region.

In some embodiments, each of the plurality of polynucleotide-containing probes either (1) is identical in sequence to a sequence within a genomic region selected from any one of Tables 2-10 or (2) varies with respect to a sequence within a genomic region selected from any one of Tables 2-10 only by one or more transitions, wherein each respective transition of the one or more transitions occurs at a nucleotide corresponding to a CpG site in the genomic region. In some embodiments, each of the plurality of polynucleotide-containing probes either (1) is identical in sequence to a sequence within a genomic region selected from Table 11 or (2) varies with respect to a sequence within a genomic region selected from Table 11 only by one or more transitions, wherein each respective transition of the one or more transitions occurs at a nucleotide corresponding to a CpG site in the genomic region.

In some embodiments, each of the plurality of polynucleotide-containing probes either (1) is identical in sequence to a sequence within a genomic region selected from Table 12 or (2) varies with respect to a sequence within a genomic region selected from Table 12 only by one or more transitions, wherein each respective transition of the one or more transitions occurs at a nucleotide corresponding to a CpG site in the genomic region. In some embodiments, each of the plurality of polynucleotide-containing probes either (1) is identical in sequence to a sequence within a genomic region selected from Table 13 or (2) varies with respect to a sequence within a genomic region selected from Table 13 only by one or more transitions, wherein each respective transition of the one or more transitions occurs at a nucleotide corresponding to a CpG site in the genomic region.

In some embodiments, each of the plurality of polynucleotide-containing probes either (1) is identical in sequence to a sequence within a genomic region selected from Table 14 or (2) varies with respect to a sequence within a genomic region selected from Table 114 only by one or more transitions, wherein each respective transition of the one or more transitions occurs at a nucleotide corresponding to a CpG site in the genomic region. In some embodiments, each of the plurality of polynucleotide-containing probes either (1) is identical in sequence to a sequence within a genomic region selected from Table 15 or (2) varies with respect to a sequence within a genomic region selected from Table 15 only by one or more transitions, wherein each respective transition of the one or more transitions occurs at a nucleotide corresponding to a CpG site in the genomic region.

In some embodiments, each of the plurality of polynucleotide-containing probes either (1) is identical in sequence to a sequence within a genomic region selected from Table 16 or (2) varies with respect to a sequence within a genomic region selected from Table 16 only by one or more transitions, wherein each respective transition of the one or more transitions occurs at a nucleotide corresponding to a CpG site in the genomic region. In some embodiments, each of the plurality of polynucleotide-containing probes either (1) is identical in sequence to a sequence within a genomic region selected from Table 17 or (2) varies with respect to a sequence within a genomic region selected from Table 17 only by one or more transitions, wherein each respective transition of the one or more transitions occurs at a nucleotide corresponding to a CpG site in the genomic region. In some embodiments, each of the plurality of polynucleotide-containing probes either (1) is identical in sequence to a sequence within a genomic region selected from Table 18 or (2) varies with respect to a sequence within a genomic region selected from Table 18 only by one or more transitions, wherein each respective transition of the one or more transitions occurs at a nucleotide corresponding to a CpG site in the genomic region.

In some embodiments, each of the plurality of polynucleotide-containing probes either (1) is identical in sequence to a sequence within a genomic region selected from Table 19 or (2) varies with respect to a sequence within a genomic region selected from Table 19 only by one or more transitions, wherein each respective transition of the one or more transitions occurs at a nucleotide corresponding to a CpG site in the genomic region. In some embodiments, each of the plurality of polynucleotide-containing probes either (1) is identical in sequence to a sequence within a genomic region selected from Table 20 or (2) varies with respect to a sequence within a genomic region selected from Table 20 only by one or more transitions, wherein each respective transition of the one or more transitions occurs at a nucleotide corresponding to a CpG site in the genomic region.

In some embodiments, each of the plurality of polynucleotide-containing probes either (1) is identical in sequence to a sequence within a genomic region selected from Table 21 or (2) varies with respect to a sequence within a genomic region selected from Table 21 only by one or more transitions, wherein each respective transition of the one or more transitions occurs at a nucleotide corresponding to a CpG site in the genomic region. In some embodiments, each of the plurality of polynucleotide-containing probes either (1) is identical in sequence to a sequence within a genomic region selected from Table 22 or (2) varies with respect to a sequence within a genomic region selected from Table 22 only by one or more transitions, wherein each respective transition of the one or more transitions occurs at a nucleotide corresponding to a CpG site in the genomic region.

In some embodiments, each of the plurality of polynucleotide-containing probes either (1) is identical in sequence to a sequence within a genomic region selected from Table 23 or (2) varies with respect to a sequence within a genomic region selected from Table 23 only by one or more transitions, wherein each respective transition of the one or more transitions occurs at a nucleotide corresponding to a CpG site in the genomic region. In some embodiments, each of the plurality of polynucleotide-containing probes either (1) is identical in sequence to a sequence within a genomic region selected from Table 24 or (2) varies with respect to a sequence within a genomic region selected from Table 24 only by one or more transitions, wherein each respective transition of the one or more transitions occurs at a nucleotide corresponding to a CpG site in the genomic region.

In some embodiments, an entirety of polynucleotide probes in the bait set are configured to hybridize to fragments obtained from cfDNA molecules corresponding to at least 30%, 40%, 50%, 60%, 70%, 80%, 90% or 95% of the genomic regions in a table selected from any one of Tables 1-24. In some embodiments, an entirety of polynucleotide-containing probes in the bait set are configured to hybridize to fragments obtained from cfDNA molecules corresponding to at least 30%, 40%, 50%, 60%, 70%, 80%, 90% or 95% of the genomic regions in any one of Tables 2-10 or 16-24. In some embodiments, an entirety of polynucleotide-containing probes in the bait set are configured to hybridize to fragments obtained from cfDNA molecules corresponding to at least 500, 1,000, 5000, 10,000 or 15,000 genomic regions in any one of Tables 1-24. In some embodiments, an entirety of polynucleotide-containing probes in the bait set are configured to hybridize to fragments obtained from cfDNA molecules corresponding to at least 50, 60, 70, 80, 90, 100, 120, 150, or 200 genomic regions in any one of Tables 2-10 or 16-24. In some embodiments, the nucleic acid sequence of each of the polynucleotide-containing probes varies with respect to a sequence within the genomic region only by one or more transitions, wherein each respective transition of the one or more transitions occurs at a nucleotide corresponding to a CpG site in the genomic region.

Further disclosed herein are mixtures comprising bisulfate-converted cell-free DNA and the bait set of any one of the bait sets described above.

Moreover, disclosed herein are methods for enriching a bisulfite-converted cell-free DNA sample, comprising contacting the bisulfite-converted cell-free DNA sample with the bait set to form a mixture; and enriching the sample for a first set of genomic regions by hybridization capture.

Further disclosed herein are methods for providing sequence information informative of a presence or absence of a cancer, a stage of cancer, or a type of cancer, comprising processing cell-free DNA from a biological sample with a deaminating agent to generate a cell-free DNA sample comprising deaminated nucleotides; and enriching the cell-free DNA sample for informative cell-free DNA molecules, wherein enriching the cell-free DNA sample informative cell-free DNA molecules comprises contacting the cell-free DNA with a plurality of probes that are configured to hybridize to cell-free DNA molecules that correspond to regions identified in any one of Tables 1-24; and sequencing the enriched cell-free DNA molecules, thereby obtaining a set of sequence reads informative of a presence or absence of a cancer, a stage of cancer, or a type of cancer.

In some embodiments, the plurality of probes comprise a plurality of primers, and enriching the cell-free DNA comprises amplifying (e.g., via PCR) the cell-free DNA fragments using the primers (optionally in the absence of hybridization capture). In some embodiments, the cell-free DNA sample is enriched by any suitable method described herein and the plurality of probes comprise the plurality of polynucleotide-containing probes.

In some embodiments, the methods further comprise the later step of: determining a cancer classification by evaluating the set of sequence reads, wherein the cancer classification is a presence or absence of cancer; a stage of cancer; a presence or absence of a type of cancer; or a presence or absence of at least 1, 2, 3, 4, or 5 different types of cancer.

In some embodiments, the plurality of probes are configured to hybridize to bisulfite-converted fragments obtained from processing of cfDNA molecules, wherein each of the cfDNA molecules corresponds to or is derived from one or more genomic regions selected from one of Tables 1, 11, 12, 13, 14, or 15, wherein the cancer classification is a presence or absence of cancer or a stage of cancer. In some embodiments, the plurality of probes are configured to hybridize to bisulfate-converted fragments obtained from the cfDNA molecules corresponding to or derived from at least 30%, 40%, 50%, 60%, 70%, 80%, 90% or 95% of the genomic regions in one of Tables 1, 11, 12, 13, 14, or 15.

In some embodiments, the plurality of probes are configured to hybridize to bisulfite-converted fragments obtained from processing of cfDNA molecules, wherein each of the cfDNA molecules corresponds to or is derived from one or more genomic regions selected from Table 2, wherein the cancer classification is a presence or absence of blood cancer or a stage of blood cancer. In some embodiments, the plurality of probes are configured to hybridize to bisulfate-converted fragments obtained from the cfDNA molecules corresponding to or derived from at least 30%, 40%, 50%, 60%, 70%, 80%, 90% or 95% of the genomic regions in Table 2.

In some embodiments, the plurality of probes are configured to hybridize to bisulfite-converted fragments obtained from processing of cfDNA molecules, wherein each of the cfDNA molecules corresponds to or is derived from one or more genomic regions selected from Table 3, wherein the cancer classification is a presence or absence of breast cancer or a stage of breast cancer. In some embodiments, the plurality of probes are configured to hybridize to bisulfate-converted fragments obtained from the cfDNA molecules corresponding to or derived from at least 30%, 40%, 50%, 60%, 70%, 80%, 90% or 95% of the genomic regions in Table 3.

In some embodiments, the plurality of probes are configured to hybridize to bisulfite-converted fragments obtained from processing of cfDNA molecules, wherein each of the cfDNA molecules corresponds to or is derived from one or more genomic regions selected from Table 4, wherein the cancer classification is a presence or absence of colorectal cancer or a stage of colorectal cancer. In some embodiments, the plurality of probes are configured to hybridize to bisulfate-converted fragments obtained from the cfDNA molecules corresponding to or derived from at least 30%, 40%, 50%, 60%, 70%, 80%, 90% or 95% of the genomic regions in Table 4.

In some embodiments, the plurality of probes are configured to hybridize to bisulfite-converted fragments obtained from processing of cfDNA molecules, wherein each of the cfDNA molecules corresponds to or is derived from one or more genomic regions selected from Table 5, wherein the cancer classification is a presence or absence of esophageal cancer or a stage of esophageal cancer. In some embodiments, the plurality of probes are configured to hybridize to bisulfate-converted fragments obtained from the cfDNA molecules corresponding to or derived from at least 30%, 40%, 50%, 60%, 70%, 80%, 90% or 95% of the genomic regions in Table 5.

In some embodiments, the plurality of probes are configured to hybridize to bisulfite-converted fragments obtained from processing of cfDNA molecules, wherein each of the cfDNA molecules corresponds to or is derived from one or more genomic regions selected from Table 6, wherein the cancer classification is a presence or absence of head and neck cancer or a stage of head and neck cancer. In some embodiments, the plurality of probes are configured to hybridize to bisulfate-converted fragments obtained from the cfDNA molecules corresponding to or derived from at least 30%, 40%, 50%, 60%, 70%, 80%, 90% or 95% of the genomic regions in Table 6.

In some embodiments, the plurality of probes are configured to hybridize to bisulfite-converted fragments obtained from processing of cfDNA molecules, wherein each of the cfDNA molecules corresponds to or is derived from one or more genomic regions selected from Table 7, wherein the cancer classification is a presence or absence of hepatobiliary cancer or a stage of hepatobiliary cancer. In some embodiments, the plurality of probes are configured to hybridize to bisulfate-converted fragments obtained from the cfDNA molecules corresponding to or derived from at least 30%, 40%, 50%, 60%, 70%, 80%, 90% or 95% of the genomic regions in Table 7.

In some embodiments, the plurality of probes are configured to hybridize to bisulfite-converted fragments obtained from processing of cfDNA molecules, wherein each of the cfDNA molecules corresponds to or is derived from one or more genomic regions selected from Table 8, wherein the cancer classification is a presence or absence of lung cancer or a stage of lung cancer. In some embodiments, the plurality of probes are configured to hybridize to bisulfate-converted fragments obtained from the cfDNA molecules corresponding to or derived from at least 30%, 40%, 50%, 60%, 70%, 80%, 90% or 95% of the genomic regions in Table 8.

In some embodiments, the plurality of probes are configured to hybridize to bisulfite-converted fragments obtained from processing of cfDNA molecules, wherein each of the cfDNA molecules corresponds to or is derived from one or more genomic regions selected from Table 9, wherein the cancer classification is a presence or absence of ovarian cancer or a stage of ovarian cancer. In some embodiments, the plurality of probes are configured to hybridize to bisulfate-converted fragments obtained from the cfDNA molecules corresponding to or derived from at least 30%, 40%, 50%, 60%, 70%, 80%, 90% or 95% of the genomic regions in Table 9.

In some embodiments, the plurality of probes are configured to hybridize to bisulfite-converted fragments obtained from processing of cfDNA molecules, wherein each of the cfDNA molecules corresponds to or is derived from one or more genomic regions selected from Table 10, wherein the cancer classification is a presence or absence of pancreatic cancer or a stage of pancreatic cancer. In some embodiments, the plurality of probes are configured to hybridize to bisulfate-converted fragments obtained from the cfDNA molecules corresponding to or derived from at least 30%, 40%, 50%, 60%, 70%, 80%, 90% or 95% of the genomic regions in Table 10.

In some embodiments, the plurality of probes are configured to hybridize to bisulfite-converted fragments obtained from processing of cfDNA molecules, wherein each of the cfDNA molecules corresponds to or is derived from one or more genomic regions selected from Table 16, wherein the cancer classification is a presence or absence of blood cancer or a stage of blood cancer. In some embodiments, the plurality of probes are configured to hybridize to bisulfate-converted fragments obtained from the cfDNA molecules corresponding to or derived from at least 30%, 40%, 50%, 60%, 70%, 80%, 90% or 95% of the genomic regions in Table 16.

In some embodiments, the plurality of probes are configured to hybridize to bisulfite-converted fragments obtained from processing of cfDNA molecules, wherein each of the cfDNA molecules corresponds to or is derived from one or more genomic regions selected from Table 17, wherein the cancer classification is a presence or absence of breast cancer or a stage of breast cancer. In some embodiments, the plurality of probes are configured to hybridize to bisulfate-converted fragments obtained from the cfDNA molecules corresponding to or derived from at least 30%, 40%, 50%, 60%, 70%, 80%, 90% or 95% of the genomic regions in Table 17.

In some embodiments, the plurality of probes are configured to hybridize to bisulfite-converted fragments obtained from processing of cfDNA molecules, wherein each of the cfDNA molecules corresponds to or is derived from one or more genomic regions selected from Table 18, wherein the cancer classification is a presence or absence of colorectal cancer or a stage of colorectal cancer. In some embodiments, the plurality of probes are configured to hybridize to bisulfate-converted fragments obtained from the cfDNA molecules corresponding to or derived from at least 30%, 40%, 50%, 60%, 70%, 80%, 90% or 95% of the genomic regions in Table 18.

In some embodiments, the plurality of probes are configured to hybridize to bisulfite-converted fragments obtained from processing of cfDNA molecules, wherein each of the cfDNA molecules corresponds to or is derived from one or more genomic regions selected from Table 19, wherein the cancer classification is a presence or absence of esophageal cancer or a stage of esophageal cancer. In some embodiments, the plurality of probes are configured to hybridize to bisulfate-converted fragments obtained from the cfDNA molecules corresponding to or derived from at least 30%, 40%, 50%, 60%, 70%, 80%, 90% or 95% of the genomic regions in Table 19.

In some embodiments, the plurality of probes are configured to hybridize to bisulfite-converted fragments obtained from processing of cfDNA molecules, wherein each of the cfDNA molecules corresponds to or is derived from one or more genomic regions selected from Table 20, wherein the cancer classification is a presence or absence of head and neck cancer or a stage of head and neck cancer. In some embodiments, the plurality of probes are configured to hybridize to bisulfate-converted fragments obtained from the cfDNA molecules corresponding to or derived from at least 30%, 40%, 50%, 60%, 70%, 80%, 90% or 95% of the genomic regions in Table 20.

In some embodiments, the plurality of probes are configured to hybridize to bisulfite-converted fragments obtained from processing of cfDNA molecules, wherein each of the cfDNA molecules corresponds to or is derived from one or more genomic regions selected from Table 21, wherein the cancer classification is a presence or absence of hepatobiliary cancer or a stage of hepatobiliary cancer. In some embodiments, the plurality of probes are configured to hybridize to bisulfate-converted fragments obtained from the cfDNA molecules corresponding to or derived from at least 30%, 40%, 50%, 60%, 70%, 80%, 90% or 95% of the genomic regions in Table 21.

In some embodiments, the plurality of probes are configured to hybridize to bisulfate-converted fragments obtained from processing of cfDNA molecules, wherein each of the cfDNA molecules corresponds to or is derived from one or more genomic regions selected from Table 22, wherein the cancer classification is a presence or absence of lung cancer or a stage of lung cancer. In some embodiments, the plurality of probes are configured to hybridize to bisulfate-converted fragments obtained from the cfDNA molecules corresponding to or derived from at least 30%, 40%, 50%, 60%, 70%, 80%, 90% or 95% of the genomic regions in Table 22.

In some embodiments, the plurality of probes are configured to hybridize to bisulfate-converted fragments obtained from processing of cfDNA molecules, wherein each of the cfDNA molecules corresponds to or is derived from one or more genomic regions selected from Table 23, wherein the cancer classification is a presence or absence of ovarian cancer or a stage of ovarian cancer. In some embodiments, the plurality of probes are configured to hybridize to bisulfate-converted fragments obtained from the cfDNA molecules corresponding to or derived from at least 30%, 40%, 50%, 60%, 70%, 80%, 90% or 95% of the genomic regions in Table 23.

In some embodiments, the plurality of probes are configured to hybridize to bisulfate-converted fragments obtained from processing of cfDNA molecules, wherein each of the cfDNA molecules corresponds to or is derived from one or more genomic regions selected from Table 24, wherein the cancer classification is a presence or absence of pancreatic cancer or a stage of pancreatic cancer. In some embodiments, the plurality of probes are configured to hybridize to bisulfate-converted fragments obtained from the cfDNA molecules corresponding to or derived from at least 30%, 40%, 50%, 60%, 70%, 80%, 90% or 95% of the genomic regions in Table 24.

In some embodiments, determining a cancer classification comprises generating a test feature vector based on the set of sequence reads; and applying the test feature vector to a model obtained by a training process with a cancer set of fragments from one or more training subjects with cancer and a non-cancer set of fragments from one or more training subjects without cancer, wherein both cancer set of fragments and the non-cancer set of fragments comprise a plurality of training fragments.

In some embodiments, the training process comprises obtaining sequence information of training fragments from a plurality of training subjects; for each training fragment, determining whether that training fragment is hypomethylated or hypermethylated, wherein each of the hypomethylated and hypermethylated training fragments comprises at least a threshold number of CpG sites with at least a threshold percentage of the CpG sites being unmethylated or methylated, respectively, for each training subject, generating a training feature vector based on the hypomethylated training fragments and hypermethylated training fragments, and training the model with the training feature vectors from the one or more training subjects without cancer and the training feature vectors from the one or more training subjects with cancer.

In some embodiments, the training process comprises obtaining sequence information of training fragments from a plurality of training subjects; for each training fragment, determining whether that training fragment is hypomethylated or hypermethylated, wherein each of the hypomethylated and hypermethylated training fragments comprises at least a threshold number of CpG sites with at least a threshold percentage of the CpG sites being unmethylated or methylated, respectively, for each of a plurality of CpG sites in a reference genome: quantifying a count of hypomethylated training fragments which overlap the CpG site and a count of hypermethylated training fragments which overlap the CpG site; and generating a hypomethylation score and a hypermethylation score based on the count of hypomethylated training fragments and hypermethylated training fragments; for each training fragment, generating an aggregate hypomethylation score based on the hypomethylation score of the CpG sites in the training fragment and an aggregate hypermethylation score based on the hypermethylation score of the CpG sites in the training fragment; for each training subject: ranking the plurality of training fragments based on aggregate hypomethylation score and ranking the plurality of training fragments based on aggregate hypermethylation score; and generating a feature vector based on the ranking of the training fragments; obtaining training feature vectors for one or more training subjects without cancer and training feature vectors for the one or more training subjects with cancer; and training the model with the feature vectors for the one or more training subjects without cancer and the feature vectors for the one or more training subjects with cancer.

In some embodiments, the model comprises one of a kernel logistic regression classifier, a random forest classifier, a mixture model, a convolutional neural network, and an autoencoder model. In some embodiments, the methods further comprise obtaining a cancer probability for the test sample based on the model; and comparing the cancer probability to a threshold probability to determine whether the test sample is from a subject with cancer or without cancer. In some embodiments, the methods further comprise administering an anti-cancer agent to the subject.

Further disclosed herein are methods for treating a cancer patient, comprising administering an anti-cancer agent to a subject who has been identified as a cancer subject by the methods disclosed herein. In some embodiments, the anti-cancer agent is a chemotherapeutic agent selected from the group consisting of alkylating agents, antimetabolites, anthracyclines, anti-tumor antibiotics, cytoskeletal disruptors (taxans), topoisomerase inhibitors, mitotic inhibitors, corticosteroids, kinase inhibitors, nucleotide analogs, and platinum-based agents.

Moreover disclosed herein are methods for providing sequence information informative of a presence or absence of a cancer, comprising contacting cell-free DNA from a biological sample with a deaminating agent to generate a cell-free DNA sample comprising deaminated nucleotides; enriching the cell-free DNA for a plurality of DNA fragments that together correspond to at least 100, 200, 500, or 1000 genomic regions selected from genomic regions identified in any one of Tables 1-24; and sequencing the enriched cell-free DNA molecules, thereby obtaining a set of sequence reads.

In some embodiments, enriching the cell-free DNA does not involve hybridization capture. In some embodiments, enriching the cell-free DNA comprises amplifying the plurality of DNA fragments. In some embodiments, amplifying the cell-free DNA molecules comprises contacting the cell-free DNA with a plurality of sets of primers and amplifying the cell-free DNA molecules via PCR, wherein each primer set comprises a forward primer and a reverse primer.

Further disclosed herein are assay panels for enriching cfDNA molecules for cancer diagnosis, comprising at least 50 different pairs of polynucleotide probes, wherein each pair of the at least 50 pairs of probes (i) comprises two different probes configured to overlap with each other by an overlapping sequence of 30 or more nucleotides and (ii) is configured to hybridize to a modified fragment obtained from processing of the cfDNA molecules, wherein each of the cfDNA molecules corresponds to or is derived from one or more genomic regions, wherein each of the one or more genomic regions comprises at least five methylation sites and has an anomalous methylation pattern in cancerous training samples.

In some embodiments, the overlapping sequence comprises at least 40, 50, 75, or 100 nucleotides. In some embodiments, the assay panels disclosed herein comprise at least 50, 60, 70, 80, 90, 100, 120, 150 or 200 pairs of probes.

Further disclosed herein are assay panels for enriching cfDNA molecules for cancer diagnosis, comprising at least 100 polynucleotide probes, wherein each of the at least 100 probes is configured to hybridize to a modified polynucleotide obtained from processing of the cfDNA molecules, wherein each of the cfDNA molecules corresponds to or is derived from, one or more genomic regions, wherein each of the one or more genomic regions comprises at least five methylation sites, and has an anomalous methylation pattern in cancerous training samples.

In some embodiments, the processing of the cfDNA molecules comprises converting unmethylated C (cytosine) to U (uracil) in the cfDNA molecules. In some embodiments, each of the probes on the panel is conjugated to a biotin moiety. In some embodiments, the training samples are samples originating from a plurality of subjects determined to have cancer. In some embodiments, a genomic region has an anomalous methylation pattern in cancerous training samples when a methylation state vector representing the genomic region in the cancerous training samples is present less frequently in reference samples than a threshold value. In some embodiments, the threshold value is 0.1, 0.01, 0.001, or 0.0001.

In some embodiments, each of the one or more genomic regions is either hypermethylated or hypomethylated in the cancerous training samples. In some embodiments, at least 80, 85, 90, 92, 95, or 98% of the at least five methylation sites are either methylated or unmethylated in the cancerous training samples. In some embodiments, at least 3%, 5%, 10%, 15%, 20%, 30%, or 40% of the probes on the panel comprise no G (Guanine). In some embodiments, at least 80, 85, 90, 92, 95, 98% of the probes on the panel have exclusively either CpG or CpA on CpG detection sites. In some embodiments, each of the probes on the panel comprises less than 20, 15, 10, 8, or 6 CpG detection sites.

In some embodiments, each of the probes on the panel is designed to have sequence homology or sequence complementarity with fewer than 20, 15, 10, or 8 off-target genomic regions. In some embodiments, the fewer than 20 off-target genomic regions are identified using a k-mer seeding strategy. In some embodiments, the fewer than 20 off-target genomic regions are identified using k-mer seeding strategy combined to local alignment at seed locations.

In some embodiments, the assay panels comprise at least 100, 200, 300, or 400 probes. In some embodiments, the at least 500 pairs of probes or the at least 100 probes together comprise at least 0.01 million, 0.02 million, or 0.05 million nucleotides. In some embodiments, each of the probes on the panel comprises at least 50, 75, 100, or 120 nucleotides. In some embodiments, each of the probes on the panel comprises less than 300, 250, 200, or 150 nucleotides. In some embodiments, each of the probes on the panel comprises 100-150 nucleotides.

In some embodiments, the assay panels further comprise a plurality of virus-specific probes, wherein each of the virus-specific probes is configured to hybridize to a viral genome fragment from cfDNA. In some embodiments, the viral genome fragment is from MCV, EBV, HBV, HCMV, HCV, HHV5, HPV16, or HPV18. In some embodiments, the assay panels comprise at least 50, 100, 200, 500, 1000, 2000, or 3000 virus-specific probes.

In some embodiments, each of the one or more genomic regions is selected from one or more of the genomic regions of Tables 2-10 or 16-24. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of Tables 2-10 or 16-24. In some embodiments, an entirety of probes on the panel together are configured to hybridize to modified fragments obtained from the cfDNA molecules corresponding to or derived from at least 50, 60, 70, 80, 90, 100, 120, 150 or 200 genomic regions from one or more of Tables 2-10 or 16-24.

BRIEF DESCRIPTION OF THE DRAWINGS

FIG. 3A is a flowchart describing a process of creating a data structure for a control group, according to an embodiment.

FIG. 3B is a flowchart describing an additional step of validating the data structure for the control group of FIG. 3A, according to an embodiment.

FIG. 5 is an illustration of an example p-value score calculation, according to an embodiment.

FIGS. 11A, 11B, and 11C include graphs showing the cancer log-odds ratio determined for various cancers across different stages and types of cancer.

Figure 1A:
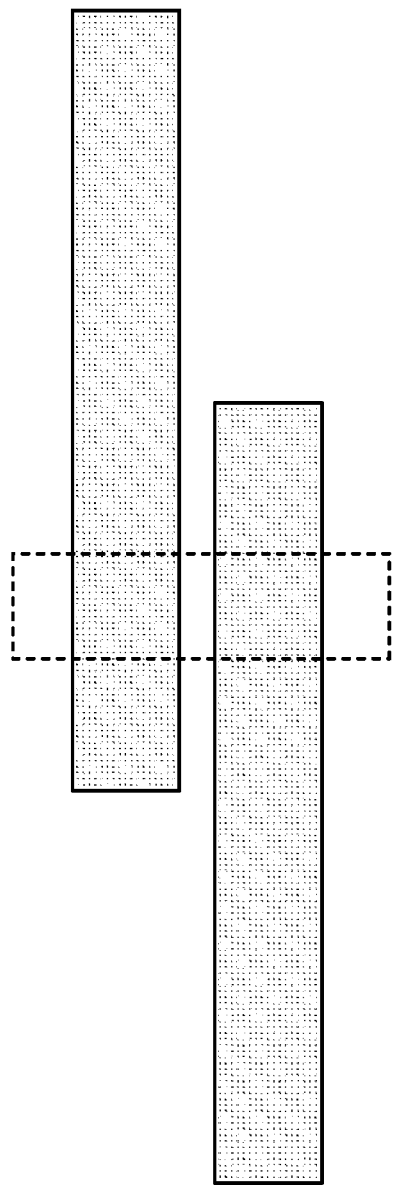
FIG. 1A illustrates 2× tiled probe design where each base in a target region (boxed in the dotted rectangle) is covered by exactly two probes, according to an embodiment.

The figures depict various embodiments of the present description for purposes of illustration only. One skilled in the art will readily recognize from the following discussion that alternative embodiments of the structures and methods illustrated herein may be employed without departing from the principles of the description described herein.

DETAILED DESCRIPTION

Definitions

Unless defined otherwise, all technical and scientific terms used herein have the meaning commonly understood by a person skilled in the art to which this description belongs. As used herein, the following terms have the meanings ascribed to them below.

The term "methylation" as used herein refers to a process by which a methyl group is added to a DNA molecule. Two of DNA's four bases, cytosine ("C") and adenine ("A") can be methylated. For example, a hydrogen atom on the pyrimidine ring of a cytosine base can be converted to a methyl group, forming 5-methylcytosine. Methylation tends to occur at dinucleotides of cytosine and guanine referred to herein as "CpG sites." In other instances, methylation may occur at a cytosine not part of a CpG site or at another nucleotide that is not cytosine; however, these are rarer occurrences. In this present disclosure, methylation is discussed in reference to CpG sites for the sake of clarity. However, the principles described herein are equally applicable for the detection of methylation in a non-CpG context, including non-cytosine methylation. For example, Adenine methylation has been observed in bacteria, plant and mammalian DNA, although it has received considerably less attention.

In such embodiments, the wet laboratory assay used to detect methylation may vary from those described herein as is well known in the art. Further, the methylation state vectors may contain elements that are generally vectors of sites where methylation has or has not occurred (even if those sites are not CpG sites specifically). With that substitution, the remainder of the processes described herein are the same, and consequently the inventive concepts described herein are applicable to those other forms of methylation.

The term "methylation site" as used herein refers to a site on a DNA molecule where a methyl group can be added. "CpG" sites are the most common methylation site, but methylation sites are not limited to CpG sites.

For example, DNA methylation may occur in cytosines in CHG and CHH, where H is adenine, cytosine or thymine. Cytosine methylation in the form of 5-hydroxymethylcytosine may also assessed (see, e.g., WO 2010/037001 and WO 2011/127136, which are incorporated herein by reference), and features thereof, using the methods and procedures disclosed herein.

The term "CpG site" as used herein refers to a region of a DNA molecule where a cytosine nucleotide is followed by a guanine nucleotide in the linear sequence of bases along its 5' to 3' direction. "CpG" is a shorthand for 5'-C-phosphate-G-3' that is cytosine and guanine separated by only one phosphate group; phosphate links any two nucleotides together in DNA. Cytosines in CpG dinucleotides can be methylated to form 5-methylcytosine.

The term "CpG detection site" as used herein refers to a region in a probe that is configured to hybridize to a CpG site of a target DNA molecule. The CpG site on the target DNA molecule can comprise cytosine and guanine separated by one phosphate group, where cytosine is methylated or unmethylated. The CpG site on the target DNA molecule can comprise uracil and guanine separated by one phosphate group, where the uracil is generated by the conversion of unmethylated cytosine.

The term "UpG" is a shorthand for 5'-U-phosphate-G-3' that is uracil and guanine separated by only one phosphate group. UpG can be generated by a bisulfite treatment of a DNA that converts unmethylated cytosines to uracils. Cytosines can be converted to uracils by other methods known in the art, such as chemical modification or synthesis.

The term "hypomethylated" or "hypermethylated" as used herein refers to a methylation status of a DNA molecule containing multiple CpG sites (e.g., more than 3, 4, 5, 6, 7, 8, 9, 10, etc.) where a high percentage of the CpG sites (e.g., more than 80%, 85%, 90%, or 95%, or any other percentage within the range of 50%-100%) are unmethylated or methylated, respectively.

The term "methylation state vector" or "methylation status vector" as used herein refers to a vector comprising multiple elements, where each element indicates methylation status of a methylation site in a DNA molecule comprising multiple methylation sites, in the order they appear from 5' to 3' in the DNA molecule. For example, $<M_x, M_{x+1}, M_{x+2}>$, $<M_x, M_{x+1}, U_{x+2}>$, ..., $<U_x, U_{x+1}, U_{x+2}>$ can be methylation vectors for DNA molecules comprising three methylation sites, where M represents a methylated methylation site and U represents an unmethylated methylation site.

The term "abnormal methylation pattern" or "anomalous methylation pattern" as used herein refers to a methylation state vector or a methylation status of a DNA molecule having the methylation state vector that is expected to be found in a sample less frequently than a threshold value. In a particular embodiment provided herein, the expectedness of finding a specific methylation state vector in a healthy control group comprising healthy individuals is represented by a p-value. A low p-value score, thereby, generally corresponds to a methylation state vector which is relatively unexpected in comparison to other methylation state vectors within samples from healthy individuals in the healthy control group. A high p-value score generally corresponds to a methylation state vector which is relatively more expected in comparison to other methylation state vectors found in samples from healthy individuals in the healthy control group. A methylation state vector having a p-value lower than a threshold value (e.g., 0.1, 0.01, 0.001, 0.0001, etc.) can be defined as an abnormal methylation pattern. Various methods known in the art can be used to calculate a p-value or expectedness of a methylation pattern or a methylation state vector. Exemplary methods provided herein involve use of a Markov chain probability that assumes methylation statuses of CpG sites to be dependent on methylation statuses of neighboring CpG sites. Alternate methods provided herein calculate the expectedness of observing a specific methylation state vector in healthy individuals by utilizing a mixture model including multiple mixture components, each being an independent-sites model where methylation at each CpG site is assumed to be independent of methylation statuses at other CpG sites.

Methods provided herein use genomic regions having an anomalous methylation pattern. A genomic region can be determined to have an anomalous methylation pattern when cfDNA fragments corresponding to or originated from the genomic region have methylation state vectors that appear less frequently than a threshold value in reference samples. The reference samples can be samples from control subjects or healthy subjects. The frequency for a methylation state vector to appear in the reference samples can be represented as a p-value score. When cfDNA fragments corresponding to or originated from the genomic region do not have a single, uniform methylation state vector, the genomic region can have multiple p-value scores for multiple methylation state vectors. In this case, the multiple p-value scores can be summed or averaged before being compared to the threshold value. Various methods known in the art can be adopted to compare p-value scores corresponding to the genomic region and the threshold value, including but not limited to arithmetic mean, geometric mean, harmonic mean, median, mode, etc.

The term "cancerous sample" as used herein refers to a sample comprising genomic DNAs from an individual diagnosed with cancer. The genomic DNAs can be, but are not limited to, cfDNA fragments or chromosomal DNAs from a subject with cancer. The genomic DNAs can be sequenced and their methylation status can be assessed by methods known in the art, for example, bisulfite sequencing. When genomic sequences are obtained from public database (e.g., The Cancer Genome Atlas (TCGA)) or experimentally obtained by sequencing a genome of an individual diagnosed with cancer, cancerous sample can refer to genomic DNAs or cfDNA fragments having the genomic sequences. The term "cancerous samples" as a plural refers to samples comprising genomic DNAs from multiple individuals, each individual diagnosed with cancer. In various embodiments, cancerous samples from more than 100, 300, 500, 1,000, 10,000, 20,000, 40,000, 50,000, or more individuals diagnosed with cancer are used.

The term "non-cancerous sample" as used herein refers to a sample comprising genomic DNAs from an individual not diagnosed with cancer. The genomic DNAs can be, but are not limited to, cfDNA fragments or chromosomal DNAs from a subject without cancer. The genomic DNAs can be sequenced and their methylation status can be assessed by methods known in the art, for example, bisulfite sequencing. When genomic sequences are obtained from public database (e.g., The Cancer Genome Atlas (TCGA)) or experimentally obtained by sequencing a genome of an individual without cancer, non-cancerous sample can refer to genomic DNAs or cfDNA fragments having the genomic sequences. The term "non-cancerous samples" as a plural refers to samples comprising genomic DNAs from multiple individuals, each individual is not diagnosed with cancer. In various embodiments, cancerous samples from more than 100, 300, 500, 1,000, 10,000, 20,000, 40,000, 50,000, or more individuals without cancer are used.

The term "training sample" as used herein refers to a sample used to train a classifier described herein and/or to select one or more genomic regions for cancer diagnosis. The training samples can comprise genomic DNAs or a modification there of, from one or more healthy subjects and from one or more subjects having a disease condition for diagnosis (e.g., cancer, a specific type of cancer, a specific stage of cancer, etc.). The genomic DNAs can be, but are not limited to, cfDNA fragments or chromosomal DNAs. The genomic DNAs can be sequenced and their methylation status can be assessed by methods known in the art, for example, bisulfite sequencing. When genomic sequences are obtained from public database (e.g., The Cancer Genome Atlas (TCGA)) or experimentally obtained by sequencing a genome of an individual, a training sample can refer to genomic DNAs or cfDNA fragments having the genomic sequences.

The term "test sample" as used herein refers to a sample from a subject, whose health condition was, has been or will be tested using a classifier and/or an assay panel described herein. The test sample can comprise genomic DNAs or a modification there of. The genomic DNAs can be, but are not limited to, cfDNA fragments or chromosomal DNAs.

The term "target genomic region" as used herein refers to a region in a genome selected for designing a probe to be included in an assay panel. The probe can be designed to hybridize to (and optionally pull down) a nucleic acid fragment corresponding to, or derived from the target genomic region or a fragment thereof. A nucleic acid fragment corresponding to, or derived from the target genomic region refers to a nucleic acid fragment generated by degradation, cleavage, or other biological processing of the target genomic region or a nucleic acid fragment having a sequence homologous or complementary to the target genomic region.

The term "off-target genomic region" as used herein refers to a region in a genome which has not been selected for designing a probe to be included in an assay panel, but has sufficient homology to a target genomic region to be bound and pulled down by a probe designed to target the target genomic region. In one embodiment, the off-target genomic region is a genomic region that aligns to a probe along at least 45 bp with at least a 90% match rate.

The term "cell free nucleic acid," "cell free DNA," or "cfDNA" refers to nucleic acid fragments that circulate in an individual's body (e.g., bloodstream) and originate from one or more healthy cells and/or from one or more cancer cells. Additionally, cfDNA may come from other sources such as viruses, fetuses, etc.

The term "converted DNA molecules," "converted cfDNA molecules," or "modified fragment obtained from processing of the cfDNA molecules" refers to DNA molecules obtained by processing DNA or cfDNA molecules in the sample in a chemical reaction for the purpose of differentiating a methylated nucleotide and an unmethylated nucleotide in the DNA or cfDNA molecules. For example, in one embodiment, the sample can be treated with bisulfite ion (e.g., using sodium bisulfite), as is well-known in the art, to convert unmethylated cytosines ("C") to uracils ("U"). In another embodiment, the conversion of unmethylated cytosines to uracils is accomplished using an enzymatic conversion reaction, for example, using a cytidine deaminase (such as APOBEC). After treatment, converted DNA molecules or cfDNA molecules include additional uracils which are not present in the original cfDNA sample.

The term "circulating tumor DNA" or "ctDNA" refers to nucleic acid fragments that originate from tumor cells or other types of cells, which may be released into an individual's bloodstream as result of biological processes such as apoptosis or necrosis of dying cells or actively released by viable tumor cells.

The term "individual" refers to a human individual. The term "healthy individual" refers to an individual presumed not to have a cancer or disease.

The term "subject" refers to an individual whose DNA is being analyzed. A subject may be a test subject whose DNA is be evaluated using a targeted panel as described herein to evaluate whether or not the person has cancer or another disease. A subject may also be part of a control group known not to have cancer or another disease. A subject may also be part of a cancer or other disease group known to have cancer or another disease. Control and cancer/disease groups may be used to assist in designing or validating the targeted panel.

The term "sequence reads" as used herein refers to nucleotide sequences read from a sample. Sequence reads can be obtained through various methods provided herein or as known in the art.

The term "sequencing depth" as used herein refers to the count of the number of times a given target nucleic acid within a sample has been sequenced (e.g., the count of sequence reads at a given target region). Increasing sequencing depth can reduce required amounts of the target nucleic acids need for assessing a disease state (e.g., cancer or cancer tissue of origin).

The term "tissue of origin" or "TOO" as used herein refers to the organ, organ group, body region or cell type that cancer arises or originates from. The identification of a tissue of origin or cancer cell type typically allows for identification of the most appropriate next steps in the care continuum of cancer to further diagnose, stage and decide on treatment.

"An entirety of probes" of a panel or bait set or "an entirety of polynucleotide-containing probes" of a panel or bait set generally refers to all of the probes delivered with a specified panel or bait set. For instance, in some embodiments, a panel or bait set may include both (1) probes having features specified herein (e.g., probes for binding to cell-free DNA fragments corresponding to or derived from genomic regions set forth herein in one or more Tables) and (2) additional probes that do not contain such feature(s). The entirety of probes of a panel generally refers to all probes delivered with the panel or bait set, including such probes that do not contain the specified feature(s).

Other Interpretational Conventions

Ranges recited herein are understood to be shorthand for all of the values within the range, inclusive of the recited endpoints. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50.

Cancer Assay Panel

In a first aspect, the present description provides a cancer assay panel (e.g., a bait set) comprising a plurality of probes or a plurality of probe pairs. The probes can be polynucleotide-containing probes that are specifically designed to target one or more nucleic acid molecules corresponding to, or derived from genomic regions differentially methylated between cancer and non-cancer samples, between different cancer tissue of origin types, between different cancer cell types, or between samples of different stages of cancer, as identified by methods provided herein. In some embodiments, probes target genomic regions (or nucleic acid molecules derived therefrom) having methylation patterns specific to a cancer type, e.g., (1) blood cancer, (2) breast cancer, (3) colorectal cancer, (4) esophageal cancer, (5) head and neck cancer, (6) hepatobiliary cancer, (7) lung cancer, (8) ovarian cancer, or (9) pancreatic cancer. In some embodiments, the panel includes probes targeting genomic regions specific to a single cancer type. In some embodiments, the panel includes probes specific to 2, 3, 4, 5, 6, 7, 8, or 9 or more cancer types. In some embodiments, the target genomic regions are selected to maximize classification accuracy, subject to a size limitation (which can be determined by a sequencing budget and a desired depth of sequencing).

Figure 2:
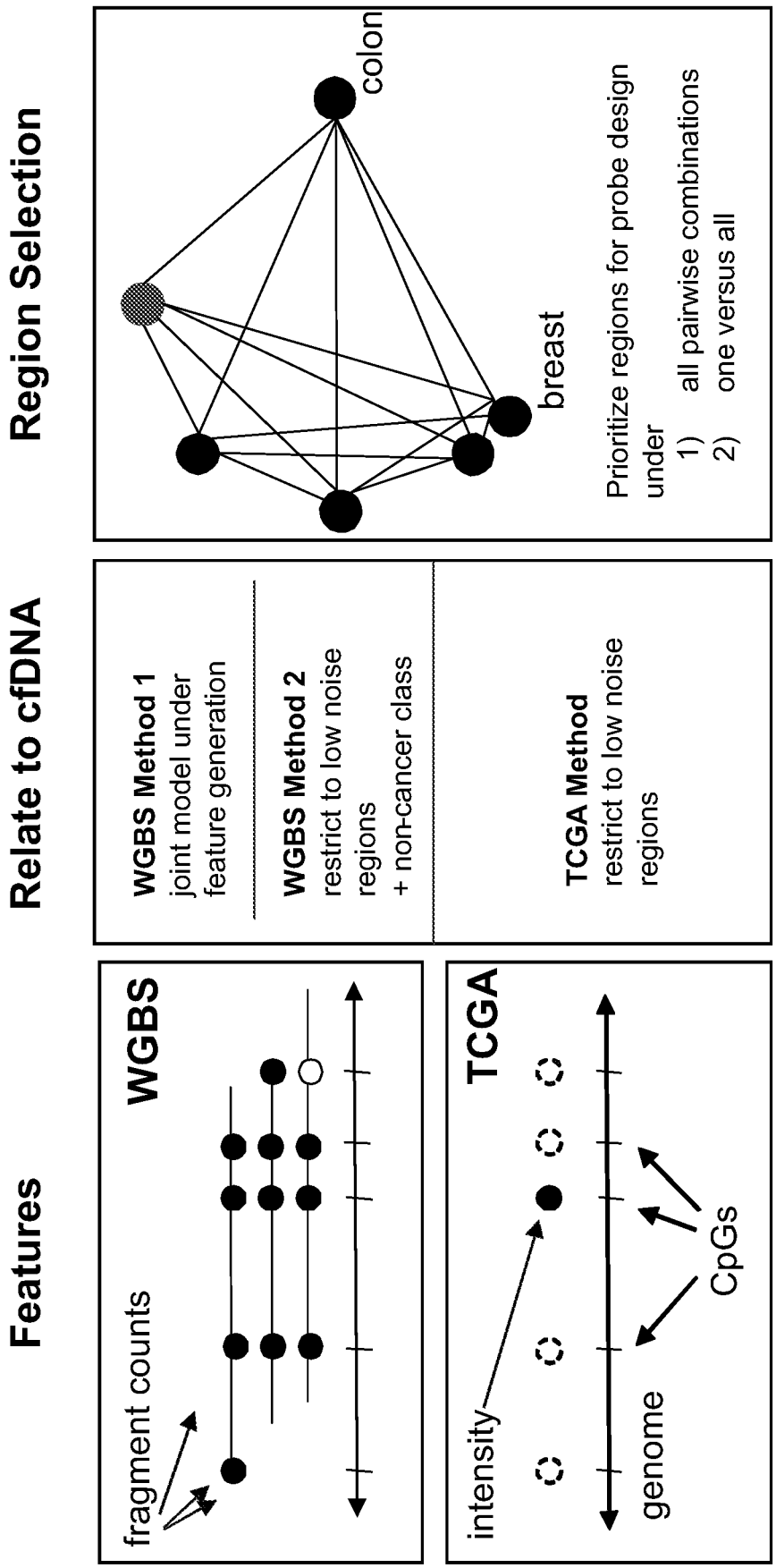
FIG. 2 is a schematic describing a process of generating a cancer assay panel, according to an embodiment.

Design features and potential utility of an exemplary cancer assay panel are shown in FIG. 2. For designing the cancer assay panel, an analytics system may collect samples corresponding to various outcomes under consideration, e.g., samples known to have cancer, samples considered to be healthy, samples from a known tissue of origin, etc. These samples may be processed with whole-genome bisulfite sequencing (WGBS) or obtained from public database (e.g., TCGA). The analytics system may be any generic computing system with a computer processor and a computer-readable storage medium with instructions for executing the computer processor to perform any or all operations described in this present disclosure. With the samples, the analytics system determines methylation statuses at one or more CpG sites for each nucleic acid fragment in the sample. The analytics system may then select target genomic regions based on methylation patterns of nucleic acid fragments. One approach considers pairwise distinguishability between pairs of outcomes for regions or more specifically one or more CpG sites. Another approach considers distinguishability for regions or more specifically one or more CpG sites when considering each outcome against the remaining outcomes. From the selected target genomic regions with high distinguishability power, the analytics system may design probes to target nucleic acid fragments inclusive of the selected genomic regions. The analytics system may generate variable sizes of the cancer assay panel, e.g., where a small sized cancer assay panel includes probes targeting the most informative genomic region, a medium sized cancer assay panel includes probes from the small sized cancer assay panel and additional probes targeting a second tier of informative genomic regions, and a large sized cancer assay panel includes probes from the small sized and the medium sized cancer assay panels and even more probes targeting a third tier of informative genomic regions. With such cancer assay panels, the analytics system may train classifiers with various classification techniques to predict a sample's likelihood of having a particular outcome, e.g., cancer, specific cancer type, other disorder, etc.

Specifically, in some embodiments, the cancer assay panel comprises at least 50 pairs of probes, wherein each pair of the at least 50 pairs comprises two probes configured to overlap each other by an overlapping sequence, wherein the overlapping sequence comprises a 30-nucleotide sequence, and wherein the 30-nucleotide sequence is configured to hybridize to a modified fragment obtained from processing of the cfDNA molecules corresponding to one or more genomic regions, wherein each of the genomic regions comprises at least five methylation sites, and wherein the at least five methylation sites have an anomalous methylation pattern in training samples. In other words, when cfDNA molecules in training samples corresponding to the genomic region are analyzed, they have methylation status vectors appearing less frequently than a threshold value in reference samples.

In other embodiments, the cancer assay panel comprises at least 500 pairs of probes, wherein each pair of the at least 500 pairs comprises two probes configured to overlap each other by an overlapping sequence, wherein the overlapping sequence comprises a 30-nucleotide sequence, and wherein the 30-nucleotide sequence is configured to hybridize to a modified fragment obtained from processing of the cfDNA molecules corresponding to one or more genomic regions, wherein each of the genomic regions comprises at least five methylation sites, and wherein the at least five methylation sites have an anomalous methylation pattern in training samples. Again, when cfDNA molecules in training samples corresponding to the genomic region are analyzed, they have methylation status vectors appearing less frequently than a threshold value in reference samples.

In a preferred embodiment, the at least five methylation sites are differentially methylated either between cancerous and non-cancerous samples or between one or more pairs of samples from different cancer types. In some embodiments, the converted cfDNA molecules comprise cfDNA molecules treated (e.g., via bisulfite treatment) to convert unmethylated C (cytosine) to U (uracil). In some cases, the uracil is further converted to thymine (e.g., upon PCR amplification).

Since the probes are configured to hybridize to a converted DNA or cfDNA molecule corresponding to, or derived from, one or more genomic regions, the probes can have a sequence different from the targeted genomic region. For example, a DNA molecule containing unmethylated CpG site will be converted to include UpG because unmethylated cytosines are converted to uracils by a conversion reaction (e.g., bisulfite treatment). As a result, a probe is configured to hybridize to a sequence including UpG instead of a naturally existing unmethylated CpG. Accordingly, a complementary site in the probe to the unmethylated site can comprise CpA instead of CpG, and some probes targeting a hypomethylated site where all methylation sites are unmethylated can have no guanine (G) bases. In some embodiments, at least 3%, 5%, 10%, 15%, 20%, 30%, or 40% of the probes lack G (Guanine). In some embodiments, at least 80, 85, 90, 92, 95, 98% of the probes on the panel have exclusively either CpG or CpA on CpG detection sites. Accordingly, in some embodiments, polynucleotide-containing probes have a nucleic acid sequence that is either (1) identical in sequence to a sequence within a target genomic region (e.g., target genomic regions set forth herein in Tables 1-24) or (2) varies with respect to a sequence within the genomic region only one or more transitions (e.g., changes in base composition at a site due to bisulfite conversion or other conversion techniques), wherein each respective transition in the one or more transitions occurs at a nucleotide corresponding to a CpG site in the genomic region.

In some embodiments, probes on the panel comprise less than 20, 15, 10, 8, or 6 CpG detection sites. In some embodiments, probes on the panel comprise more than 5, 6, 7, 8, 9, or 10 CpG detection sites.

In some embodiments, probes are conjugated to a tag (e.g., a non-nucleic acid affinity moiety), such as a biotin moiety.

The cancer assay panel can be used to detect the presence or absence of cancer generally and/or provide a cancer classification such as cancer type, or stage of cancer such as I, II, III, or IV, or where the cancer is believed to originate. The panel may include probes targeting nucleic acids derived from genomic regions differentially methylated between general cancerous (pan-cancer) samples and non-cancerous samples, or only in cancerous samples with a specific cancer type (e.g., lung cancer-specific targets). For example, in some embodiments, a cancer assay panel is designed to enrich nucleic acids derived from differentially methylated genomic regions in cancerous samples identified based on bisulfite sequencing data generated from the cfDNA from cancer and non-cancer individuals.

Each of the probes (or probe pairs) can be designed to target nucleic acids derived from one or more target genomic regions. The target genomic regions are selected based on several criteria designed to increase selective enrichment of informative cfDNA fragments while decreasing noise and non-specific bindings.

Figure 1B:
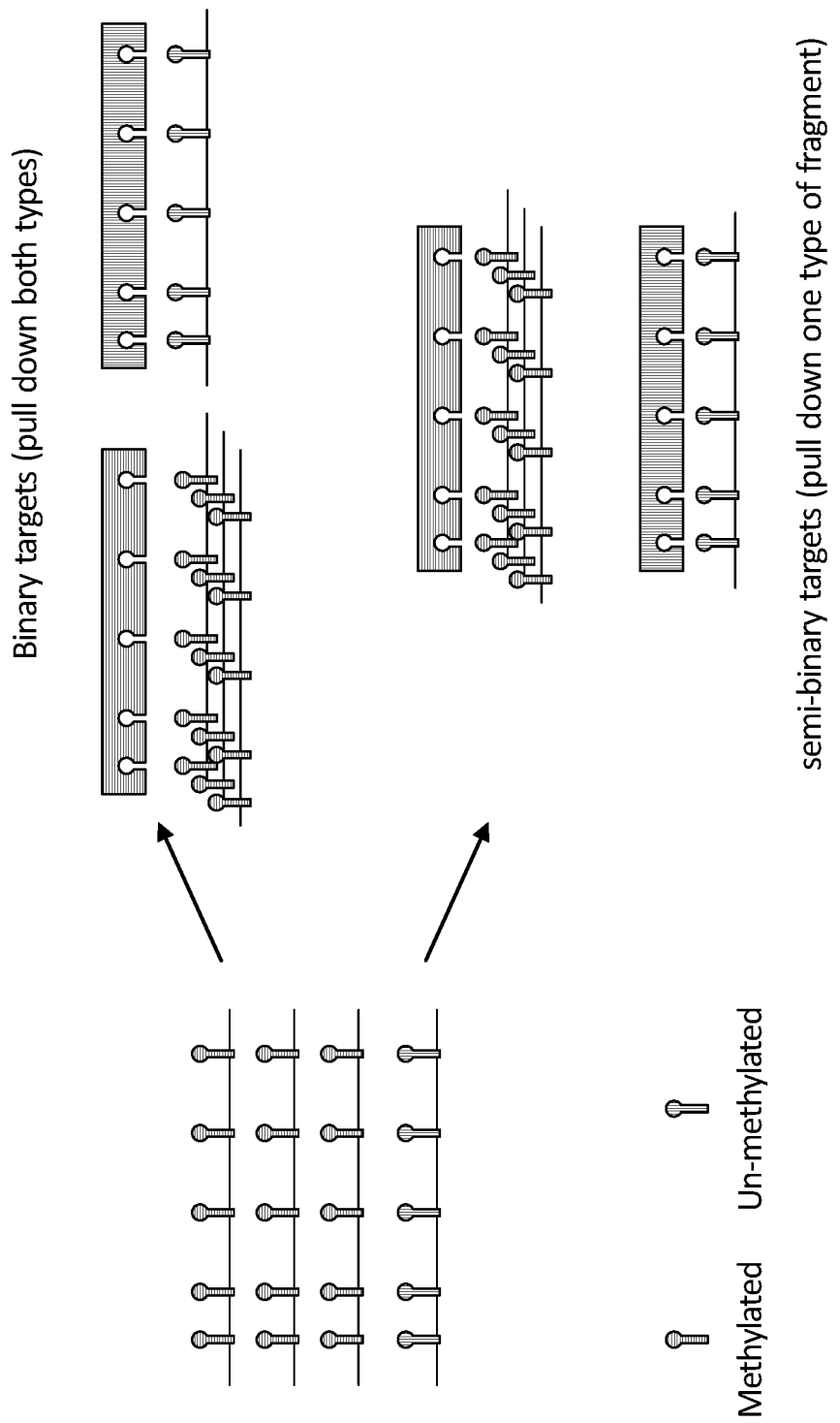
FIG. 1B illustrates probe design targeting hypomethylated and/or hypermethylated fragments in genomic regions, according to an embodiment.

In one example, a panel can include probes that can selectively hybridize to (i.e., bind to) and enrich cfDNA fragments that are differentially methylated in cancerous samples. In this case, sequencing of the enriched fragments can provide information relevant to diagnosis of cancer. Furthermore, the probes are designed to target genomic regions that are determined to have an anomalous methylation pattern in cancer samples, or in samples from certain tissue types or cell types. In one embodiment, probes are designed to target genomic regions determined to be hypermethylated or hypomethylated in certain cancers, or cancer tissue of origins, to provide additional selectivity and specificity of the detection. In some embodiments, a panel comprises probes targeting hypomethylated fragments. In some embodiments, a panel comprises probes targeting hypermethylated fragments. In some embodiments, a panel comprises both a first set of probes targeting hypermethylated fragments and a second set of probes targeting hypomethylated fragments (FIG. 1B). In some embodiments, the ratio between the first set of probes targeting hypermethylated fragments and the second set of probes targeting hypomethylated fragments (Hyper:Hypo ratio) ranges between 0.4 and 2, between 0.5 and 1.8, between 0.5 and 1.6, between 1.4 and 1.6, between 1.2 and 1.4, between 1 and 1.2, between 0.8 and 1, between 0.6 and 0.8 or between 0.4 and 0.6.

Methods of identifying genomic regions (i.e., genomic regions giving rise to anomalously methylated DNA molecules or differentially methylated DNA molecules between cancer and non-cancer samples, between different cancer tissue of origin types, between different cancer cell type, or between samples from different stages of cancer) are provided in detail in the Section titled "Methods of selecting target genomic regions" and methods of identifying anomalously methylated DNA molecules or fragments that are identified as indicative of cancer are provided in detail in the sub-section titled "Anomalously methylated fragments" and the sub-section titled "Filtration of anomalous methylated fragments," respectively.

In a second example, genomic regions can be selected when the genomic regions give rise to anomalously methylated DNA molecules in cancer samples or samples with a known cancer type. For example, as described herein, a Markov model trained on a set of reference samples (e.g., samples from healthy subject) can be used to identify genomic regions that give rise to anomalously methylated DNA molecules (i.e., DNA molecules having a methylation pattern below a p-value threshold).

Each of the probes can target a genomic region comprising at least 30 bp, 35 bp, 40 bp, 45 bp, 50 bp, 60 bp, 70 bp, 80 bp, 90 bp, 100 bp or more. In some embodiments, the genomic regions can be selected to have less than 30, 25, 20, 15, 12, 10, 8, or 6 methylation sites.

The genomic regions can be selected when at least 80, 85, 90, 92, 95, or 98% of the at least five methylation (e.g., CpG) sites within the region are either methylated or unmethylated in non-cancerous or cancerous samples, in cancer samples from a particular cancer type.

Genomic regions may be further filtered to select only those that are likely to be informative based on their methylation patterns, for example, CpG sites that are differentially methylated between cancerous and non-cancerous samples (e.g., abnormally methylated or unmethylated in cancer versus non-cancer), between cancerous samples of a tissue of origin and cancerous samples of a different tissue of origin, or CpG sites that are differentially methylated only in cancerous samples of a specific type. For the selection, calculation can be performed with respect to each CpG site or a plurality of CpG sites. For example, a first count is determined that is the number of cancer-containing samples (cancer count) that include a fragment overlapping that CpG, and a second count is determined that is the number of total samples containing fragments overlapping that CpG site (total). Genomic regions can be selected based on criteria positively correlated to the number of cancer-containing samples (cancer_count) that include a fragment indicative of cancer overlapping that CpG site, and inversely correlated with the number of total samples containing fragments indicative of cancer overlapping that CpG site (total). In one embodiment, the number of non-cancerous samples (neoncancer) and the number of cancerous samples ($n_{cancer}$) having a fragment overlapping a CpG site are counted. Then the probability that a sample is cancer is estimated, for example as $(n_{cancer}+1)/(n_{cancer}+n_{non-cancer}+2)$.

CpG sites by this metric can be ranked and greedily added to a panel until the panel size budget is exhausted. The process of selecting genomic regions indicative of cancer is further detailed in the sub-section titled "Genomic regions indicative of cancer and classifiers."

Depending on whether the assay is intended to be a pan-cancer assay or a single-cancer assay, or depending on what kind of flexibility is desired when picking which CpG sites are contributing to the panel. A panel for diagnosing a specific cancer type can be designed using a similar process. In this embodiment, for each cancer type, and for each CpG site, the information gain is computed to determine whether to include a probe targeting that CpG site. The information gain may be computed for samples with a given cancer type of a tissue of origin compared to all other samples. For example, two random variables, "AF" and "CT." "AF" is a binary variable that indicates whether there is an abnormal fragment overlapping a particular CpG site in a particular sample (yes or no). "CT" is a binary random variable indicating whether the cancer is of a particular type (e.g., lung cancer or cancer other than lung). One can compute the mutual information with respect to "CT" given "AF." That is, how many bits of information about the cancer type (lung vs. non-lung in the example) are gained if one knows whether there is an anomalous fragment overlapping a particular CpG site. This can be used to rank CpG's based on how lung-specific they are. This procedure is repeated for a plurality of cancer types. If a particular region is commonly differentially methylated only in lung cancer (and not other cancer types or non-cancer), CpG's in that region would tend to have high information gains for lung cancer. For each cancer type, CpG sites ranked by this information gain metric, and then greedily added to a panel until the size budget for that cancer type is exhausted.

Further filtration can be performed to select probes with high specificity for enrichment (i.e., high binding efficiency) of nucleic acids derived from targeted genomic regions. Probes can be filtered to reduce non-specific binding (or off-target binding) to nucleic acids derived from non-targeted genomic regions. For example, probes can be filtered to select only those probes having less than a set threshold of off-target binding events. In one embodiment, probes can be aligned to a reference genome (e.g., a human reference genome) to select probes that align to less than a set threshold of regions across the genome. For example, probes can be selected that align to less than 25, 24, 23, 22, 21, 20, 19, 18, 17, 16, 15, 14, 13, 12, 11, 10, 9 or 8 off-target regions across the reference genome. In other cases, filtration is performed to remove genomic regions when the sequence of the target genomic regions appears more than 5, 10, 15, 20, 21, 22, 23, 24, 25, 26, 27, 28, 29, 30, 31, 32, 33, 34 or 35 times in a genome. Further filtration can be performed to select target genomic regions when a sequence, or a set of sequences that are 90%, 91%, 92%, 93%, 94%, 95%, 96%, 97%, 98% or 99% homologous to the target genomic regions, appear less than 25, 24, 23, 22, 21, 20, 19, 18, 17, 16, 15, 14, 13, 12, 11, 10, 9 or 8 times in a reference genome, or to remove target genomic regions when the sequence, or a set of sequences that are 90%, 91%, 92%, 93%, 94%, 95%, 96%, 97%, 98% or 99% homologous to the target genomic regions appear more than 5, 10, 15, 20, 21, 22, 23, 24, 25, 26, 27, 28, 29, 30, 31, 32, 33, 34 or 35 times in a reference genome. This is for excluding probes that can pull down off-target fragments, which are not desired and can impact assay efficiency.

A fragment-probe overlap of at least 45 bp enabled a non-negligible amount of pulldown (though this number can be different depending on assay details) as provided in Example 1. Thus, in some embodiments, probes are at least 45 base pairs in length. In some embodiments, more than a 10% mismatch rate between the probe and fragment sequences in the region of overlap is sufficient to greatly disrupt binding, and thus pulldown efficiency. Therefore, sequences that can align to the probe along at least 45 bp with at least a 90% match rate are candidates for off-target pulldown. Thus, in one embodiment, the number of such regions are scored. The best probes have a score of 1, meaning they match in only one place (the intended target region). Probes with a low score (say, less than 5 or 10) are accepted, but any probes above the score are discarded. Other cutoff values can be used for specific samples.

Once the probes hybridize and capture DNA fragments corresponding to, or derived from, a target genomic region, the hybridized probe-DNA fragment intermediates are pulled down (or isolated), and the targeted DNA is amplified and sequenced. The sequence read provides information relevant for diagnosis of cancer. For this end, a panel is designed to include a plurality of probes that can capture fragments that can together provide information relevant to diagnosis of cancer. In some embodiments, a panel includes at least at least 50, 60, 70, 80, 90, 100, 120, 150, or 200 different pairs of probes. In other embodiments, a panel includes at least at least 500, 1,000, 2,000, 2,500, 5,000, 6,000, 7,500, 10,000, 15,000, 20,000, 25,000, or 50,000 different pairs of probes. In some embodiments, a panel includes at least 100, 120, 140, 160, 180, 200, 240, 300, or 400 different probes. In other embodiments, a panel includes at least 1,000, 2,000, 5,000, 10,000, 12,000, 15,000, 20,000, 30,000, 40,000, 50,000, or 100,000 different probes. The plurality of probes together can comprise at least 0.01 million, 0.02 million, 0.03 million, 0.04 million, 0.05 million, 0.1 million, 0.2 million, 0.4 million, 0.6 million, 0.8 million, 1 million, 2 million, 3 million, 4 million, 5 million, 6 million, 7 million, 8 million, 9 million, or 10 million nucleotides.

The selected target genomic regions can be located in various positions in a genome, including but not limited to exons, introns, intergenic regions, and other parts. In some embodiments, probes targeting non-human genomic regions, such as those targeting viral genomic regions, can be added.

Probes

Cancer assay panels (e.g., bait sets) provided herein can include a set of hybridization probes (also referred to herein as "probes") designed to, during enrichment, target and pull down (e.g., via hybridization capture) nucleic acid fragments of interest for the assay. In some embodiments, the probes are designed to hybridize and enrich a modified fragment obtained from processing of DNA or cfDNA molecules from samples from a subject with cancer or a subject with a specific cancer type. The processing step can convert unmethylated cytosines (C) to uracils (U). The probes can be designed to anneal (or hybridize) to a target (complementary) strand of the modified fragment (e.g., DNA or RNA). The target strand can be the "positive" strand (e.g., the strand transcribed into mRNA, and subsequently translated into a protein) or the complementary "negative" strand. In a particular embodiment, a cancer assay panel includes sets of two probes, one probe targeting the positive strand and the other probe targeting the negative strand of a target genomic region.

For each target genomic region, four possible probe sequences can be designed. DNA molecules corresponding to, or derived from, each target region is double-stranded, as such, a probe or probe set can target either the "positive" or forward strand or its reverse complement (the "negative" strand). Additionally, in some embodiments, the probes or probe sets are designed to enrich DNA molecules or fragments that have been processed to convert unmethylated cytosines (C) to uracils (U). Because the probes or probe sets are designed to enrich DNA molecules corresponding to, or derived from the targeted regions after conversion, the probe's sequence can be designed to enrich DNA molecules of fragments where unmethylated C's have been converted to U's (by utilizing A's in place of G's at sites that are unmethylated cytosines in DNA molecules or fragments corresponding to, or derived from, the targeted region). In one embodiment, probes are designed to bind to, or hybridize to, DNA molecules or fragments from genomic regions known to contain cancer-specific methylation patterns (e.g., hypermethylated or hypomethylated DNA molecules), thereby enriching for cancer-specific DNA molecules or fragments. Targeting genomic regions, or cancer-specific methylation patterns, can be advantageous allowing one to specifically enrich for DNA molecules or fragments identified as informative for cancer or cancer tissue of origin, and thus, lowering sequencing needs and sequencing costs. In other embodiments, two probe sequences can be designed per a target genomic region (one for each DNA strand). In still other cases, probes are designed to enrich for all DNA molecules or fragments corresponding to, or derived from, a targeted region (i.e., regardless of strand or methylation status). This might be because the cancer methylation status is not highly methylated or unmethylated, or because the probes are designed to target small mutations or other variations rather than methylation changes, with these other variations similarly indicative of the presence or absence of a cancer or the presence or absence of a cancer of one or more tissue of origins. In that case, all four possible probe sequences can be included per a target genomic region.

For instance, cancer assay panels, such as bait sets for hybridization capture can include polynucleotide-containing probes that each include a nucleic acid sequence that either (1) is identical in sequence to a sequence within a genomic region (e.g., a genomic region listed in any one of Tables 1-24) or (2) varies with respect to a sequence in the genomic region only by one or more transitions, wherein each respective transition in the one or more transitions occurs at a nucleotide corresponding to a CpG site in the genomic region. Probes that are identical in sequence to a sequence within a genomic region may be used to bind to "completely methylated" cell-free DNA molecules in which none of the cytosine bases are converted to uracil. Conversely, probes having a nucleic acid sequence that varies with respect to a sequence in the genomic region only by one or more transitions (e.g., at CpG sites) can be used to bind to partially or completely methylated probes in which one or more (e.g., all) of the cytosines are unmethylated and subsequently converted to uracil by a deaminating agent such as sodium bisulfite.

The probes can range in length from 10s, 100s, 200s, or 300s of base pairs. The probes can comprise at least 45, 50, 75, 100, or 120 nucleotides. The probes can comprise less than 300, 250, 200, or 150 nucleotides. In an embodiment, the probes comprise 45-200 or 100-150 nucleotides. In one particular embodiment, the probes comprise 120 nucleotides.

The probes are designed to analyze methylation status of target genomic regions (e.g., of the human or another organism) that are suspected to correlate with the presence or absence of cancer generally, presence or absence of certain types of cancers, cancer stage, or presence or absence of other types of diseases.

Furthermore, the probes can be designed to effectively hybridize to (or bind to) and pull down cfDNA fragments containing a target genomic region. In some embodiments, the probes are designed to cover overlapping portions of a target genomic region, so that each probe is "tiled" in coverage such that each probe overlaps in coverage at least partially with another probe in the library (FIG. 1A). In such embodiments, the panel contains multiple pairs of probes, where each pair comprises at least two probes overlapping each other by an overlapping sequence of at least 25, 30, 35, 40, 45, 50, 60, 70, 75 or 100 nucleotides. In some embodiments, the overlapping sequence can be designed to have sequence homology with or to be complementary to a target genomic region (or a converted version thereof), thus a nucleotide fragment corresponding to or derived from, or containing the target genomic region can be bound and pulled down by at least one of the probes.

In one embodiment, a 2× tiled design, as illustrated in FIG. 1A, is used, where each base in a target region (the dotted rectangle in FIG. 1A) is overlapped by two probes. For instance, each pair of probes may include a first probe and a second probe that both differs from the first probe and overlaps in sequence with the first probe (e.g., overlap by at least 30 nucleotides). This is done to ensure that even relatively short DNA fragments (e.g., 100 bp) corresponding to, or derived from a targeted region, are guaranteed to have a substantial overlap (or sequence complementarity) with at least one probe, allowing for efficient capture of the relatively short DNA fragment. For example, a 100-bp DNA fragment overlapping a 30 bp target region would have at least a 75 bp overlap with at least one of the two probes. Other levels of tiling are possible. For example, to increase target size and capture efficiency, more probes can be tilted over a given target region. To increase capture of any DNA fragment that overlaps the target region, the probes can be designed to extend past the ends of the target region on either side on both sides. For example, probes can be designed to extend past the ends of a 30-bp target region by at least 50 bp, 60 bp, 70 bp, 80 bp, 90, or 100 bp.

In one embodiment, the smallest target genomic region is 30 bp. When a new target region is added to the panel (based on the greedy selection as described above), the new target region of 30 bp can be centered on a specific CpG site of interest. Then, it is checked whether each edge of this new target is close enough to other targets such that they can be merged. This is based on a "merge distance" parameter which can be 200 bp by default but can be tuned. This allows close but distinct target regions to be enriched with overlapping probes. Depending on whether close enough targets exist to the left or right of the new target, the new target can be merged with nothing (increasing the number of panel targets by one), merged with just one target either to the left or the right (not changing the number of panel targets), or merged with existing targets both to the left and right (reducing the number of panel targets by one).

An assay panel provided herein comprises a plurality of polynucleotide probes configured to hybridize to a modified fragment obtained from processing of the cfDNA molecules, wherein each of the cfDNA molecules corresponds to or is derived from one or more genomic regions. Stated differently, the polynucleotide-containing probes of a bait set may, as a group, correspond with a number of genomic regions. In some embodiments, at least 15%, 20%, 30%, or 40% of the genomic regions are in exons or introns. In some embodiments, at least 5%, 10%, 15%, 20%, 30% or 40% of the genomic regions are in exons. In some embodiments, less than 5%, 10%, 15%, 20%, 25%, or 30% of the genomic regions are in intergenic regions.

In some embodiments, each of the one or more genomic regions is selected from one or more of Tables 1-24. In some embodiments, each of the one or more genomic regions is selected from one or more of Tables 2-10 or 16-24. In some embodiments, each of the one or more genomic regions is selected from Table 1. In some embodiments, each of the one or more genomic regions is selected from Table 2. In some embodiments, each of the one or more genomic regions is selected from Table 3. In some embodiments, each of the one or more genomic regions is selected from Table 4. In some embodiments, each of the one or more genomic regions is selected from Table 5. In some embodiments, each of the one or more genomic regions is selected from Table 6. In some embodiments, each of the one or more genomic regions is selected from Table 7. In some embodiments, each of the one or more genomic regions is selected from Table 8. In some embodiments, each of the one or more genomic regions is selected from Table 9. In some embodiments, each of the one or more genomic regions is selected from Table 10. In some embodiments, each of the one or more genomic regions is selected from Table 11. In some embodiments, each of the one or more genomic regions is selected from Table 12. In some embodiments, each of the one or more genomic regions is selected from Table 13. In some embodiments, each of the one or more genomic regions is selected from Table 14. In some embodiments, each of the one or more genomic regions is selected from Table 15. In some embodiments, each of the one or more genomic regions is selected from Table 16. In some embodiments, each of the one or more genomic regions is selected from Table 17. In some embodiments, each of the one or more genomic regions is selected from Table 18. In some embodiments, each of the one or more genomic regions is selected from Table 19. In some embodiments, each of the one or more genomic regions is selected from Table 20. In some embodiments, each of the one or more genomic regions is selected from Table 21. In some embodiments, each of the one or more genomic regions is selected from Table 22. In some embodiments, each of the one or more genomic regions is selected from Table 23. In some embodiments, each of the one or more genomic regions is selected from Table 24.

In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of Tables 1-24. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of Tables 2-10 or 16-24. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 1. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 2. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 3. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 4. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 5. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 6. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 7. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 8. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 9. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 10. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 11. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 12. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 13. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 14. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 15. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 16. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 17. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 18. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 19. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 20. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 21. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 22. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 23. In some embodiments, an entirety of probes on the panel together are configured to hybridize to modified fragments obtained from the cfDNA molecules corresponding to or derived from at least 30%, 40%, 50%, 60%, 70%, 80%, 90% or 95% of the genomic regions in one or more of the genomic regions in Table 24.

In some embodiments, an entirety of probes on the panel together are configured to hybridize to modified fragments obtained from the cfDNA molecules corresponding to or derived from at least 500, 1,000, 5000, 10,000 or 15,000 genomic regions in one or more of Tables 1 or 11-15. In some embodiments, an entirety of probes on the panel together are configured to hybridize to modified fragments obtained from the cfDNA molecules corresponding to or derived from at least 50, 60, 70, 80, 90, 100, 120, 150, or 200 genomic regions from one or more of Tables 2-10 or 16-24. In some embodiments, an entirety of probes on the panel together are configured to hybridize to modified fragments obtained from the cfDNA molecules corresponding to or derived from at least 500, 1,000, 5000, 10,000 or 15,000 genomic regions in Table 13. In some embodiments, an entirety of probes on the panel together are configured to hybridize to modified fragments obtained from the cfDNA molecules corresponding to or derived from at least 500, 1,000, 5000, 10,000 or 15,000 genomic regions in Table 14. In some embodiments, an entirety of probes on the panel together are configured to hybridize to modified fragments obtained from the cfDNA molecules corresponding to or derived from at least 500, 1,000, 5000, 10,000 or 15,000 genomic regions in Table 15.

In some embodiments, an assay panel further comprises virus-specific probes, wherein each of the virus-specific probes is configured to hybridize to a viral genome fragment. The probes can be configured to hybridize a viral genome fragment from a viral strain associated with cancer. In some embodiment, the viral genome fragment is from MCV, EBV, HBV, HCMV, HCV, HHV5, HPV16, or HPV18. In some embodiments, the panel comprises at least 50, 100, 200, 300, 400, 500, 600, 700, 800, 900, 1000, 1500, 2000, 2500, or 3000 virus-specific probes.

Methods of Selecting Target Genomic Regions

In another aspect, methods of selecting target genomic regions for diagnosing cancer and/or a tissue of origin are provided. The targeted genomic regions can be used to design and manufacture probes for a cancer assay panel. Methylation status of DNA or cfDNA molecules corresponding to, or derived from, the target genomic regions can be screened by targeted sequencing using the cancer assay panel. Alternative methods, for example by WGBS or other methods known in the art, can be also implemented to detect methylation status of DNA molecules or fragments corresponding to, or derived from, the target genomic regions.

Sample Processing

For selection of target genomic regions, a nucleic acid sample (DNA or RNA) extracted from one or more subjects are used. In the present disclosure, DNA and RNA may be used interchangeably unless otherwise indicated. That is, the embodiments described herein may be applicable to both DNA and RNA types of nucleic acid sequences. However, the examples described herein may focus on DNA for purposes of clarity and explanation. The sample may be any subset of the human genome, including the whole genome. The sample may include blood, plasma, serum, urine, fecal, saliva, other types of bodily fluids, or any combination thereof. In some embodiments, methods for drawing a blood sample (e.g., syringe or finger prick) may be less invasive than procedures for obtaining a tissue biopsy, which may require surgery. The extracted sample may comprise cfDNA and/or ctDNA. For healthy individuals, the human body may naturally clear out cfDNA and other cellular debris. If a subject has a cancer or disease, ctDNA in an extracted sample may be present at a detectable level for diagnosis.

The cfDNA fragments are treated to convert unmethylated cytosines to uracils. In one embodiment, the method uses a bisulfite treatment of the DNA which converts the unmethylated cytosines to uracils without converting the methylated cytosines. For example, a commercial kit such as the EZ DNA Methylation™-Gold, EZ DNA Methylation™-Direct or an EZ DNA Methylation™-Lightning kit (available from Zymo Research Corp (Irvine, CA)) is used for the bisulfite conversion. In another embodiment, the conversion of unmethylated cytosines to uracils is accomplished using an enzymatic reaction. For example, the conversion can use a commercially available kit for conversion of unmethylated cytosines to uracils, such as APOBEC-Seq (NEBiolabs, Ipswich, MA).

With the converted cfDNA fragments, a sequencing library is prepared. In a first step, a ssDNA adapter is added to the 3'-OH end of a bisulfite-converted ssDNA molecule using a ssDNA ligation reaction. In one embodiment, the ssDNA ligation reaction uses CircLigase II (Epicentre) to ligate the ssDNA adapter to the 3'-OH end of a bisulfite-converted ssDNA molecule, wherein the 5'-end of the adapter is phosphorylated and the bisulfite-converted ssDNA has been dephosphorylated (i.e., the 3' end has a hydroxyl group). In another embodiment, the ssDNA ligation reaction uses Thermostable 5' AppDNA/RNA ligase (available from New England BioLabs (Ipswich, MA)) to ligate the ssDNA adapter to the 3'-OH end of a bisulfite-converted ssDNA molecule. In this example, the first UMI adapter is adenylated at the 5'-end and blocked at the 3'-end. In another embodiment, the ssDNA ligation reaction uses a T4 RNA ligase (available from New England BioLabs) to ligate the ssDNA adapter to the 3'-OH end of a bisulfite-converted ssDNA molecule. In a second step, a second strand DNA is synthesized in an extension reaction. For example, an extension primer that hybridizes to a primer sequence included in the ssDNA adapter is used in a primer extension reaction to form a double-stranded bisulfite-converted DNA molecule. Optionally, in one embodiment, the extension reaction uses an enzyme that is able to read through uracil residues in the bisulfite-converted template strand. Optionally, in a third step, a dsDNA adapter is added to the double-stranded bisulfite-converted DNA molecule. Finally, the double-stranded bisulfite-converted DNA is amplified to add sequencing adapters. For example, PCR amplification using a forward primer that includes a P5 sequence and a reverse primer that includes a P7 sequence is used to add P5 and P7 sequences to the bisulfite-converted DNA. Optionally, during library preparation, unique molecular identifiers (UMI) may be added to the nucleic acid molecules (e.g., DNA molecules) through adapter ligation. The UMIs are short nucleic acid sequences (e.g., 4-10 base pairs) that are added to ends of DNA fragments during adapter ligation. In some embodiments, UMIs are degenerate base pairs that serve as a unique tag that can be used to identify sequence reads originating from a specific DNA fragment. During PCR amplification following adapter ligation, the UMIs are replicated along with the attached DNA fragment, which provides a way to identify sequence reads that came from the same original fragment in downstream analysis.

Sequence reads are generated from the DNA sequences. The method may include next generation sequencing (NGS) techniques including synthesis technology (Illumina), pyrosequencing (454 Life Sciences), ion semiconductor technology (Ion Torrent sequencing), single-molecule real-time sequencing (Pacific Biosciences), sequencing by ligation (SOLiD sequencing), nanopore sequencing (Oxford Nanopore Technologies), or paired-end sequencing. In some embodiments, massively parallel sequencing is performed using sequencing-by-synthesis with reversible dye terminators.

Methylation state vectors are then generated from the sequence reads. To do so, a sequence read is aligned to a reference genome. The reference genome helps provide the context as to what position in a human genome the fragment cfDNA originates from. In a simplified example, the sequence read is aligned such that the three CpG sites correlate to CpG sites 23, 24, and 25 (arbitrary reference identifiers used for convenience of description). After alignment, there is information both on methylation status of all CpG sites on the cfDNA fragment and which position in the human genome the CpG sites map to. With the methylation status and location, a methylation state vector may be generated for the cfDNA fragment.

Generation of Data Structure

FIG. 3A is a flowchart describing a process 300 of generating a data structure for a healthy control group (e.g., reference samples), according to an embodiment. To create a healthy control group data structure, the analytics system obtains information related to methylation status of a plurality of CpG sites on sequence reads derived from a plurality of DNA molecules or fragments from a plurality of healthy subjects. The method provided herein for creating a healthy control group data structure can be performed similarly for subjects with cancer, subjects with cancer of a tissue of origin, subjects with a known cancer type, or subjects with another known disease state. A methylation state vector is generated for each DNA molecule or fragment, for example via the process 100.

With each fragment's methylation state vector, the analytics system subdivides 310 the methylation state vector into strings of CpG sites. In one embodiment, the analytics system subdivides 310 the methylation state vector such that the resulting strings are all less than a given length. For example, a methylation state vector of length 11 may be subdivided into strings of length less than or equal to 3 would result in 9 strings of length 3, 10 strings of length 2, and 11 strings of length 1. In another example, a methylation state vector of length 7 being subdivided into strings of length less than or equal to 4 would result in 4 strings of length 4, 5 strings of length 3, 6 strings of length 2, and 7 strings of length 1. If a methylation state vector is shorter than or the same length as the specified string length, then the methylation state vector may be converted into a single string containing all of the CpG sites of the vector.

The analytics system tallies 320 the strings by counting, for each possible CpG site and possibility of methylation states in the vector, the number of strings present in the control group having the specified CpG site as the first CpG site in the string and having that possibility of methylation states. For example, at a given CpG site and considering string lengths of 3, there are $2^3$ or 8 possible string configurations. At that given CpG site, for each of the 8 possible string configurations, the analytics system tallies 320 how many occurrences of each methylation state vector possibility come up in the control group. Continuing this example, this may involve tallying the following quantities: $<M_x, M_{x+1}, M_{x+2}>, <M_x, M_{x+1}, U_{x+2}>, \ldots, <U_x, U_{x+1}, U_{x+2}>$ for each starting CpG site x in the reference genome. The analytics system creates 330 the data structure storing the tallied counts for each starting CpG site and string possibility.

There are several benefits to setting an upper limit on string length. First, depending on the maximum length for a string, the size of the data structure created by the analytics system can dramatically increase in size. For instance, maximum string length of 4 means that every CpG site has at the very least $2^4$ numbers to tally for strings of length 4. Increasing the maximum string length to 5 means that every CpG site has an additional $2^4$ or 16 numbers to tally, doubling the numbers to tally (and computer memory required) compared to the prior string length. Reducing string size helps keep the data structure creation and performance (e.g., use for later accessing as described below), in terms of computational and storage, reasonable. Second, a statistical consideration to limiting the maximum string length is to avoid overfitting downstream models that use the string counts. If long strings of CpG sites do not, biologically, have a strong effect on the outcome (e.g., predictions of anomalousness that predictive of the presence of cancer), calculating probabilities based on large strings of CpG sites can be problematic as it requires a significant amount of data that may not be available, and thus would be too sparse for a model to perform appropriately. For example, calculating a probability of anomalousness/cancer conditioned on the prior 100 CpG sites would require counts of strings in the data structure of length 100, ideally some matching exactly the prior 100 methylation states. If only sparse counts of strings of length 100 are available, there will be insufficient data to determine whether a given string of length of 100 in a test sample is anomalous or not.

Validation of Data Structure

Once the data structure has been created, the analytics system may seek to validate 340 the data structure and/or any downstream models making use of the data structure. One type of validation checks consistency within the control group's data structure. For example, if there are any outlier subjects, samples, and/or fragments within a control group, then the analytics system may perform various calculations to determine whether to exclude any fragments from one of those categories. In a representative example, the healthy control group may contain a sample that is undiagnosed but cancerous such that the sample contains anomalously methylated fragments. This first type of validation ensures that potential cancerous samples are removed from the healthy control group so as to not affect the control group's purity.

A second type of validation checks the probabilistic model used to calculate p-values with the counts from the data structure itself (i.e., from the healthy control group). A process for p-value calculation is described below in conjunction with FIG. 5. Once the analytics system generates a p-value for the methylation state vectors in the validation group, the analytics system builds a cumulative density function (CDF) with the p-values. With the CDF, the analytics system may perform various calculations on the CDF to validate the control group's data structure. One test uses the fact that the CDF should ideally be at or below an identity function, such that $CDF(x) \leq x$. On the converse, being above the identity function reveals some deficiency within the probabilistic model used for the control group's data structure. For example, if $1/100$ of fragments have a p-value score of $1/1000$ meaning $CDF(1/1000)=1/100>1/1000$, then the second type of validation fails indicating an issue with the probabilistic model.

A third type of validation uses a healthy set of validation samples separate from those used to build the data structure, which tests if the data structure is properly built and the model works. An example process for carrying out this type of validation is described below in conjunction with FIG. 3B. The third type of validation can quantify how well the healthy control group generalizes the distribution of healthy samples. If the third type of validation fails, then the healthy control group does not generalize well to the healthy distribution.

A fourth type of validation tests with samples from a non-healthy validation group. The analytics system calculates p-values and builds the CDF for the non-healthy validation group. With a non-healthy validation group, the analytics system expects to see the $CDF(x)>x$ for at least some samples or, stated differently, the converse of what was expected in the second type of validation and the third type of validation with the healthy control group and the healthy validation group. If the fourth type of validation fails, then this is indicative that the model is not appropriately identifying the anomalousness that it was designed to identify.

FIG. 3B is a flowchart describing the additional step 340 of validating the data structure for the control group of FIG. 3A, according to an embodiment. In this embodiment of the step 340 of validating the data structure, the analytics system performs the fourth type of validation test as described above which utilizes a validation group with a supposedly similar composition of subjects, samples, and/or fragments as the control group. For example, if the analytics system selected healthy subjects without cancer for the control group, then the analytics system also uses healthy subjects without cancer in the validation group.

The analytics system takes the validation group and generates 100 a set of methylation state vectors as described in FIG. 3A. The analytics system performs a p-value calculation for each methylation state vector from the validation group. The p-value calculation process will be further described in conjunction with FIGS. 4 & 5. For each possibility of methylation state vector, the analytics system calculates a probability from the control group's data structure. Once the probabilities are calculated for the possibilities of methylation state vectors, the analytics system calculates 350 a p-value score for that methylation state vector based on the calculated probabilities. The p-value score represents an expectedness of finding that specific methylation state vector and other possible methylation state vectors having even lower probabilities in the control group. A low p-value score, thereby, generally corresponds to a methylation state vector which is relatively unexpected in comparison to other methylation state vectors within the control group, where a high p-value score generally corresponds to a methylation state vector which is relatively more expected in comparison to other methylation state vectors found in the control group. Once the analytics system generates a p-value score for the methylation state vectors in the validation group, the analytics system builds 360 a cumulative density function (CDF) with the p-value scores from the validation group. The analytics system validates 370 consistency of the CDF as described above in the fourth type of validation tests.

Anomalously Methylated Fragments

Figure 4:
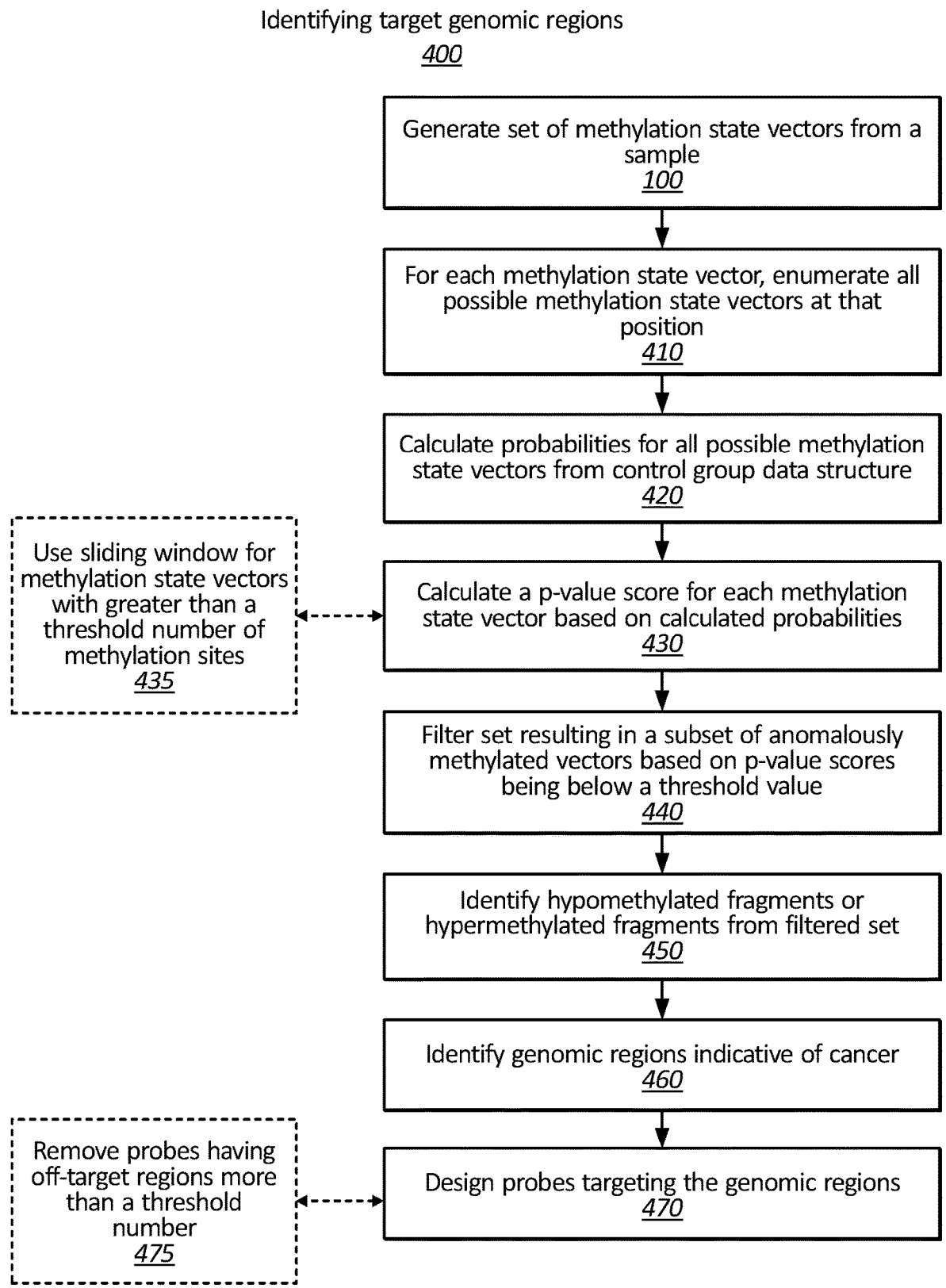
FIG. 4 is a flowchart describing a process for selecting genomic regions for designing probes for a cancer assay panel, according to an embodiment.

FIG. 4 is a flowchart describing a process 400 for identifying anomalously methylated fragments from a subject, according to an embodiment. An example of process 400 is visually illustrated in FIG. 5, and is further described below the description of FIG. 4. In process 400, the analytics system generates 100 methylation state vectors from cfDNA fragments of the subject. The analytics system handles each methylation state vector as follows.

In some embodiments, the analytics system filters fragments having indeterminate states at one or more CpG sites. In such embodiments, the analytics system implements a prediction model to identify fragments not likely to have an anomalous methylation pattern for filtering. For a sample fragment, the prediction model calculates a sample probability that the sample fragment's methylation state vector occurs in comparison to the healthy control group data structure. The prediction model randomly samples a subset of possible methylation state vectors encompassing the CpG sites in the sample fragment's methylation state vector. The prediction model calculates a probability corresponding to each of the sampled possible methylation state vectors. Probability calculations for the fragment's methylation state vector and the sampled possible methylation state vectors can be calculated according to a Markov chain model as will be described below in sub-section titled "P-value score calculation." The prediction model calculates a proportion of the sampled possible methylation state vectors corresponding to probabilities less than or equal to the sample probability. The prediction model generates an estimated p-value score for the fragment based on the calculated proportion. The prediction model may filter fragments corresponding to p-value scores above a threshold and retain fragments corresponding to p-value scores below the threshold.

In additional embodiments, the prediction model may calculate a confidence probability that is used by the prediction model to determine when to continue or when to terminate sampling. The confidence probability describes how likely the fragment's true p-value score (the calculation of the true p-value score further described below in sub-section titled P-value score calculation") is below a threshold based on the estimated p-value score and the probabilities of the sampled possible methylation state vectors. The prediction model may sample additional one or more possible methylation state vectors while iteratively calculating the estimated p-value score and the confidence probability. The prediction model may then terminate the sampling when the confidence probability is above a confidence threshold.

For a given methylation state vector, the analytics system enumerates 410 all possibilities of methylation state vectors having the same starting CpG site and same length (i.e., set of CpG sites) in the methylation state vector. As each observed methylation state may be methylated or unmethylated, there are only two possible states at each CpG site, and thus the count of distinct possibilities of methylation state vectors depends on a power of 2, such that a methylation state vector of length n would be associated with $2^n$ possibilities of methylation state vectors. With methylation state vectors inclusive of indeterminate states for one or more CpG sites, the analytics system may enumerate 410 possibilities of methylation state vectors considering only CpG sites that have observed states.

The analytics system calculates 420 the probability of observing each possibility of methylation state vector for the identified starting CpG site/methylation state vector length by accessing the healthy control group data structure. In one embodiment, calculating the probability of observing a given possibility uses a Markov chain probability to model the joint probability calculation which will be described in greater detail with respect to FIG. 5 below. In other embodiments, calculation methods other than Markov chain probabilities are used to determine the probability of observing each possibility of methylation state vector.

The analytics system calculates 430 a p-value score for the methylation state vector using the calculated probabilities for each possibility. In one embodiment, this includes identifying the calculated probability corresponding to the possibility that matches the methylation state vector in question. Specifically, this is the possibility having the same set of CpG sites, or similarly the same starting CpG site and length as the methylation state vector. The analytics system sums the calculated probabilities of any possibilities having probabilities less than or equal to the identified probability to generate the p-value score.

This p-value represents the probability of observing the methylation state vector of the fragment or other methylation state vectors even less probable in the healthy control group. A low p-value score, thereby, generally corresponds to a methylation state vector which is rare in a healthy subject, and which causes the fragment to be labeled anomalously methylated, relative to the healthy control group. A high p-value score generally relates to a methylation state vector expected to be present, in a relative sense, in a healthy subject. If the healthy control group is a non-cancerous group, for example, a low p-value indicates that the fragment is anomalous methylated relative to the non-cancer group, and therefore possibly indicative of the presence of cancer in the test subject.

As above, the analytics system calculates p-value scores for each of a plurality of methylation state vectors, each representing a cfDNA fragment in the test sample. To identify which of the fragments are anomalously methylated, the analytics system may filter 440 the set of methylation state vectors based on their p-value scores. In one embodiment, filtering is performed by comparing the p-values scores against a threshold and keeping only those fragments below the threshold. This threshold p-value score could be on the order of 0.1, 0.01, 0.001, 0.0001, or similar.

According to example results from the process 400, the analytics system can yield a median (range) of 2,800 (1,500-12,000) fragments with anomalous methylation patterns for participants without cancer in training, and a median (range) of 3,000 (1,200-220,000) fragments with anomalous methylation patterns for participants with cancer in training. These filtered sets of fragments with anomalous methylation patterns may be used for the downstream analyses as described below in the sub-section titled "Filtration of anomalously methylated fragments."

P-Value Score Calculation

FIG. 5 is an illustration 500 of an example p-value score calculation, according to an embodiment. To calculate a p-value score given a test methylation state vector 505, the analytics system takes that test methylation state vector 505 and enumerates 410 possibilities of methylation state vectors. In this illustrative example, the test methylation state vector 505 is <M23, M24, M25, U26>. As the length of the test methylation state vector 505 is 4, there are $2^4$ possibilities of methylation state vectors encompassing CpG sites 23-26. In a generic example, the number of possibilities of methylation state vectors is $2^n$, where n is the length of the test methylation state vector or alternatively the length of the sliding window (described further below).

The analytics system calculates 420 probabilities 515 for the enumerated possibilities of methylation state vectors. As methylation is conditionally dependent on methylation state of nearby CpG sites, one way to calculate the probability of observing a given methylation state vector possibility is to use Markov chain model. Generally a methylation state vector such as $<S_1, S_2, \ldots, S_n>$, where S denotes the methylation state whether methylated (denoted as M), unmethylated (denoted as U), or indeterminate (denoted as I), has a joint probability that can be expanded using the chain rule of probabilities as:

$$P(<S_1, S_2, \ldots, S_n>) = P(S_n|S_1, \ldots, S_{n-1})^* \\ P(S_{n-1}|S_n, \ldots, S_{n-2})^* \ldots * P(S_2|S_1)^* P(S_1) \quad (1)$$

Markov chain model can be used to make the calculation of the conditional probabilities of each possibility more efficient. In one embodiment, the analytics system selects a Markov chain order k which corresponds to how many prior CpG sites in the vector (or window) to consider in the conditional probability calculation, such that the conditional probability is modeled as $P(S_n|S_1, \ldots, S_{n-1}) \sim (S_n|S_{n-k-2}, \ldots, S_{n-1})$.

To calculate each Markov modeled probability for a possibility of methylation state vector, the analytics system accesses the control group's data structure, specifically the counts of various strings of CpG sites and states. To calculate $P(M_n|S_{n-k-2}, \ldots, S_{n-1})$, the analytics system takes a ratio of the stored count of the number of strings from the data structure matching $<S_{n-k-2}, \ldots, S_{n-1}, M_n>$ divided by the sum of the stored count of the number of strings from the data structure matching $<S_{n-k-2}, \ldots, S_{n-1}, M_n>$ and $<S_{n-k-2}, \ldots m\ S_{n-1}, U_n>$. Thus, $P(M_n|S_{n-k-2}, \ldots, S_{n-1})$, is calculated ratio having the form:

$$\frac{\#\ of\ <S_{n-k-2}, \ldots, S_{n-1}, M_n>}{\#\ of\ <S_{n-k-2}, \ldots, S_{n-1}, M_n> + \#\ of\ <S_{n-k-2}, \ldots, S_{n-1}, U_n>} \quad (2)$$

The calculation may additionally implement a smoothing of the counts by applying a prior distribution. In one embodiment, the prior distribution is a uniform prior as in Laplace smoothing. As an example of this, a constant is added to the numerator and another constant (e.g., twice the constant in the numerator) is added to the denominator of the above equation. In other embodiments, an algorithmic technique such as Knesser-Ney smoothing is used.

In the illustration, the above denoted formulas are applied to the test methylation state vector 505 covering sites 23-26. Once the calculated probabilities 515 are completed, the analytics system calculates 430 a p-value score 525 that sums the probabilities that are less than or equal to the probability of possibility of methylation state vector matching the test methylation state vector 505.

In embodiments with indeterminate states, the analytics system may calculate a p-value score summing out CpG sites with indeterminate states in a fragment's methylation state vector. The analytics system identifies all possibilities that have consensus with the all methylation states of the methylation state vector excluding the indeterminate states. The analytics system may assign the probability to the methylation state vector as a sum of the probabilities of the identified possibilities. As an example, the analytics system calculates a probability of a methylation state vector of $<M_1, I_2, U_3>$ as a sum of the probabilities for the possibilities of methylation state vectors of $<M_1, M_2, U_3>$ and $<M_1, U_2, U_3>$ since methylation states for CpG sites 1 and 3 are observed and in consensus with the fragment's methylation states at CpG sites 1 and 3. This method of summing out CpG sites with indeterminate states uses calculations of probabilities of possibilities up to $2^i$, wherein i denotes the number of indeterminate states in the methylation state vector. In additional embodiments, a dynamic programming algorithm may be implemented to calculate the probability of a methylation state vector with one or more indeterminate states. Advantageously, the dynamic programming algorithm operates in linear computational time.

In one embodiment, the computational burden of calculating probabilities and/or p-value scores may be further reduced by caching at least some calculations. For example, the analytic system may cache in transitory or persistent memory calculations of probabilities for possibilities of methylation state vectors (or windows thereof). If other fragments have the same CpG sites, caching the possibility probabilities allows for efficient calculation of p-value scores without needing to re-calculate the underlying possibility probabilities. Equivalently, the analytics system may calculate p-value scores for each of the possibilities of methylation state vectors associated with a set of CpG sites from vector (or window thereof). The analytics system may cache the p-value scores for use in determining the p-value scores of other fragments including the same CpG sites. Generally, the p-value scores of possibilities of methylation state vectors having the same CpG sites may be used to determine the p-value score of a different one of the possibilities from the same set of CpG sites.

Sliding Window

In one embodiment, the analytics system uses 435 a sliding window to determine possibilities of methylation state vectors and calculate p-values. Rather than enumerating possibilities and calculating p-values for entire methylation state vectors, the analytics system enumerates possibilities and calculates p-values for only a window of sequential CpG sites, where the window is shorter in length (of CpG sites) than at least some fragments (otherwise, the window would serve no purpose). The window length may be static, user determined, dynamic, or otherwise selected.

In calculating p-values for a methylation state vector larger than the window, the window identifies the sequential set of CpG sites from the vector within the window starting from the first CpG site in the vector. The analytic system calculates a p-value score for the window including the first CpG site. The analytics system then "slides" the window to the second CpG site in the vector, and calculates another p-value score for the second window. Thus, for a window size/and methylation vector length m, each methylation state vector will generate m−l+1 p-value scores. After completing the p-value calculations for each portion of the vector, the lowest p-value score from all sliding windows is taken as the overall p-value score for the methylation state vector. In another embodiment, the analytics system aggregates the p-value scores for the methylation state vectors to generate an overall p-value score.

Using the sliding window helps to reduce the number of enumerated possibilities of methylation state vectors and their corresponding probability calculations that would otherwise need to be performed. Example probability calculations are shown in FIG. 5, but generally the number of possibilities of methylation state vectors increases exponentially by a factor of 2 with the size of the methylation state vector. To give a realistic example, it is possible for fragments to have upwards of 54 CpG sites. Instead of computing probabilities for 2^54 (~1.8×10^16) possibilities to generate a single p-value score, the analytics system can instead use a window of size 5 (for example) which results in 50 p-value calculations for each of the 50 windows of the methylation state vector for that fragment. Each of the 50 calculations enumerates 2^5 (32) possibilities of methylation state vectors, which total results in 50×2^5 (1.6×10^3) probability calculations. This results in a vast reduction of calculations to be performed, with no meaningful hit to the accurate identification of anomalous fragments. This additional step can also be applied when validating 240 the control group with the validation group's methylation state vectors.

Filtration of Anomalously Methylated Fragments

In some embodiments, additional filtration step is performed to identify genomic regions that can be targeted for diagnosis of cancer or a type or stage of cancer.

Hypomethylated and Hypermethylated Fragments

Figure 6A:
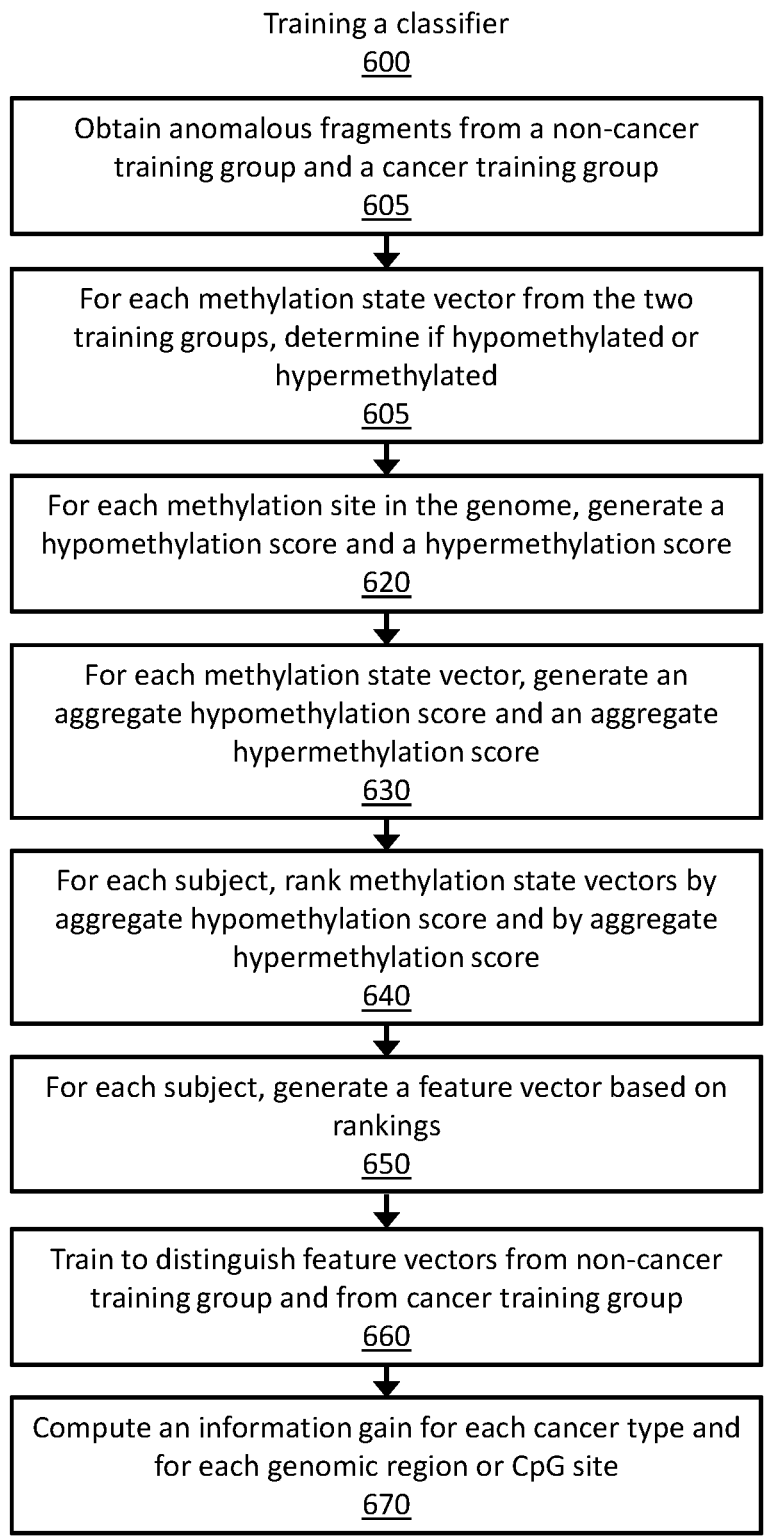
FIG. 6A is a flowchart describing a process of training a classifier based on hypomethylated and hypermethylated fragments indicative of cancer, according to an embodiment.
Figure 6B:
FIG. 6B is a flowchart describing a process of identifying fragments indicative of cancer determined by probabilistic models, according to an embodiment.

One additional analysis identifies 450 hypomethylated fragments or hypermethylated fragments from the filtered set. Fragments that are hypomethylated or hypermethylated may be defined as fragments of a certain length of CpG sites (e.g., more than 3, 4, 5, 6, 7, 8, 9, 10, etc.) with a high percentage of methylated CpG sites (e.g., more than 80%, 85%, 90%, or 95%, or any other percentage within the range of 50%-100%) or a high percentage of unmethylated CpG sites (e.g., more than 80%, 85%, 90%, or 95%, or any other percentage within the range of 50%-100%), respectively. FIGS. 6A-B, described below, illustrates an example process for identifying these hypomethylated or hypermethylated portions of a genome based on the set of anomalously methylated fragments.

Probabilistic Models

According to a second method, anomalous fragments are further filtered utilizing probabilistic models of methylation patterns fitted to either cancer type or non-cancer type. It calculates the log-odds ratio that the anomalous fragments from a subject are indicative of cancer generally, or of particular types of cancer. The log-odds ratio can be calculated by taking the log of a ratio of a probability of being cancerous over a probability of being non-cancerous (i.e., one minus the probability of being cancerous), both as determined by the applied 460 classification model.

In one embodiment of partitioning the genome, the analytics system partitions the genome into regions by multiple stages. In a first stage, the analytics system separates the genome into blocks of CpG sites. Each block is defined when there is a separation between two adjacent CpG sites that exceeds some threshold, e.g., greater than 200 bp, 300 bp, 400 bp, 500 bp, 600 bp, 700 bp, 800 bp, 900 bp, or 1,000 bp. From each block, the analytics system subdivides at a second stage each block into regions of a certain length, e.g., 500 bp, 600 bp, 700 bp, 800 bp, 900 bp, 1,000 bp, 1,100 bp, 1,200 bp, 1,300 bp, 1,400 bp, or 1,500 bp. The analytics system may further overlap adjacent regions by a percentage of the length, e.g., 10%, 20%, 30%, 40%, 50%, or 60%.

The analytics system analyzes sequence reads derived from DNA fragments for each region. The analytics system may process samples from tissue and/or high-signal cfDNA. High-signal cfDNA samples may be determined by a binary classification model, by cancer stage, or by another metric.

For each cancer type and non-cancer, the analytics system fits a separate probabilistic model for fragments. In one example, each probabilistic model is a mixture model comprising a combination of a plurality of mixture components with each mixture component being an independent-sites model where methylation at each CpG site is assumed to be independent of methylation statuses at other CpG sites.

In alternative embodiments, calculation is performed with respect to each CpG site. Specifically, a first count is determined that is the number of cancerous samples (cancer count) that include an anomalously methylated DNA fragment overlapping that CpG, and a second count is determined that is the total number of samples containing fragments overlapping that CpG (total) in the set. Genomic regions can be selected based on the numbers, for example, based on criteria positively correlated to the number of cancerous samples (cancer_count) that include a DNA fragment overlapping that CpG, and inversely correlated to the total number of samples containing fragments overlapping that CpG (total) in the set.

The analytics system can further calculate log-likelihood ratios ("R") for a fragment indicating a likelihood of the fragment being indicative of cancer considering the various cancer types with the fitted probabilistic models for each cancer type and non-cancer type, or for a cancer tissue of origin. The two probabilities may be taken from probabilistic models fitted for each of the cancer types and the non-cancer type, the probabilistic models defined to calculate a likelihood of observing a methylation pattern on a fragment given each of the cancer types and the non-cancer type. For example, the probabilistic models may be fitted for each of the cancer types and the non-cancer type.

Figure 11A:
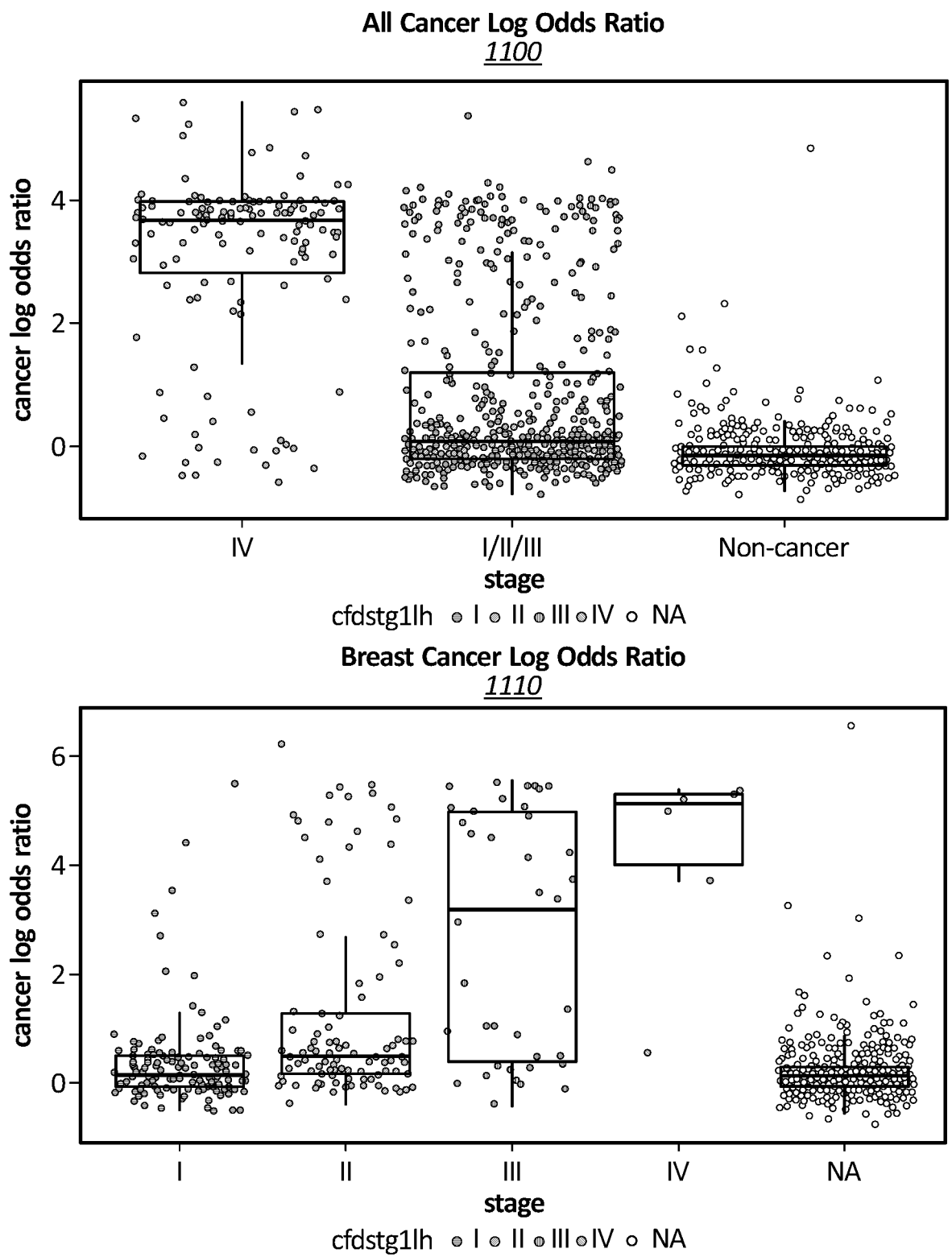
Figure 11C:
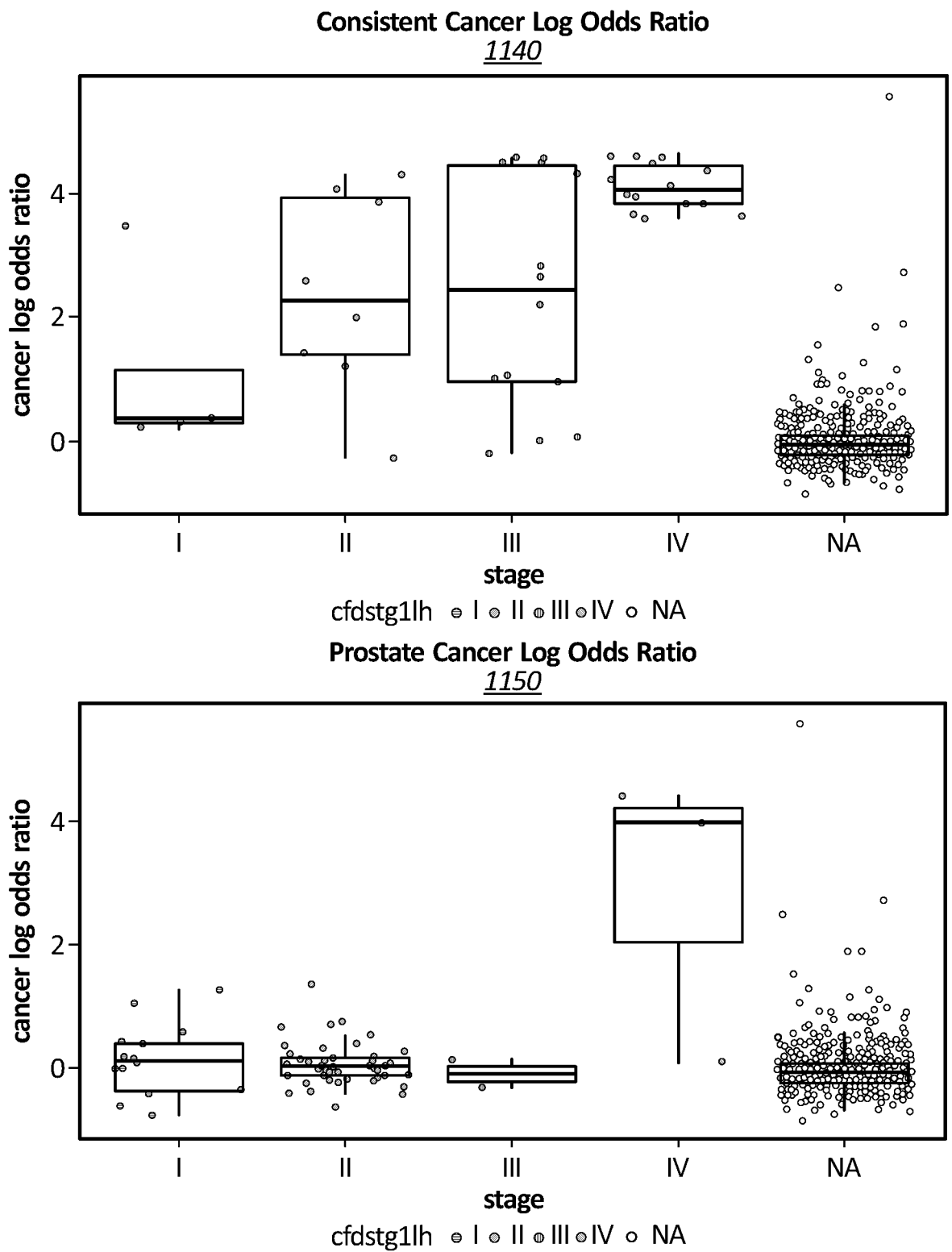

FIGS. 11A-11C show graphs of various cancers from various subjects across different stages, plotting the log-odds ratio of the anomalous fragments identified according to the process described with respect to FIG. 4 above. This underlying data was obtained via whole genome bisulfite sequencing of CCGA subjects (Clinical Trial.gov Identifier: NCT02889978 (https://www.clinicaltrials.gov/ct2/show/ NCT02889978; see Example 3). Briefly, data was obtained for more than 1700 clinically evaluable subjects with over 1400 subjects filtered including nearly 600 subjects without cancer and just over 800 subjects with cancer. The first graph 1100 in FIG. 11A shows all cancer cases across three different levels—non-cancer; stage I/II/II; and stage IV. The cancer log-odds ratio for stage IV is significantly larger than those for stage I/II/II and non-cancer. The second graph 1110 in FIG. 11A shows breast cancer cases across all stages of cancer and non-cancer, with a similar progression in log-odds ratio increasing through the progressive stages of cancer. The third graph 1120 in FIG. 11B shows breast cancer sub-types. Noticeably sub-types HER2+ and TNBC are more spread out, whereas HR+/HER2− is concentrated closer to ~1. The fourth graph 1130 in FIG. 11C shows lung cancer cases across all stages of cancer and non-cancer with steady progression through progressive stages of the lung cancer. The fifth graph 1140 shows colorectal cancer cases across all stages of cancer and non-cancer, again showing steady progression through progressive stages of the colorectal cancer. The sixth graph 1150 in FIG. 11C shows prostate cancer cases across all stages of cancer and non-cancer. This example is different than most of the previously illustrated, only stage IV is significantly different compared to other stages I/II/II and non-cancer.

Genomic Regions Indicative of Cancer and Classifiers

The analytics system identifies 460 genomic regions indicative of cancer. To identify these informative regions, the analytics system calculates an information gain for each genomic region or more specifically each CpG site that describes an ability to distinguish between various outcomes.

A method for identifying genomic regions capable of distinguishing between cancer type and non-cancer type utilizes a trained classification model that can be applied on the set of anomalously methylated DNA molecules or fragments corresponding to, or derived from a cancerous or non-cancerous group. The trained classification model can be trained to identify any condition of interest that can be identified from the methylation state vectors.

In one embodiment, the trained classification model is a binary classifier trained based on methylation states for cfDNA fragments or genomic sequences obtained from a subject cohort with cancer or a cancer type, and a healthy subject cohort without cancer, and is then used to classify a test subject probability of having cancer, a cancer type, or not having cancer, based on methylation state vectors. In other embodiments, different classifiers may be trained using subject cohorts known to have particular cancer (e.g., breast, lung, prostrate, etc.); known to have cancer of particular tissue of origin where the cancer is believed to originate; or known to have different stages of particular cancer (e.g., breast, lung, prostrate, etc.). In these embodiments, different classifiers may be trained using sequence reads obtained from samples enriched for tumor cells from subject cohorts known to have particular cancer (e.g., breast, lung, prostrate, etc.). Each genomic region's ability to distinguish between cancer type and non-cancer type in the classification model is used to rank the genomic regions from most informative to least informative in classification performance. The analytics system may identify genomic regions from the ranking according to information gain in classification between non-cancer type and cancer type. Probes may be designed 470 to target the identified genome regions.

Computing Information Gain from Hypomethylated and Hypermethylated Fragments Indicative of Cancer With fragments indicative of cancer, the analytics system may train a classifier according to a process 600 illustrated in FIG. 6A, according to an embodiment. The process 600 accesses two training groups of samples—a non-cancer group and a cancer group—and obtains 605 a non-cancer set of methylation state vectors and a cancer set of methylation state vectors comprising anomalously methylated fragments, e.g., via step 440 from the process 400.

The process determines 610, for each methylation state vector, whether the methylation state vector is indicative of cancer. Here, fragments indicative of cancer may be defined as hypermethylated or hypomethylated fragments determined if at least some number of CpG sites have a particular state (methylated or unmethylated, respectively) and/or have a threshold percentage of sites that are the particular state (again, methylated or unmethylated, respectively). In one example, cfDNA fragments are identified as hypomethylated or hypermethylated, respectively, if the fragment overlaps at least 5 CpG sites, and at least 80% of its CpG sites are methylated or at least 80% are unmethylated. In an alternate embodiment, the process considers portions of the methylation state vector and determines whether the portion is hypomethylated or hypermethylated, and may distinguish that portion to be hypomethylated or hypermethylated. This alternative method resolves missing methylation state vectors which are large in size but contain at least one region of dense hypomethylation or hypermethylation. This process of defining hypomethylation and hypermethylation can be applied in step 450 of FIG. 4. In another embodiment, the fragments indicative of cancer may be defined according to likelihoods outputted from trained probabilistic models.

In one embodiment, the process generates 620 a hypomethylation score ($P_{hypo}$) and a hypermethylation score ($P_{hyper}$) per CpG site in the genome. To generate either score at hyper, a given CpG site, the classifier takes four counts at that CpG site—(1) count of (methylations state) vectors of the cancer set labeled hypomethylated that overlap the CpG site; (2) count of vectors of the cancer set labeled hypermethylated that overlap the CpG site; (3) count of vectors of the non-cancer set labeled hypomethylated that overlap the CpG site; and (4) count of vectors of the non-cancer set labeled hypermethylated that overlap the CpG site. Additionally, the process may normalize these counts for each group to account for variance in group size between the non-cancer group and the cancer group. In alternative embodiments wherein fragments indicative of cancer are more generally used, the scores may be more broadly defined as counts of fragments indicative of cancer at each genomic region and/or CpG site.

Specifically, in one embodiment, to generate 620 the hypomethylation score at a given CpG site, the process takes a ratio of (1) over (1) summed with (3). Similarly, the hypermethylation score is calculated by taking a ratio of (2) over (2) and (4). Additionally, these ratios may be calculated with an additional smoothing technique as discussed above. The hypomethylation score and the hypermethylation score relate to an estimate of cancer probability given the presence of hypomethylation or hypermethylation of fragments from the cancer set.

The process generates 630 an aggregate hypomethylation score and an aggregate hypermethylation score for each anomalous methylation state vector. The aggregate hyper and hypo methylation scores, are determined based on the hyper and hypo methylation scores of the CpG sites in the methylation state vector. In one embodiment, the aggregate hyper and hypo methylation scores are assigned as the largest hyper and hypo methylation scores of the sites in each state vector, respectively. However, in alternate embodiments, the aggregate scores could be based on means, medians, or other calculations that use the hyper/hypo methylation scores of the sites in each vector.

The process 600 ranks 640 all of that subject's methylation state vectors by their aggregate hypomethylation score and by their aggregate hypermethylation score, resulting in two rankings per subject. The process selects aggregate hypomethylation scores from the hypomethylation ranking and aggregate hypermethylation scores from the hypermethylation ranking. With the selected scores, the classifier generates 650 a single feature vector for each subject. In one embodiment, the scores selected from either ranking are selected with a fixed order that is the same for each generated feature vector for each subject in each of the training groups. As an example, in one embodiment the classifier selects the first, the second, the fourth, and the eighth aggregate hyper methylation score, and similarly for each aggregate hypo methylation score, from each ranking and writes those scores in the feature vector for that subject.

The process trains 660 a binary classifier to distinguish feature vectors between the cancer and non-cancer training groups. Generally, any one of a number of classification techniques may be used. In one embodiment the classifier is a non-linear classifier. In a specific embodiment, the classifier is a non-linear classifier utilizing a L2-regularized kernel logistic regression with a Gaussian radial basis function (RBF) kernel.

Specifically, in one embodiment, the number of non-cancer samples or different cancer type(s) ($n_{other}$) and the number of cancer samples or cancer type(s) ($n_{cancer}$) having an anomalously methylated fragment overlapping a CpG site are counted. Then the probability that a sample is cancer is estimated by a score ("S") that positively correlates to $n_{cancer}$ and inversely correlated to $n_{other}$. The score can be calculated using the equation: $(n_{cancer}+1)/(n_{cancer}+n_{other}+2)$ or $(n_{cancer})/(n_{cancer}+n_{other})$. The analytics system computes 670 an information gain for each cancer type and for each genomic region or CpG site to determine whether the genomic region or CpG site is indicative of cancer. The information gain is computed for training samples with a given cancer type compared to all other samples. For example, two random variables 'anomalous fragment' ('AF') and 'cancer type' (CT') are used. In on embodiment, AF is a binary variable indicating whether there is an anomalous fragment overlapping a given CpG site in a given samples as determined for the anomaly score/feature vector above. CT is a random variable indicating whether the cancer is of a particular type. The analytics system computes the mutual information with respect to CT given AF. That is, how many bits of information about the cancer type are gained if it is known whether there is an anomalous fragment overlapping a particular CpG site.

For a given cancer type, the analytics system uses this information to rank CpG sites based on how cancer specific they are. This procedure is repeated for all cancer types under consideration. If a particular region is commonly anomalously methylated in training samples of a given cancer but not in training samples of other cancer types or in healthy training samples, then CpG sites overlapped by those anomalous fragments will tend to have high information gains for the given cancer type. The ranked CpG sites for each cancer type are greedily added (selected) to a selected set of CpG sites based on their rank for use in the cancer classifier.

Computing Pairwise Information Gain from Fragments Indicative of Cancer Identified from Probabilistic Models With fragments indicative of cancer identified according to the second method under the probabilistic models, the analytics may identify genomic regions according to the process 680 in FIG. 6B. The analytics system defines 690 a feature vector for each sample, for each region, for each cancer type by a count of DNA fragments that have a calculated log-likelihood ratio that the fragment is indicative of cancer above a plurality of thresholds, wherein each count is a value in the feature vector. In one embodiment, the analytics system counts the number of fragments present in a sample at a region for each cancer type with log-likelihood ratios above one or a plurality of possible threshold values. The analytics system defines a feature vector for each sample, by a count of DNA fragments for each genomic region for each cancer type that provides a calculated log-likelihood ratio for the fragment above a plurality of thresholds, wherein each count is a value in the feature vector. The analytics system uses the defined feature vectors to calculate an informative score for each genomic region describing that genomic region's ability to distinguish between each pair of cancer types. For each pair of cancer types, the analytics system ranks regions based on the informative scores. The analytics system may select regions based on the ranking according to informative scores.

The analytics system calculates 695 an informative score for each region describing that region's ability to distinguish between each pair of cancer types. For each pair of distinct cancer types, the analytics system may specify one type as a positive type and the other as a negative type. In one embodiment, a region's ability to distinguish between the positive type and the negative type is based on mutual information, calculated using the estimated fraction of cfDNA samples of the positive type and of the negative type for which the feature would be expected to be non-zero in the final assay, i.e., at least one fragment of that tier that would be sequenced in a targeted methylation assay. Those fractions are estimated using the observed rates at which the feature occurs in healthy cfDNA, and in high-signal cfDNA and/or tumor samples of each cancer type. For example, if a feature occurs frequently in healthy cfDNA, then it will also be estimated to occur frequently in cfDNA of any cancer type, and would likely result in a low informative score. The analytics system may choose a certain number of regions for each pair of cancer types from the ranking, e.g., 1024.

In additional embodiments, the analytics system further identifies predominantly hypermethylated or hypomethylated regions from the ranking of regions. The analytics system may load the set of fragments in the positive type(s) for a region that was identified as informative. The analytics system, from the loaded fragments, evaluates whether the loaded fragments are predominantly hypermethylated or hypomethylated. If the loaded fragments are predominately hypermethylated or hypomethylated, the analytics system may select probes corresponding to the predominant methylation pattern. If the loaded fragments are not predominantly hypermethylated or hypomethylated, the analytics system may use a mixture of probes for targeting both hypermethylation and hypomethylation. The analytics system may further identify a minimal set of CpG sites that overlap more than some percentage of the fragments.

In other embodiments, the analytics system, after ranking the regions based on informative scores, labels each region with the lowest informative ranking across all pairs of cancer types. For example, if a region was the 10th-most-informative region for distinguishing breast from lung, and the 5th-most-informative for distinguishing breast from colorectal, then it would be given an overall label of "5". The analytics system may design probes starting with the lowest-labeled regions while adding regions to the panel, e.g., until the panel's size budget has been exhausted.

Off-Target Genomic Regions

In some embodiments, probes targeting selected genomic regions are further filtered 475 based on the number of their off-target regions. This is for screening probes that pull down too many cfDNA fragments corresponding to, or derived from, off-target genomic regions. Exclusion of probes having many off-target regions can be valuable by decreasing off-target rates and increasing target coverage for a given amount of sequencing.

An off-target genomic region is a genomic region that has sufficient homology to a target genomic region, such that DNA molecules or fragments derived from off-target genomic regions are hybridized to and pulled down by a probe designed to hybridize to a target genomic region. An off-target genomic region can be a genomic region that aligns to a probe along at least 35 bp, 40 bp, 45 bp, 50 bp, 60 bp, 70 bp, or 80 bp with at least 80%, 85%, 90%, 95%, or 97% match rate. In one embodiment, an off-target genomic region is a genomic region that aligns to a probe along at least 45 bp with at least a 90% match rate. Various methods known in the art can be adopted to screen off-target genomic regions.

Exhaustively searching the genome to find all off-target genomic regions can be computationally challenging. In one embodiment, a k-mer seeding strategy (which can allow one or more mismatches) is combined to local alignment at the seed locations. In this case, exhaustive searching of good alignments can be guaranteed based on k-mer length, number of mismatches allowed, and number of k-mer seed hits at a particular location. This requires doing dynamic programing local alignment at a large number of locations, so this approach is highly optimized to use vector CPU instructions (e.g., AVX2, AVX512) and also can be parallelized across many cores within a machine and also across many machines connected by a network. A person of ordinary skill will recognize that modifications and variations of this approach can be implemented for the purpose of identifying off-target genomic regions.

In some embodiments, probes having sequence homology with off-target genomic regions, or DNA molecules corresponding to, or derived from off-target genomic regions comprising more than a threshold number are excluded (or filtered) from the panel. For example, probes having sequence homology with off-target genomic regions, or DNA molecules corresponding to, or derived from off-target genomic regions from more than 30, more than 25, more than 20, more than 18, more than 15, more than 12, more than 10, or more than 5 off-target regions are excluded.

In some embodiments, probes are divided into 2, 3, 4, 5, 6, or more separate groups depending on the numbers of off-target regions. For example, probes having sequence homology with no off-target regions or DNA molecules corresponding to, or derived from off-target regions are assigned to high-quality group, probes having sequence homology with 1-18 off-target regions or DNA molecules corresponding to, or derived from 1-18 off-target regions, are assigned to low-quality group, and probes having sequence homology with more than 19 off-target regions or DNA molecules corresponding to, or derived from 19 off-target regions, are assigned to poor-quality group. Other cut-off values can be used for the grouping.

In some embodiments, probes in the lowest quality group are excluded. In some embodiments, probes in groups other than the highest-quality group are excluded. In some embodiments, separate panels are made for the probes in each group. In some embodiments, all the probes are put on the same panel, but separate analysis is performed based on the assigned groups.

In some embodiments, a panel comprises a larger number of high-quality probes than the number of probes in lower groups. In some embodiments, a panel comprises a smaller number of poor-quality probes than the number of probes in other group. In some embodiments, more than 95%, 90%, 85%, 80%, 75%, or 70% of probes in a panel are high-quality probes. In some embodiments, less than 35%, 30%, 20%, 10%, 5%, 4%, 3%, 2% or 1% of the probes in a panel are low-quality probes. In some embodiments, less than 5%, 4%, 3%, 2% or 1% of the probes in a panel are poor-quality probes. In some embodiments, no poor-quality probes are included in a panel.

In some embodiments, probes having below 50%, below 40%, below 30%, below 20%, below 10% or below 5% are excluded. In some embodiments, probes having above 30%, above 40%, above 50%, above 60%, above 70%, above 80%, or above 90% are selectively included in a panel.

Methods of using Cancer Assay Panel

In yet another aspect, methods of using a cancer assay panel are provided. The methods can comprise steps of treating DNA molecules or fragments to convert unmethylated cytosines to uracils (e.g., using bisulfite treatment), applying a cancer panel (as described herein) to the converted DNA molecules or fragments, enriching a subset of converted DNA molecules or fragments that hybridize (or bind) to the probes in the panel, and sequencing the enriched cfDNA fragments. The step of applying the cancer panel to the converted DNA molecules or fragments is performed in a condition where the converted DNA molecules or fragments can bind to probes on the cancer panel. Thus, converted DNA molecules or fragments bound to the probes can be selectively isolated. In some embodiments, the sequence reads can be compared to a reference genome (e.g., a human reference genome), allowing for identification of methylation states at a plurality of CpG sites within the DNA molecules or fragments and thus provide information relevant to diagnosis of cancer.

Sample Processing

Figure 7A:
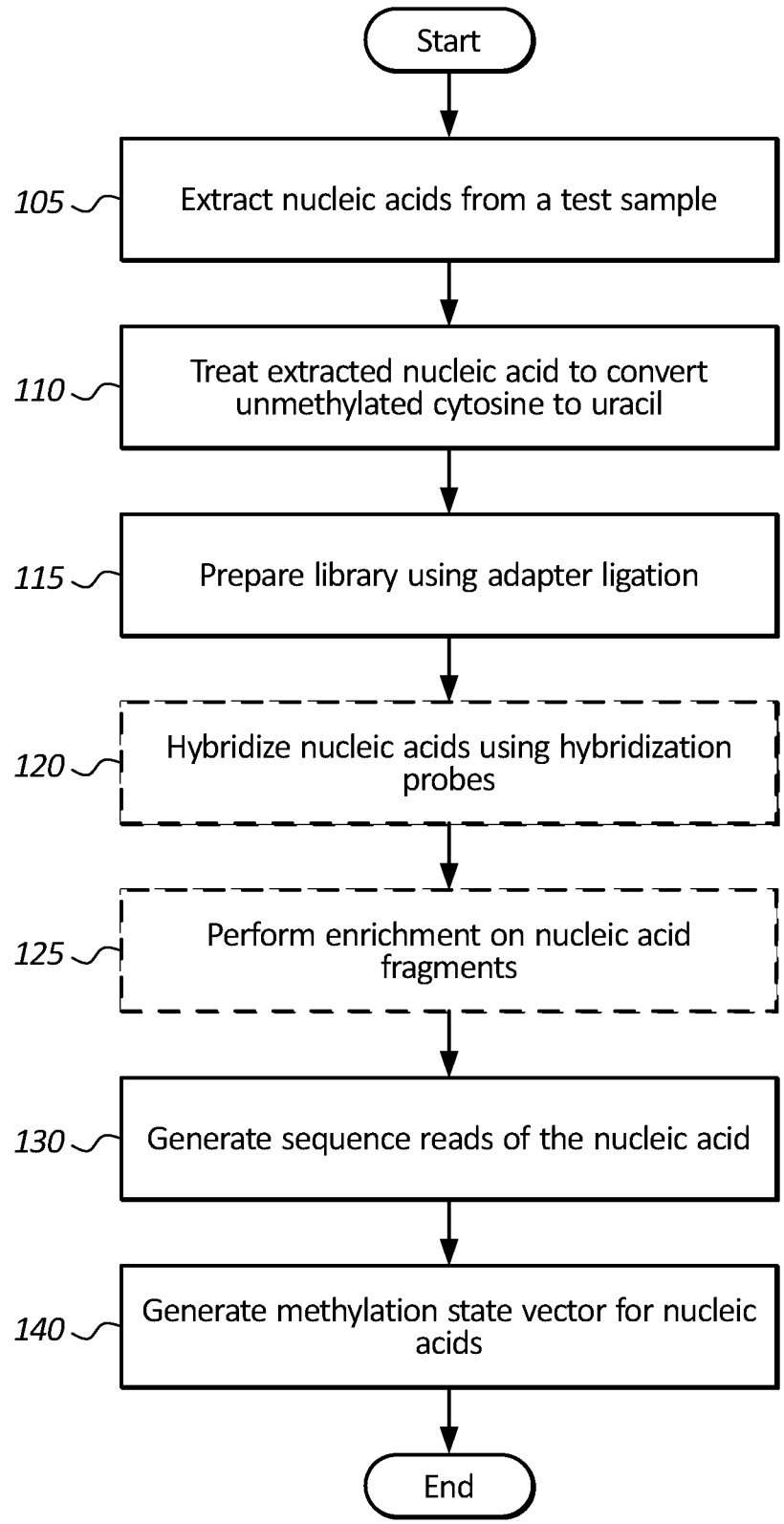
FIG. 7A is a flowchart describing a process of sequencing a fragment of cell-free (cf) DNA, according to an embodiment.

FIG. 7A is a flowchart of a method for preparing a nucleic acid sample for analyzing according to one embodiment. The method includes, but is not limited to, the following steps. For example, any step of the method may comprise a quantitation sub-step for quality control or other laboratory assay procedures known to one skilled in the art.

In step 105, a nucleic acid sample (DNA or RNA) is extracted from a subject. In the present disclosure, DNA and RNA may be used interchangeably unless otherwise indicated. That is, the embodiments described herein may be applicable to both DNA and RNA types of nucleic acid sequences. However, the examples described herein may focus on DNA for purposes of clarity and explanation. The sample may be any subset of the human genome, including the whole genome. The sample may include blood, plasma, serum, urine, fecal, saliva, other types of bodily fluids, or any combination thereof. In some embodiments, methods for drawing a blood sample (e.g., syringe or finger prick) may be less invasive than procedures for obtaining a tissue biopsy, which may require surgery. The extracted sample may comprise cfDNA and/or ctDNA. For healthy individuals, the human body may naturally clear out cfDNA and other cellular debris. If a subject has a cancer or disease, ctDNA in an extracted sample may be present at a detectable level for diagnosis.

In step 110, the cfDNA fragments are treated to convert unmethylated cytosines to uracils. In one embodiment, the method uses a bisulfite treatment of the DNA which converts the unmethylated cytosines to uracils without converting the methylated cytosines. For example, a commercial kit such as the EZ DNA Methylation™-Gold, EZ DNA Methylation™-Direct or an EZ DNA Methylation™-Lightning kit (available from Zymo Research Corp (Irvine, CA)) is used for the bisulfite conversion. In another embodiment, the conversion of unmethylated cytosines to uracils is accomplished using an enzymatic reaction. For example, the conversion can use a commercially available kit for conversion of unmethylated cytosines to uracils, such as APOBEC-Seq (NEBiolabs, Ipswich, MA).

In step 115, a sequencing library is prepared. In a first step, a ssDNA adapter is added to the 3'-OH end of a bisulfite-converted ssDNA molecule using a ssDNA ligation reaction. In one embodiment, the ssDNA ligation reaction uses CircLigase II (Epicentre) to ligate the ssDNA adapter to the 3'-OH end of a bisulfite-converted ssDNA molecule, wherein the 5'-end of the adapter is phosphorylated and the bisulfite-converted ssDNA has been dephosphorylated (i.e., the 3' end has a hydroxyl group). In another embodiment, the ssDNA ligation reaction uses Thermostable 5' AppDNA/RNA ligase (available from New England BioLabs (Ipswich, MA)) to ligate the ssDNA adapter to the 3'-OH end of a bisulfite-converted ssDNA molecule. In this example, the first UMI adapter is adenylated at the 5'-end and blocked at the 3'-end. In another embodiment, the ssDNA ligation reaction uses a T4 RNA ligase (available from New England BioLabs) to ligate the ssDNA adapter to the 3'-OH end of a bisulfate-converted ssDNA molecule. In a second step, a second strand DNA is synthesized in an extension reaction. For example, an extension primer that hybridizes to a primer sequence included in the ssDNA adapter is used in a primer extension reaction to form a double-stranded bisulfate-converted DNA molecule. Optionally, in one embodiment, the extension reaction uses an enzyme that is able to read through uracil residues in the bisulfite-converted template strand. Optionally, in a third step, a dsDNA adapter is added to the double-stranded bisulfate-converted DNA molecule. Finally, the double-stranded bisulfite-converted DNA is amplified to add sequencing adapters. For example, PCR amplification using a forward primer that includes a P5 sequence and a reverse primer that includes a P7 sequence is used to add P5 and P7 sequences to the bisulfate-converted DNA. Optionally, during library preparation, unique molecular identifiers (UMI) may be added to the nucleic acid molecules (e.g., DNA molecules) through adapter ligation. The UMIs are short nucleic acid sequences (e.g., 4-10 base pairs) that are added to ends of DNA fragments during adapter ligation. In some embodiments, UMIs are degenerate base pairs that serve as a unique tag that can be used to identify sequence reads originating from a specific DNA fragment. During PCR amplification following adapter ligation, the UMIs are replicated along with the attached DNA fragment, which provides a way to identify sequence reads that came from the same original fragment in downstream analysis.

In step 120, targeted DNA sequences may be enriched from the library (e.g., via hybridization). Any suitable method of enrichment may be used. For instance, in some embodiments, a targeted panel assay is performed on (e.g., comes into contact with) the samples. During enrichment, hybridization probes (also referred to herein as "probes") can be used to target and pull down nucleic acid fragments informative for the presence or absence of cancer (or disease), cancer status, or a cancer classification (e.g., cancer type or tissue of origin). For a given workflow, the probes may be designed to anneal (or hybridize) to a target (complementary) strand of DNA or RNA. The target strand may be the "positive" strand (e.g., the strand transcribed into mRNA, and subsequently translated into a protein) or the complementary "negative" strand. The probes may range in length from 10s, 100s, or 1000s of base pairs. Moreover, the probes may cover overlapping portions of a target region.

In some instances, primers may be used to specifically amplify targets/biomarkers of interest (e.g., by PCR), thereby enriching the sample for desired targets/biomarkers (optionally without hybridization capture). For example, forward and reverse primers can be prepared for each genomic region of interest and used to amplify fragments that correspond to or are derived from the desired genomic region. Thus, while the present disclosure pays particular attention to cancer assay panels and bait sets, the disclosure is broad enough to encompass other methods for enrichment of cell-free DNA. Accordingly, a skilled artisan, with the benefit of this disclosure, will recognize that methods analogous to those described herein in connection with hybridization capture can alternatively be accomplished by replacing hybridization capture with some other enrichment strategy, such as PCR amplification of cell-free DNA fragments that correspond with genomic regions of interest. In some embodiments, bisulfite padlock probe capture is used to enrich regions of interest, such as is described in Zhang et al. (US 2016/0340740). In some embodiments, additional or alternative methods are used for enrichment (e.g., non-targeted enrichment) such as reduced representation bisulfite sequencing, methylation restriction enzyme sequencing, methylation DNA immunoprecipitation sequencing, methyl-CpG-binding domain protein sequencing, methyl DNA capture sequencing, or microdroplet PCR.

After pull down and/or hybridization (see step 120), the hybridized nucleic acid fragments may optionally also be amplified using PCR (enrichment 125). For example, the target sequences can be enriched to obtain enriched sequences that can be subsequently sequenced. In general, any known method in the art can be used to isolate, and enrich for, probe-hybridized target nucleic acids. For example, as is well known in the art, a biotin moiety can be added to the 5'-end of the probes (i.e., biotinylated) to facilitate isolation of target nucleic acids hybridized to probes using a streptavidin-coated surface (e.g., streptavidin-coated beads). Nucleic acid fragments are applied to a panel comprising the probes in the condition that allows specific binding of the nucleic acid fragments to complementary probes. Thus, it enables selective isolation and enrichment of nucleic acid fragments that have high affinity to the probes.

In step 130, sequence reads are generated from the enriched DNA sequences, e.g., enriched sequences. Sequencing data may be acquired from the enriched DNA sequences by known means in the art. For example, the method may include next generation sequencing (NGS) techniques including synthesis technology (Illumina), pyrosequencing (454 Life Sciences), ion semiconductor technology (Ion Torrent sequencing), single-molecule real-time sequencing (Pacific Biosciences), sequencing by ligation (SOLiD sequencing), nanopore sequencing (Oxford Nanopore Technologies), or paired-end sequencing. In some embodiments, massively parallel sequencing is performed using sequencing-by-synthesis with reversible dye terminators.

Analysis of Sequence Reads

In some embodiments, the sequence reads may be aligned to a reference genome using known methods in the art to determine alignment position information. The alignment position information may indicate a beginning position and an end position of a region in the reference genome that corresponds to a beginning nucleotide base and end nucleotide base of a given sequence read. Alignment position information may also include sequence read length, which can be determined from the beginning position and end position. A region in the reference genome may be associated with a gene or a segment of a gene.

In various embodiments, a sequence read is comprised of a read pair denoted as $R_1$ and $R_2$. For example, the first read $R_1$ may be sequenced from a first end of a nucleic acid fragment whereas the second read $R_2$ may be sequenced from the second end of the nucleic acid fragment. Therefore, nucleotide base pairs of the first read $R_1$ and second read $R_2$ may be aligned consistently (e.g., in opposite orientations) with nucleotide bases of the reference genome. Alignment position information derived from the read pair $R_1$ and $R_2$ may include a beginning position in the reference genome that corresponds to an end of a first read (e.g., $R_1$) and an end position in the reference genome that corresponds to an end of a second read (e.g., $R_2$). In other words, the beginning position and end position in the reference genome represent the likely location within the reference genome to which the nucleic acid fragment corresponds. An output file having SAM (sequence alignment map) format or BAM (binary alignment map) format may be generated and output for further analysis.

From the sequence reads, the location and methylation state for each of CpG site may be determined based on alignment to a reference genome. Further, a methylation state vector for each fragment may be generated specifying a location of the fragment in the reference genome (e.g., as specified by the position of the first CpG site in each fragment, or another similar metric), a number of CpG sites in the fragment, and the methylation state of each CpG site in the fragment whether methylated (e.g., denoted as M), unmethylated (e.g., denoted as U), or indeterminate (e.g., denoted as I). The methylation state vectors may be stored in temporary or persistent computer memory for later use and processing. Further, duplicate reads or duplicate methylation state vectors from a single subject may be removed. In an additional embodiment, it may be determined that a certain fragment has one or more CpG sites that have an indeterminate methylation status. Such fragments may be excluded from later processing or selectively included where downstream data model accounts for such indeterminate methylation statuses.

Figure 7B:
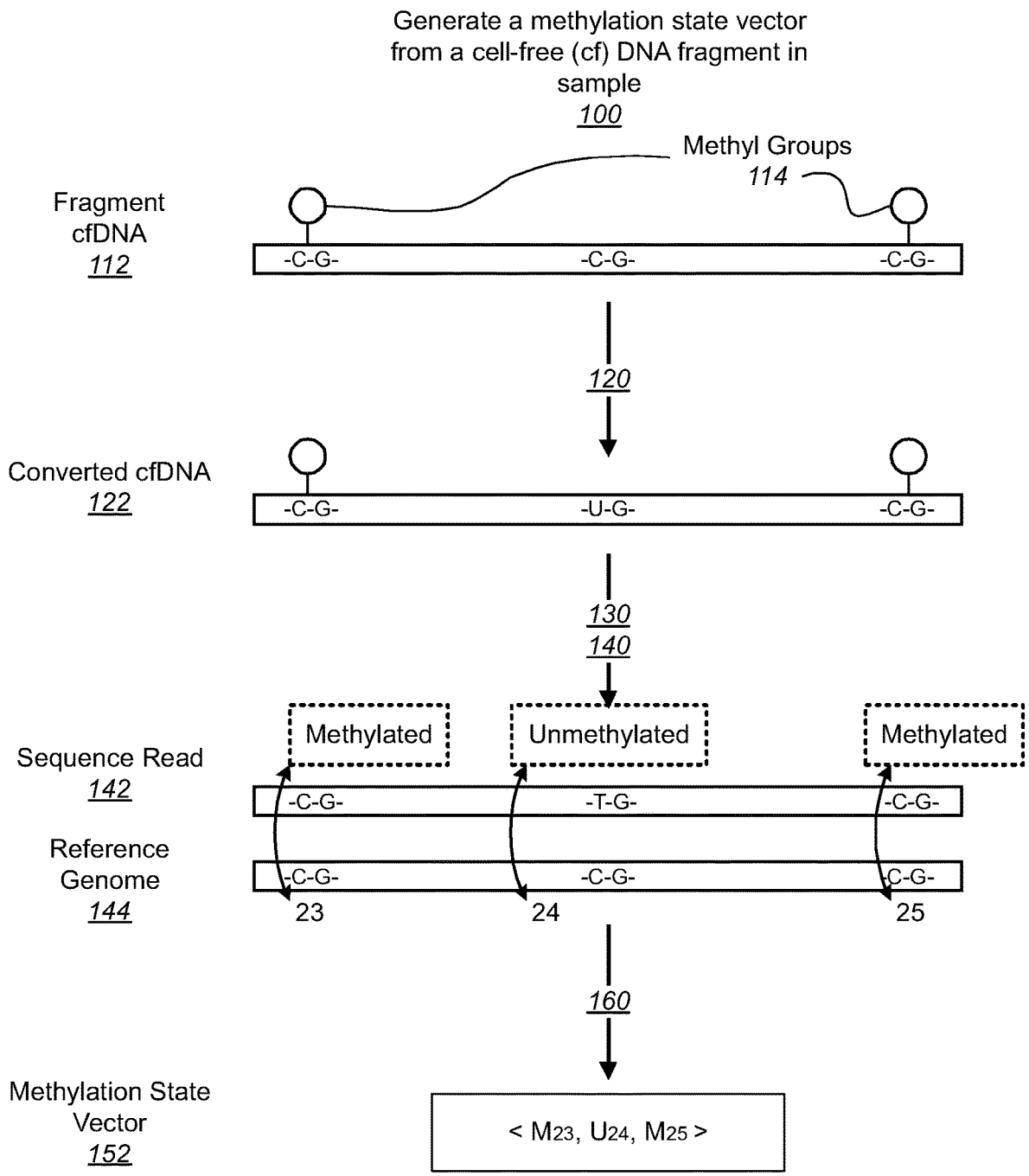
FIG. 7B is an illustration of the process of FIG. 7A of sequencing a fragment of cell-free (cf) DNA to obtain a methylation state vector, according to an embodiment.

FIG. 7B is an illustration of the process 100 of FIG. 7A of sequencing a cfDNA fragment to obtain a methylation state vector, according to an embodiment. As an example, the analytics system takes a cfDNA fragment 112. In this example, the cfDNA fragment 112 contains three CpG sites. As shown, the first and third CpG sites of the cfDNA fragment 112 are methylated 114. During the treatment step 120, the cfDNA fragment 112 is converted to generate a converted cfDNA fragment 122. During the treatment 120, the second CpG site which was unmethylated has its cytosine converted to uracil. However, the first and third CpG sites are not converted.

After conversion, a sequencing library 130 is prepared and sequenced 140 generating a sequence read 142. The analytics system aligns 150 the sequence read 142 to a reference genome 144. The reference genome 144 provides the context as to what position in a human genome the fragment cfDNA originates from. In this simplified example, the analytics system aligns 150 the sequence read such that the three CpG sites correlate to CpG sites 23, 24, and 25 (arbitrary reference identifiers used for convenience of description). The analytics system thus generates information both on methylation status of all CpG sites on the cfDNA fragment 112 and which to position in the human genome the CpG sites map. As shown, the CpG sites on sequence read 142 which were methylated are read as cytosines. In this example, the cytosines appear in the sequence read 142 only in the first and third CpG site which allows one to infer that the first and third CpG sites in the original cfDNA fragment were methylated. Whereas, the second CpG site is read as a thymine (U is converted to T during the sequencing process), and thus, one can infer that the second CpG site was unmethylated in the original cfDNA fragment. With these two pieces of information, the methylation status and location, the analytics system generates 160 a methylation state vector 152 for the fragment cfDNA 112. In this example, the resulting methylation state vector 152 is $<M_{23}, U_{24}, M_{25}>$, wherein M corresponds to a methylated CpG site, U corresponds to an unmethylated CpG site, and the subscript number corresponds to a position of each CpG site in the reference genome.

Figure 13A:
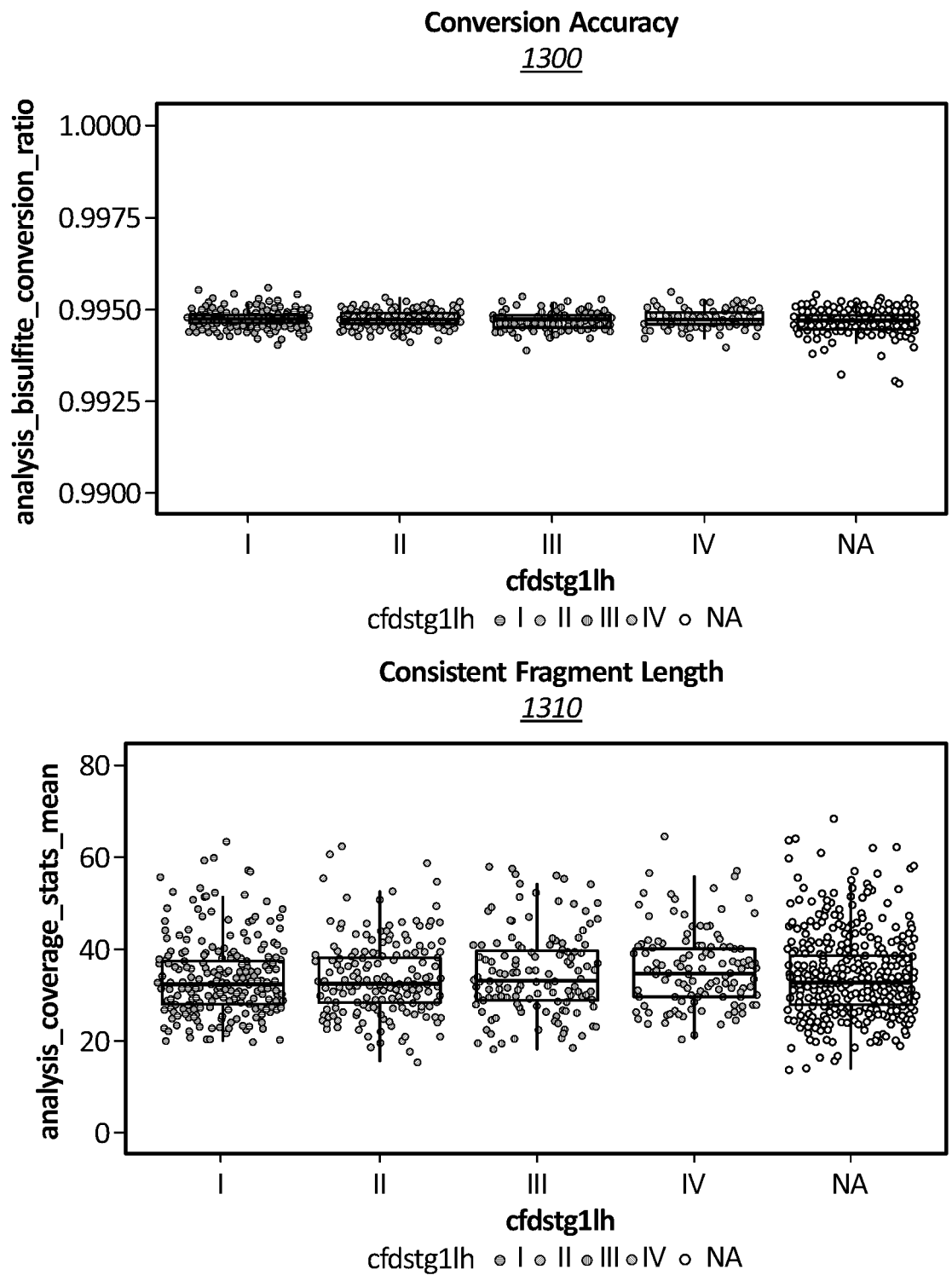
FIGS. 13A & 13B show three graphs of data validating consistency of sequencing from a control group.
Figure 13B:
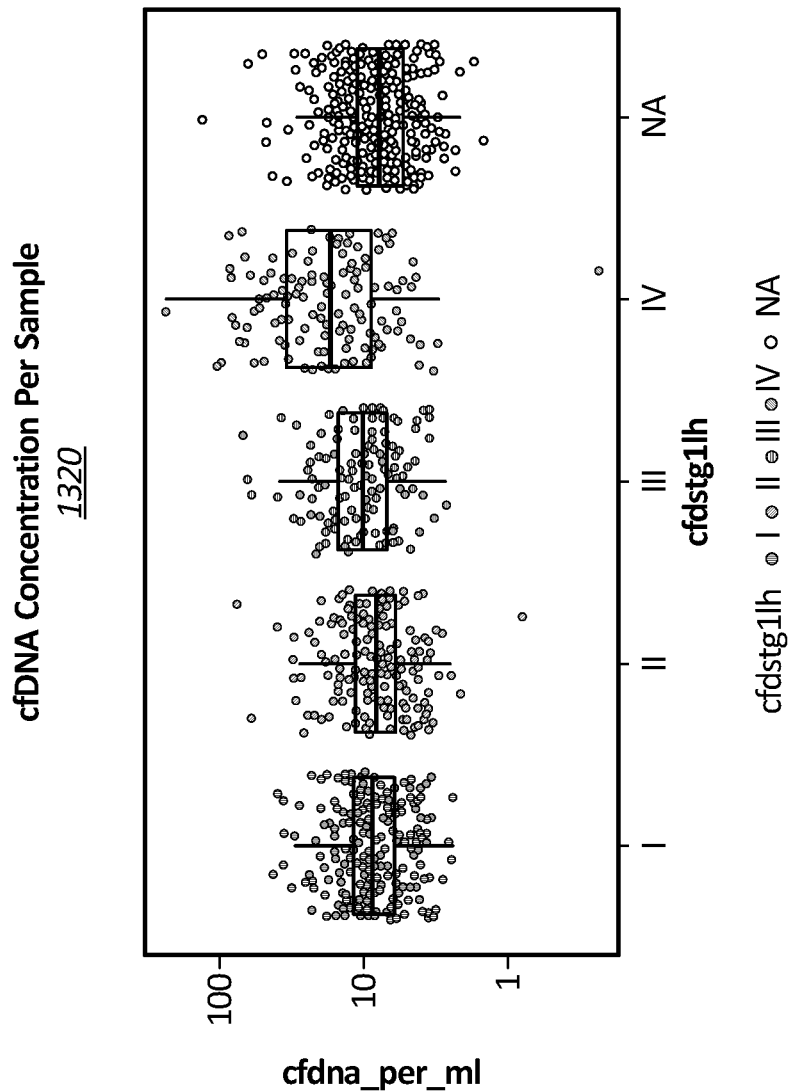

FIGS. 13A & 13B show three graphs of data validating consistency of sequencing from a control group. The first graph 1300 shows conversion accuracy of conversion of unmethylated cytosines to uracil (step 120) on cfDNA fragment obtained from a test sample across subjects in varying stages of cancer—stage 0, stage I, stage II, stage III, stage IV, and non-cancer. As shown, there was uniform consistency in converting unmethylated cytosines on cfDNA fragments into uracils. There was an overall conversion accuracy of 99.47% with a precision at ±0.024%. The second graph 1310 shows mean coverage over varying stages of cancer. The mean coverage over all groups being ~34X mean across the genome coverage of DNA fragments, using only those confidently mapped to the genome are counted. The third graph 1320 (FIG. 13B) shows concentration of cfDNA per sample across varying stages of cancer.

Diagnosis of Cancer

Sequence reads obtained by the methods provided herein can be further processed by automated algorithms. For example, the analytics system is used to receive sequencing data from a sequencer and perform various aspects of processing as described herein. The analytics system can be one of a personal computer (PC), a desktop computer, a laptop computer, a notebook, a tablet PC, a mobile device. A computing device can be communicatively coupled to the sequencer through a wireless, wired, or a combination of wireless and wired communication technologies. Generally, the computing device is configured with a processor and memory storing computer instructions that, when executed by the processor, cause the processor to perform steps as described in the remainder of this document. Generally, the amount of genetic data and data derived therefrom is sufficiently large, and the amount of computational power required so great, so as to be impossible to be performed on paper or by the human mind alone.

The clinical interpretation of methylation status of targeted genomic regions is a process that includes classifying the clinical effect of each or a combination of the methylation status and reporting the results in ways that are meaningful to a medical professional. The clinical interpretation can be based on comparison of the sequence reads with database specific to cancer or non-cancer subjects, and/or based on numbers and types of the cfDNA fragments having cancer-specific methylation patterns identified from a sample. In some embodiments, targeted genomic regions are ranked or classified based on their likeness to be differentially methylated in cancer samples, and the ranks or classifications are used in the interpretation process. The ranks and classifications can include (1) the type of clinical effect, (2) the strength of evidence of the effect, and (3) the size of the effect. Various methods for clinical analysis and interpretation of genome data can be adopted for analysis of the sequence reads. In some other embodiments, the clinical interpretation of the methylation states of such differentially methylated regions can be based on machine learning approaches that interpret a current sample based on a classification or regression method that was trained using the methylation states of such differentially methylated regions from samples from cancer and non-cancer patients with known cancer status, cancer type, cancer stage, tissue of origin, etc.

The clinically meaningful information can include the presence or absence of cancer generally, presence or absence of certain types of cancers, cancer stage, or presence or absence of other types of diseases. In some embodiments, the information relates to a presence or absence of one or more cancer types, selected from the group consisting of (1) blood cancer, (2) breast cancer, (3) colorectal cancer, (4) esophageal cancer, (5) head and neck cancer, (6) hepatobiliary cancer, (7) lung cancer, (8) ovarian cancer, and (9) pancreatic cancer.

Cancer Classifier

To train a cancer type classifier, the analytics system obtains a plurality of training samples each having a set of hypomethylated and hypermethylated fragments indicative of cancer, e.g., identified via step 450 in the process 400, and a label of the training sample's cancer type. The analytics system determines, for each training sample, a feature vector based on the set of hypomethylated and hypermethylated fragments indicative of cancer. The analytics system calculates an anomaly score for each CpG site in the targeted genomic regions. In one embodiment, the analytics system defines the anomaly score for the feature vector as a binary scoring based on whether there is a hypomethylated or hypermethylated fragment from the set that encompasses the CpG site. Once all anomaly scores are determined for a training sample, the analytics system determines the feature vector as a vector of elements including, for each element, one of the anomaly scores associated with one of the CpG sites. The analytics system may normalize the anomaly scores of the feature vector based on a coverage of the sample, i.e., a median or average sequencing depth over all CpG sites.

With the feature vectors of the training samples, the analytics system can train the cancer classifier. In one embodiment, the analytics system trains a binary cancer classifier to distinguish between the labels, cancer and non-cancer, based on the feature vectors of the training samples. In this embodiment, the classifier outputs a prediction score indicating the likelihood of the presence or absence of cancer. In another embodiment, the analytics system trains a multiclass cancer classifier to distinguish between many cancer types. In this multiclass cancer classifier embodiment, the cancer classifier is trained to determine a cancer prediction that comprises a prediction value for each of the cancer types being classified for. The prediction values may correspond to a likelihood that a given sample has each of the cancer types. For example, the cancer classifier returns a cancer prediction including a prediction value for breast cancer, lung cancer, and non-cancer. For example, the cancer classifier may return a cancer prediction for a test sample including a prediction score for breast cancer, lung cancer, and/or no cancer. In either embodiment, the analytics system trains the cancer classifier by inputting sets of training samples with their feature vectors into the cancer classifier and adjusting classification parameters so that a function of the classifier accurately relates the training feature vectors to their corresponding label. The analytics system may group the training samples into sets of one or more training samples for iterative batch training of the cancer classifier. After inputting all sets of training samples including their training feature vectors and adjusting the classification parameters, the cancer classifier is sufficiently trained to label test samples according to their feature vector within some margin of error. The analytics system may train the cancer classifier according to any one of a number of methods. As an example, the binary cancer classifier may be a L2-regularized logistic regression classifier that is trained using a log-loss function. As another example, the multi-cancer classifier may be a multinomial logistic regression. In practice either type of cancer classifier may be trained using other techniques. These techniques are numerous including potential use of kernel methods, machine learning algorithms such as multilayer neural networks, etc. In particular, methods as described in PCT/US2019/022122 and U.S. patent application Ser. No. 16/352,602 which are incorporated by reference in their entireties herein can be used for various embodiments.

In particular embodiments, a cancer classifier is trained by the process comprising the steps of: a. obtaining sequence information of training fragments from a plurality of training subjects; b. for each training fragment, determining whether that training fragment is hypomethylated or hypermethylated, wherein each of the hypomethylated and hypermethylated training fragments comprises at least a threshold number of CpG sites with at least a threshold percentage of the CpG sites being unmethylated or methylated, respectively, c. for each training subject, generating a training feature vector based on the hypomethylated training fragments and hypermethylated training fragments, and d. training the model with the training feature vectors from the one or more training subjects without cancer and the training feature vectors from the one or more training subjects with cancer. The training method can further comprise the steps of: a. obtaining sequence information of training fragments from a plurality of training subjects; b. for each training fragment, determining whether that training fragment is hypomethylated or hypermethylated, wherein each of the hypomethylated and hypermethylated training fragments comprises at least a threshold number of CpG sites with at least a threshold percentage of the CpG sites being unmethylated or methylated, respectively, c. for each of a plurality of CpG sites in a reference genome: quantifying a count of hypomethylated training fragments which overlap the CpG site and a count of hypermethylated training fragments which overlap the CpG site; and generating a hypomethylation score and a hypermethylation score based on the count of hypomethylated training fragments and hypermethylated training fragments; d. for each training fragment, generating an aggregate hypomethylation score based on the hypomethylation score of the CpG sites in the training fragment and an aggregate hypermethylation score based on the hypermethylation score of the CpG sites in the training fragment; e. for each training subject: ranking the plurality of training fragments based on aggregate hypomethylation score and ranking the plurality of training fragments based on aggregate hypermethylation score; and generating a feature vector based on the ranking of the training fragments; f obtaining training feature vectors for one or more training subjects without cancer and training feature vectors for the one or more training subjects with cancer; and g. training the model with the feature vectors for the one or more training subjects without cancer and the feature vectors for the one or more training subjects with cancer. In some embodiments, the model comprises one of a kernel logistic regression classifier, a random forest classifier, a mixture model, a convolutional neural network, and an autoencoder model.

In some embodiments, quantifying a count of hypomethylated training fragments which overlap that CpG site and a count of hypermethylated training fragments which overlap that CpG site further comprises: a. quantifying a cancer count of hypomethylated training fragments from the one or more training subjects with cancer that overlap that CpG site and a non-cancer count of hypomethylated training fragments from the one or more training subjects without cancer that overlap that CpG site; and b. quantifying a cancer count of hypermethylated training fragments from the one or more training subjects with cancer that overlap that CpG site and a non-cancer count of hypermethylated training fragments from the one or more training subjects without cancer that overlap that CpG site. In some embodiments, generating a hypomethylation score and a hypermethylation score based on the count of hypomethylated training fragments and hypermethylated training fragments further comprises: a. for generating the hypomethylation score, calculating a hypomethylation ratio of the cancer count of hypomethylated training fragments over a hypomethylation sum of the cancer count of hypomethylated training fragments and the non-cancer count of hypomethylated training fragments; and b. for generating the hypermethylation score, calculating a hypermethylation ratio of the cancer count of hypermethylated training fragments over a hypermethylation sum of the cancer count of hypermethylated training fragments and the non-cancer count of hypermethylated training fragments.

During deployment, the analytics system obtains sequence reads from a test sample collected from a subject. Various sequencing methods available in the art can be used to obtain sequence reads. In some embodiments, the sequence reads are obtained from whole genome sequencing or targeted sequencing. In some embodiments, the sequence reads include a set of sequence reads of modified test fragments, wherein the modified test fragments are obtained by processing a set of nucleic acid fragments, wherein each of the nucleic acid fragments corresponds to or is derived from a plurality of genomic regions selected from one or more of Tables 1-24. In some embodiments, the sequence reads are from the DNA samples enriched using the assay panel described herein.

The analytics system processes the sequence reads to obtain a test feature vector in a similar process as described for the training samples. In some embodiments, the test feature vector is obtained by the process comprising a. for each of the nucleic acid fragments, determining whether the nucleic acid fragment is hypomethylated or hypermethylated, wherein each of the hypomethylated and hypermethylated nucleic acid fragments comprises at least a threshold number of CpG sites with at least a threshold percentage of the CpG sites being unmethylated or methylated, respectively; b. for each of a plurality of CpG sites in a reference genome: quantifying a count of hypomethylated nucleic acid fragments which overlap the CpG site and a count of hypermethylated nucleic acid fragments which overlap the CpG site; and generating a hypomethylation score and a hypermethylation score based on the count of hypomethylated nucleic acid fragments and hypermethylated nucleic acid fragments; c. for each nucleic acid fragment, generating an aggregate hypomethylation score based on the hypomethylation score of the CpG sites in the nucleic acid fragment and an aggregate hypermethylation score based on the hypermethylation score of the CpG sites in the nucleic acid fragment; d. ranking the plurality of nucleic acid fragments based on aggregate hypomethylation score and ranking the plurality of nucleic fragments based on aggregate hypermethylation score; and e. generating the test feature vector based on the ranking of the nucleic acid fragments.

The analytics system then inputs the test feature vector into the trained cancer classifier to yield a cancer prediction, e.g., binary prediction (cancer or non-cancer) or multiclass cancer prediction (prediction score for each of a plurality of cancer types). In some embodiments, the analytics system outputs a cancer probability for the test sample. The cancer probability can be compared to a threshold probability to determine whether the test sample is from a subject with cancer or without cancer.

Exemplary Sequencer and Analytics System

Figure 8A:
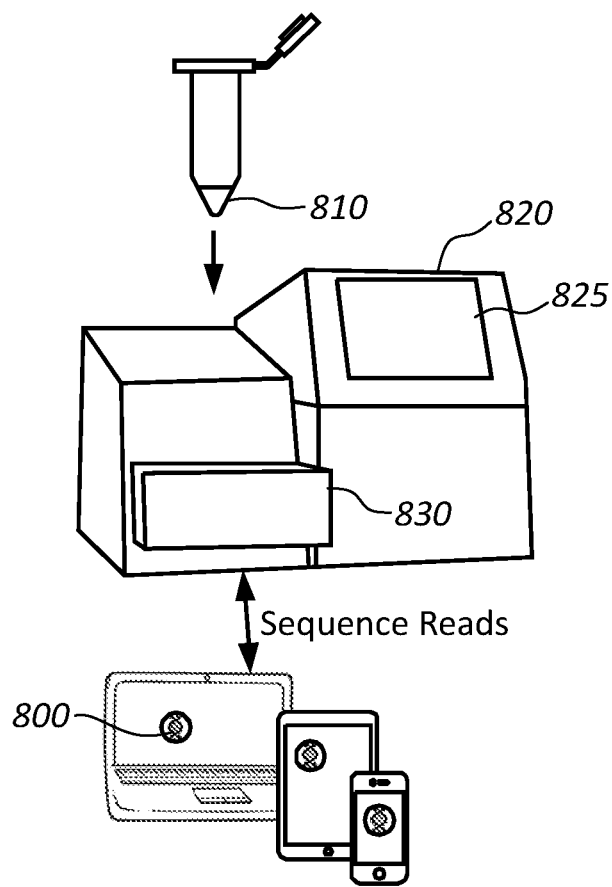
FIG. 8A is a flowchart of devices for sequencing nucleic acid samples according to one embodiment.

FIG. 8A is a flowchart of systems and devices for sequencing nucleic acid samples according to one embodiment. This illustrative flowchart includes devices such as a sequencer 820 and an analytics system 800. The sequencer 820 and the analytics system 800 may work in tandem to perform one or more steps in the processes described herein.

In various embodiments, the sequencer 820 receives an enriched nucleic acid sample 810. As shown in FIG. 8A, the sequencer 820 can include a graphical user interface 825 that enables user interactions with particular tasks (e.g., initiate sequencing or terminate sequencing) as well as one more loading stations 830 for loading a sequencing cartridge including the enriched fragment samples and/or for loading necessary buffers for performing the sequencing assays. Therefore, once a user of the sequencer 820 has provided the necessary reagents and sequencing cartridge to the loading station 830 of the sequencer 820, the user can initiate sequencing by interacting with the graphical user interface 825 of the sequencer 820. Once initiated, the sequencer 820 performs the sequencing and outputs the sequence reads of the enriched fragments from the nucleic acid sample 810.

In some embodiments, the sequencer 820 is communicatively coupled with the analytics system 800. The analytics system 800 includes some number of computing devices used for processing the sequence reads for various applications such as assessing methylation status at one or more CpG sites, variant calling or quality control. The sequencer 820 may provide the sequence reads in a BAM file format to the analytics system 800. The analytics system 800 can be communicatively coupled to the sequencer 820 through a wireless, wired, or a combination of wireless and wired communication technologies. Generally, the analytics system 800 is configured with a processor and non-transitory computer-readable storage medium storing computer instructions that, when executed by the processor, cause the processor to process the sequence reads or to perform one or more steps of any of the methods or processes disclosed herein.

In some embodiments, the sequence reads may be aligned to a reference genome using known methods in the art to determine alignment position information, e.g., part of step 140 of the process 100 in FIG. 3A. Alignment position may generally describe a beginning position and an end position of a region in the reference genome that corresponds to a beginning nucleotide based and an end nucleotide base of a given sequence read. Corresponding to methylation sequencing, the alignment position information may be generalized to indicate a first CpG site and a last CpG site included in the sequence read according to the alignment to the reference genome. The alignment position information may further indicate methylation statuses and locations of all CpG sites in a given sequence read. A region in the reference genome may be associated with a gene or a segment of a gene; as such, the analytics system 800 may label a sequence read with one or more genes that align to the sequence read. In one embodiment, fragment length (or size) is determined from the beginning and end positions.

In various embodiments, for example when a paired-end sequencing process is used, a sequence read is comprised of a read pair denoted as R_1 and R_2. For example, the first read R_1 may be sequenced from a first end of a double-stranded DNA (dsDNA) molecule whereas the second read R_2 may be sequenced from the second end of the double-stranded DNA (dsDNA). Therefore, nucleotide base pairs of the first read R_1 and second read R_2 may be aligned consistently (e.g., in opposite orientations) with nucleotide bases of the reference genome. Alignment position information derived from the read pair R_1 and R_2 may include a beginning position in the reference genome that corresponds to an end of a first read (e.g., R_1) and an end position in the reference genome that corresponds to an end of a second read (e.g., R_2). In other words, the beginning position and end position in the reference genome represent the likely location within the reference genome to which the nucleic acid fragment corresponds. An output file having SAM (sequence alignment map) format or BAM (binary) format may be generated and output for further analysis.

Figure 8B:
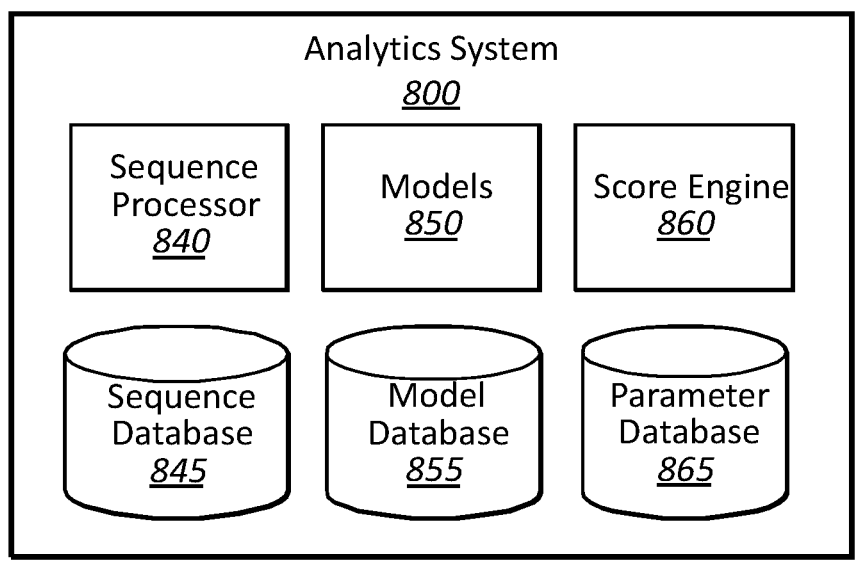
FIG. 8B provides an analytic system that analyzes methylation status of cfDNA according to one embodiment.

Referring now to FIG. 8B, FIG. 8B is a block diagram of an analytics system 800 for processing DNA samples according to one embodiment. The analytics system implements one or more computing devices for use in analyzing DNA samples. The analytics system 800 includes a sequence processor 840, sequence database 845, model database 855, models 850, parameter database 865, and score engine 860. In some embodiments, the analytics system 800 performs one or more steps in the processes 100 of FIG. 3A, 340 of FIG. 3B, 400 of FIG. 4, 500 of FIG. 5, 600 of FIG. 6A, or 680 of FIG. 6B and other process described herein.

The sequence processor 840 generates methylation state vectors for fragments from a sample. At each CpG site on a fragment, the sequence processor 840 generates a methylation state vector for each fragment specifying a location of the fragment in the reference genome, a number of CpG sites in the fragment, and the methylation state of each CpG site in the fragment whether methylated, unmethylated, or indeterminate via the process 100 of FIG. 3A. The sequence processor 840 may store methylation state vectors for fragments in the sequence database 845. Data in the sequence database 845 may be organized such that the methylation state vectors from a sample are associated to one another.

Further, multiple different models 850 may be stored in the model database 855 or retrieved for use with test samples. In one example, a model is a trained cancer classifier for determining a cancer prediction for a test sample using a feature vector derived from anomalous fragments. The training and use of the cancer classifier will be further discussed in conjunction with sub-section titled "Genomic regions indicative of cancer and classifiers." The analytics system 800 may train the one or more models 850 and store various trained parameters in the parameter database 865. The analytics system 800 stores the models 850 along with functions in the model database 855.

During inference, the score engine 860 uses the one or more models 850 to return outputs. The score engine 860 accesses the models 850 in the model database 855 along with trained parameters from the parameter database 865. According to each model, the score engine receives an appropriate input for the model and calculates an output based on the received input, the parameters, and a function of each model relating the input and the output. In some use cases, the score engine 860 further calculates metrics correlating to a confidence in the calculated outputs from the model. In other use cases, the score engine 860 calculates other intermediary values for use in the model Application In some embodiments, the methods, analytic systems and/or classifier of the present invention can be used to detect the presence of cancer, monitor cancer progression or recurrence, monitor therapeutic response or effectiveness, determine a presence or monitor minimum residual disease (MRD), or any combination thereof. For example, as described herein, a classifier can be used to generate a likelihood or probability score (e.g., from 0 to 100) that a sample feature vector is from a subject with cancer. In some embodiments, the probability score is compared to a threshold probability to determine whether or not the subject has cancer. In other embodiments, the likelihood or probability score can be assessed at different time points (e.g., before or after treatment) to monitor disease progression or to monitor treatment effectiveness (e.g., therapeutic efficacy). In still other embodiments, the likelihood or probability score can be used to make or influence a clinical decision (e.g., diagnosis of cancer, treatment selection, assessment of treatment effectiveness, etc.). For example, in one embodiment, if the likelihood or probability score exceeds a threshold, a physician can prescribe an appropriate treatment.

Early Detection of Cancer

In some embodiments, the methods and/or classifier of the present invention are used to detect the presence or absence of cancer in a subject suspected of having cancer. For example, a classifier (as described herein) can be used to determine a likelihood or probability score that a sample feature vector is from a subject that has cancer.

In one embodiment, a probability score of greater than or equal to 60 can indicated that the subject has cancer. In still other embodiments, a probability score greater than or equal to 65, greater than or equal to 70, greater than or equal to 75, greater than or equal to 80, greater than or equal to 85, greater than or equal to 90, or greater than or equal to 95, indicated that the subject has cancer. In other embodiments, a probability score can indicate the severity of disease. For example, a probability score of 80 may indicate a more severe form, or later stage, of cancer compared to a score below 80 (e.g., a score of 70). Similarly, an increase in the probability score over time (e.g., at a second, later time point) can indicate disease progression or a decrease in the probability score over time (e.g., at a second, later time point) can indicate successful treatment.

In another embodiment, a cancer log-odds ratio can be calculated for a test subject by taking the log of a ratio of a probability of being cancerous over a probability of being non-cancerous (i.e., one minus the probability of being cancerous), as described herein. In accordance with this embodiment, a cancer log-odds ratio greater than 1 can indicate that the subject has cancer. In still other embodiments, a cancer log-odds ratio greater than 1.2, greater than 1.3, greater than 1.4, greater than 1.5, greater than 1.7, greater than 2, greater than 2.5, greater than 3, greater than 3.5, or greater than 4, indicated that the subject has cancer. In other embodiments, a cancer log-odds ratio can indicate the severity of disease. For example, a cancer log-odds ratio greater than 2 may indicate a more severe form, or later stage, of cancer compared to a score below 2 (e.g., a score of 1). Similarly, an increase in the cancer log-odds ratio over time (e.g., at a second, later time point) can indicate disease progression or a decrease in the cancer log-odds ratio over time (e.g., at a second, later time point) can indicate successful treatment.

According to aspects of the invention, the methods and systems of the present invention can be trained to detect or classify multiple cancer indications. For example, the methods, systems and classifiers of the present invention can be used to detect the presence of one or more, two or more, three or more, five or more, or ten or more different types of cancer.

In some embodiments, the cancer is one or more of (1) blood cancer, (2) breast cancer, (3) colorectal cancer, (4) esophageal cancer, (5) head and neck cancer, (6) hepatobiliary cancer, (7) lung cancer, (8) ovarian cancer, and (9) pancreatic cancer.

Cancer and Treatment Monitoring

In some embodiments, the likelihood or probability score can be assessed at different time points (e.g., or before or after treatment) to monitor disease progression or to monitor treatment effectiveness (e.g., therapeutic efficacy). For example, the present disclosure provides methods that involve obtaining a first sample (e.g., a first plasma cfDNA sample) from a cancer patient at a first time point, determining a first likelihood or probability score therefrom (as described herein), obtaining a second test sample (e.g., a second plasma cfDNA sample) from the cancer patient at a second time point, and determine a second likelihood or probability score therefrom (as described herein).

In certain embodiments, the first time point is before a cancer treatment (e.g., before a resection surgery or a therapeutic intervention), and the second time point is after a cancer treatment (e.g., after a resection surgery or therapeutic intervention), and the method utilized to monitor the effectiveness of the treatment. For example, if the second likelihood or probability score decreases compared to the first likelihood or probability score, then the treatment is considered to have been successful. However, if the second likelihood or probability score increases compared to the first likelihood or probability score, then the treatment is considered to have not been successful. In other embodiments, both the first and second time points are before a cancer treatment (e.g., before a resection surgery or a therapeutic intervention). In still other embodiments, both the first and the second time points are after a cancer treatment (e.g., before a resection surgery or a therapeutic intervention) and the method used to monitor the effectiveness of the treatment or loss of effectiveness of the treatment. In still other embodiments, cfDNA samples may be obtained from a cancer patient at a first and second time point and analyzed. e.g., to monitor cancer progression, to determine if a cancer is in remission (e.g., after treatment), to monitor or detect residual disease or recurrence of disease, or to monitor treatment (e.g., therapeutic) efficacy.

Those of skill in the art will readily appreciate that test samples can be obtained from a cancer patient over any desired set of time points and analyzed in accordance with the methods of the invention to monitor a cancer state in the patient. In some embodiments, the first and second time points are separated by an amount of time that ranges from about 15 minutes up to about 30 years, such as about 30 minutes, such as about 1, 2, 3, 4, 5, 6, 7, 8, 9, 10, 11, 12, 13, 14, 15, 16, 17, 18, 19, 20, 21, 22, 23, or about 24 hours, such as about 1, 2, 3, 4, 5, 10, 15, 20, 25 or about 30 days, or such as about 1, 2, 3, 4, 5, 6, 7, 8, 9, 10, 11, or 12 months, or such as about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5 or about 30 years. In other embodiments, test samples can be obtained from the patient at least once every 3 months, at least once every 6 months, at least once a year, at least once every 2 years, at least once every 3 years, at least once every 4 years, or at least once every 5 years.

Treatment

In still another embodiment, information obtained from any method described herein (e.g., the likelihood or probability score) can be used to make or influence a clinical decision (e.g., diagnosis of cancer, treatment selection, assessment of treatment effectiveness, etc.). For example, in one embodiment, if the likelihood or probability score exceeds a threshold, a physician can prescribe an appropriate treatment (e.g., a resection surgery, radiation therapy, chemotherapy, and/or immunotherapy). In some embodiments, information such as a likelihood or probability score can be provided as a readout to a physician or subject.

A classifier (as described herein) can be used to determine a likelihood or probability score that a sample feature vector is from a subject that has cancer. In one embodiment, an appropriate treatment (e.g., resection surgery or therapeutic) is prescribed when the likelihood or probability exceeds a threshold. For example, in one embodiment, if the likelihood or probability score is greater than or equal to 60, one or more appropriate treatments are prescribed. In another embodiments, if the likelihood or probability score is greater than or equal to 65, greater than or equal to 70, greater than or equal to 75, greater than or equal to 80, greater than or equal to 85, greater than or equal to 90, or greater than or equal to 95, one or more appropriate treatments are prescribed. In other embodiments, a cancer log-odds ratio can indicate the effectiveness of a cancer treatment. For example, an increase in the cancer log-odds ratio over time (e.g., at a second, after treatment) can indicate that the treatment was not effective. Similarly, a decrease in the cancer log-odds ratio over time (e.g., at a second, after treatment) can indicate successful treatment. In another embodiment, if the cancer log-odds ratio is greater than 1, greater than 1.5, greater than 2, greater than 2.5, greater than 3, greater than 3.5, or greater than 4, one or more appropriate treatments are prescribed.

In some embodiments, the treatment is one or more cancer therapeutic agents selected from the group consisting of a chemotherapy agent, a targeted cancer therapy agent, a differentiating therapy agent, a hormone therapy agent, and an immunotherapy agent. For example, the treatment can be one or more chemotherapy agents selected from the group consisting of alkylating agents, antimetabolites, anthracyclines, anti-tumor antibiotics, cytoskeletal disruptors (taxans), topoisomerase inhibitors, mitotic inhibitors, corticosteroids, kinase inhibitors, nucleotide analogs, platinum-based agents and any combination thereof. In some embodiments, the treatment is one or more targeted cancer therapy agents selected from the group consisting of signal transduction inhibitors (e.g. tyrosine kinase and growth factor receptor inhibitors), histone deacetylase (HDAC) inhibitors, retinoic receptor agonists, proteosome inhibitors, angiogenesis inhibitors, and monoclonal antibody conjugates. In some embodiments, the treatment is one or more differentiating therapy agents including retinoids, such as tretinoin, alitretinoin and bexarotene. In some embodiments, the treatment is one or more hormone therapy agents selected from the group consisting of anti-estrogens, aromatase inhibitors, progestins, estrogens, anti-androgens, and GnRH agonists or analogs. In one embodiment, the treatment is one or more immunotherapy agents selected from the group comprising monoclonal antibody therapies such as rituximab (RITUXAN) and alemtuzumab (CAMPATH), non-specific immunotherapies and adjuvants, such as BCG, interleukin-2 (IL-2), and interferon-alfa, immunomodulating drugs, for instance, thalidomide and lenalidomide (REVLIMID). It is within the capabilities of a skilled physician or oncologist to select an appropriate cancer therapeutic agent based on characteristics such as the type of tumor, cancer stage, previous exposure to cancer treatment or therapeutic agent, and other characteristics of the cancer.

EXAMPLES

The following examples are put forth so as to provide those of ordinary skill in the art with a complete disclosure and description of how to make and use the present description, and are not intended to limit the scope of what the inventors regard as their description nor are they intended to represent that the experiments below are all or the only experiments performed. Efforts have been made to ensure accuracy with respect to numbers used (e.g., amounts, temperature, etc.) but some experimental errors and deviations should be accounted for.

Example 1: Analysis of Probe Qualities

Figure 9:
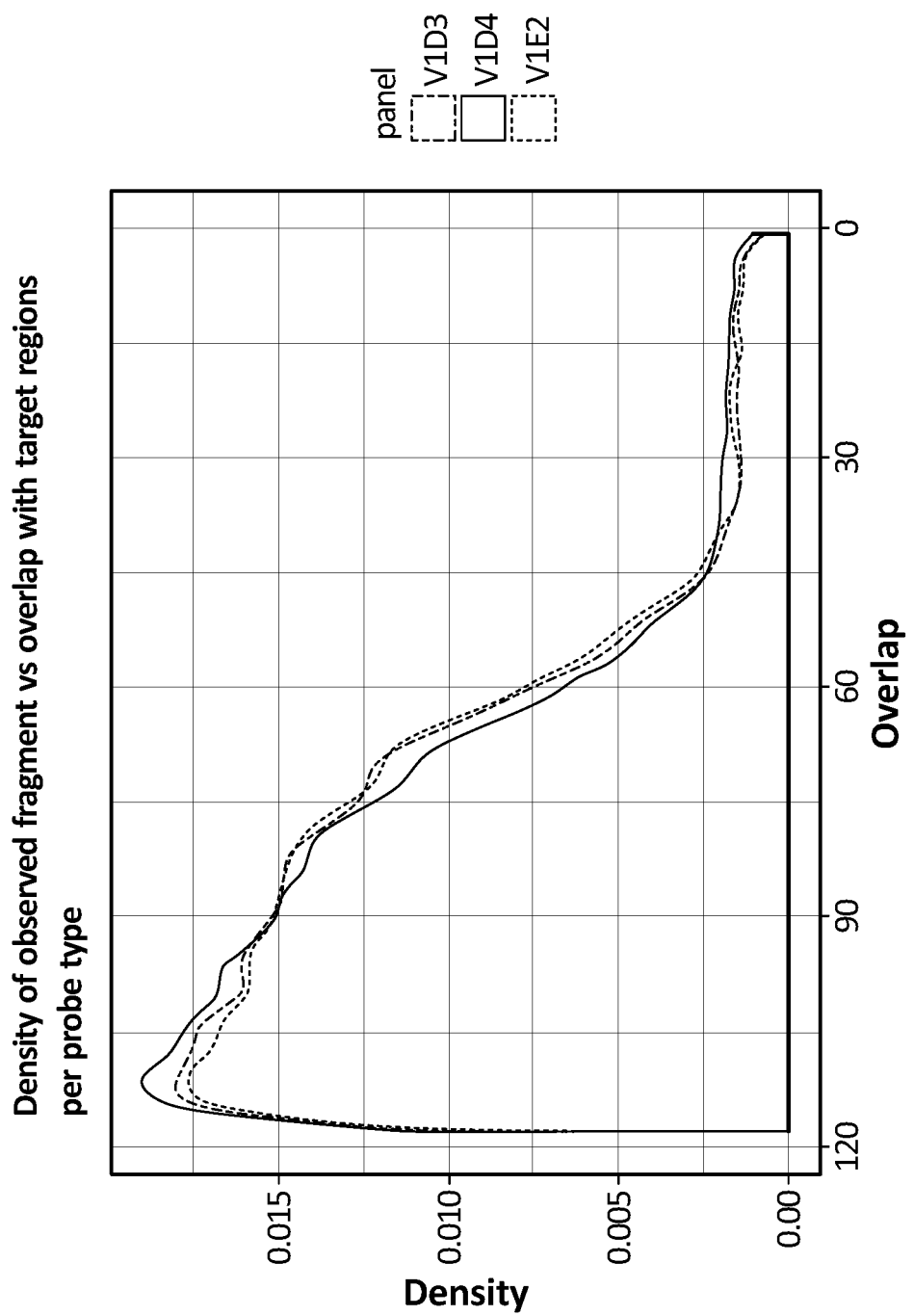
FIG. 9 is a graph of the amounts of DNA fragments hybridizing to probes depending on the sizes of overlaps between the DNA fragments and the probes.

To test how much overlap between a cfDNA fragment and a probe is required to achieve a non-negligible amount of pulldown, various lengths of overlaps were tested using panels designed to include three different types of probes (V1D3, V1D4, V1E2) having various overlaps with 175 bp target DNA fragments specific to each probe. Tested overlaps ranged between 0 bp and 120 bp. Samples comprising 175 bp target DNA fragments were applied to the panel and washed, and then DNA fragments bound to the probes were collected. The amounts of the collected DNA fragments were measured and the amounts were plotted as densities over the sizes of overlaps as provided in FIG. 9.

There was no significant binding and pull down of target DNA fragments when there were less than 45 bp of overlaps. These results suggest that a fragment-probe overlap of at least 45 bp is generally required to achieve a non-negligible amount of pulldown although this number can vary depending on the assay conditions.

Furthermore, it has been suggested that more than a 10% mismatch rate between the probe and fragment sequences in the region of overlap is sufficient to greatly disrupt binding, and thus pulldown efficiency. Therefore, sequences that can align to the probe along at least 45 bp with at least a 90% match rate are candidates for off-target pulldown.

Thus, we have performed an exhaustive searching of all genomic regions having 45 bp alignments with 90%+ match rate (i.e., off-target regions) for each probe. Specifically, we combined a k-mer seeding strategy (which can allow one or more mismatches) with local alignment at the seed locations. This guaranteed not missing any good alignments based on k-mer length, number of mismatches allowed, and number of k-mer seed hits at a particular location. This involves performing dynamic programing local alignment at a large number of locations, so the implementation was optimized to use vector CPU instructions (e.g., AVX2, AVX512) and parallelized across many cores within a machine and also across many machines connected by a network. This allows exhaustive search which is valuable in designing a high-performance panel (i.e., low off-target rate and high target coverage for a given amount of sequencing).

Following the exhaustive searching, each probe was scored based on the number of off-target regions. The best probes have a score of 1, meaning they match in only one place (high Q). Probes with a low score between 2-19 hits (low Q) were accepted but probes with a poor score more than 20 hits (poor Q) were discarded. Other cutoff values can be used for specific samples.

Figure 10:
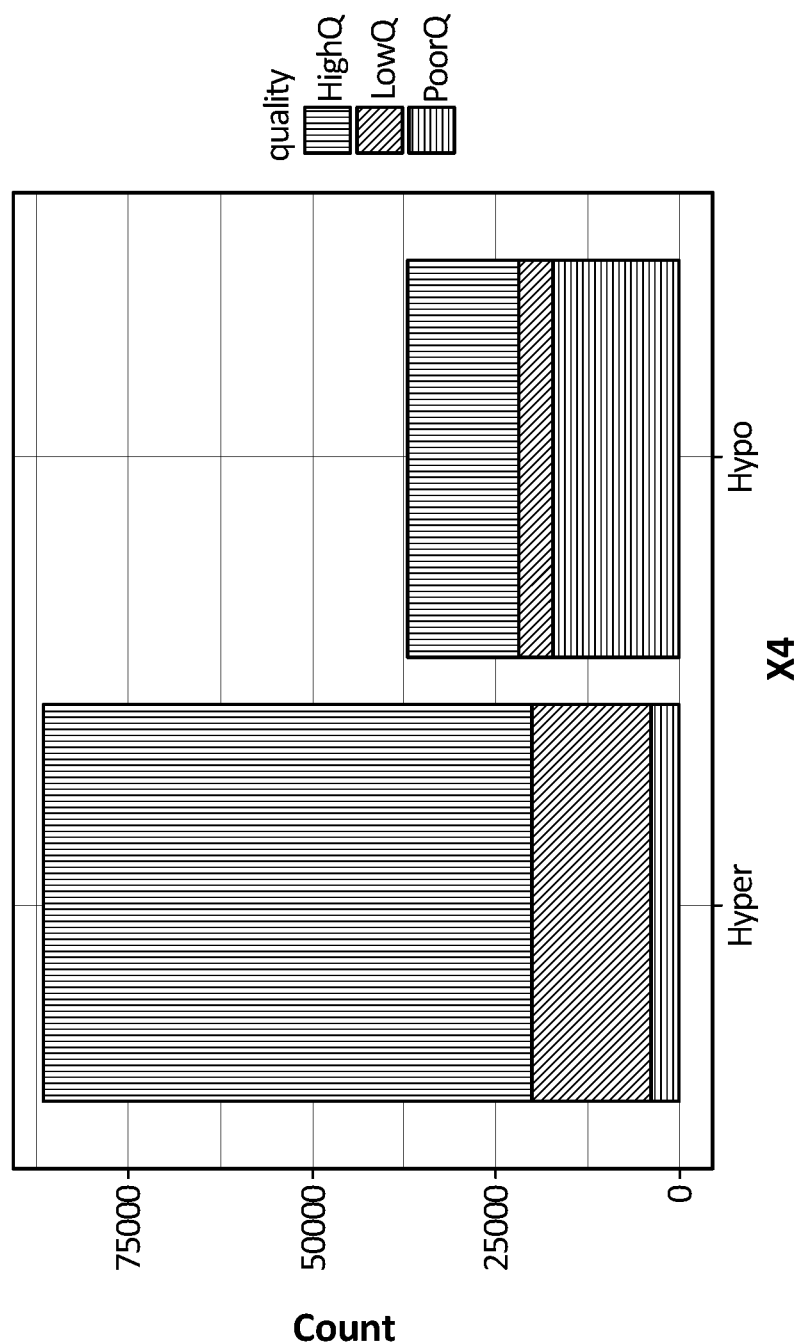
FIG. 10 compares the numbers of high quality (high Q), low quality (low Q), and poor quality (poor Q) probes among the probes targeting hypermethylated fragments (Hyper) or hypomethylated fragments (Hypo).

Numbers of high quality, low quality, and poor quality probes were then counted among probes targeting hypermethylated genomic regions or hypomethylated genomic regions. As provided in FIG. 10, probes targeting hypermethylated regions tend to have significantly less off-target regions.

Example 2: Annotation of Target Genomic Regions

Figure 12:
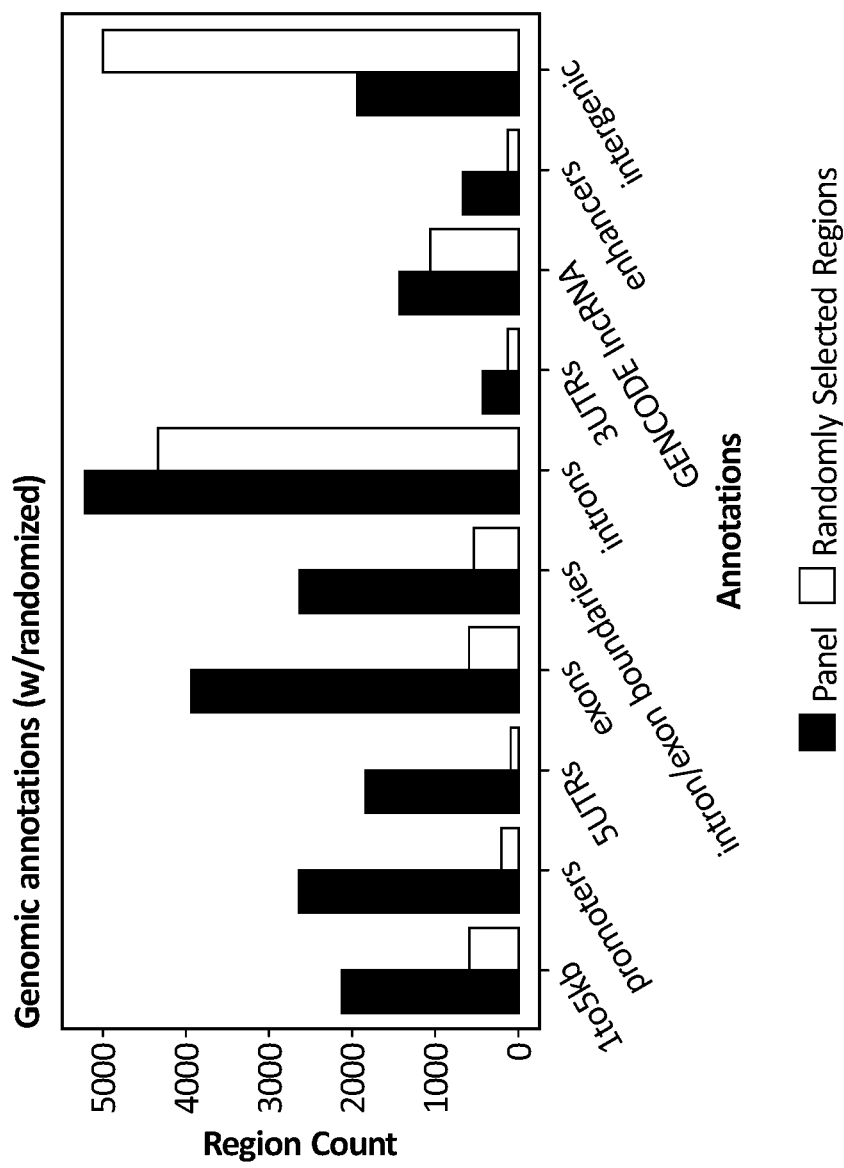
FIG. 12 summarizes frequencies of genomic annotations of targeted genomic regions (black) and randomly selected regions (gray).

Target genomic regions identified by the process outlined in FIG. 4 were analyzed to understand features of the target regions. Specifically, selected target genomic regions were aligned to a reference genome to determine alignment positions. The alignment position information was collected for each selected target genomic region, including the chromosome number, beginning nucleotide base, end nucleotide base, and the genomic annotations of the given genomic region. Target genomic regions were positioned in introns, exons, intergenic regions, 5'UTRs, 3'UTRs, or controlling regions such as promoters or enhancers. The number of target genomic regions that fall within each genomic annotation were counted and plotted in the graph provided in FIG. 12. FIG. 12 also compares numbers of the selected target genomic regions (black bars) or numbers of randomly selected genomic regions (gray bars) that fall within each genomic annotation.

The analysis shows that the selected target genomic regions are not random in their genomic distributions and they had higher enrichment for regulatory and functional elements such as promoters and 5UTRs and less representation of intergenic sequences in comparison with randomly selected targets of the same size. For example, target genomic regions were found to position in promoters, 5'UTR, exons, intron/exon boundaries, introns, 3'UTRs or enhancers, rather than intergenic regions.

Example 3: Cancer Assay Panels (CCGA)

Target genomic regions were selected using database generated by sequencing cfDNA fragments obtained from more than 1800 individuals. The cfDNA sequencing database is referred to as The Circulating Cell-free Genome Atlas Study ("CCGA") herein. The CCGA study was described with Clinical Trial.gov Identifier: NCT02889978 (https://www.clinicaltrials.gov/ct2/show/NCT02889978).

Specifically, cfDNA sequences in the database were filtered based on p-value using a non-cancer distribution, and only fragments with p<0.001 were retained. The selected cfDNAs were further filtered to retain only those that were at least 90% methylated or 90% unmethylated. Next, for each CpG site in the selected fragments, the numbers of cancer samples or non-cancer samples were counted that include fragments overlapping that CpG site. Specifically, P (cancer|overlapping fragment) for each CpG was calculated and genomic sites with high P values were selected as general cancer targets. By design, the selected fragments had very low noise (i.e., few non-cancer fragments overlapping).

To find cancer type specific targets, similar selection processes were performed. CpG sites were ranked based on their information gain, comparing one cancer type to all other samples (non-cancer plus other cancer types). We only attempted to find cancer type specific targets for the subset of the cancer types in CCGA that we felt should have enough signal to make this feasible. This intuition was supported by a good result using the same selection method to find features for a cancer type classifier.

Cancer assay panels comprising probes targeting the selected genomic regions were generated. Specifically, the panels were designed to detect the presence and/or stage of cancer generally (i.e., vs non-cancer) or a specific cancer type as listed below:

Table 1: Pan-cancer #1
Table 2: Blood cancer #1
Table 3: Breast cancer #1
Table 4: Colorectal cancer #1
Table 5: Esophageal cancer #1
Table 6: Head and neck cancer #1
Table 7: Hepatobiliary cancer #1
Table 8: Lung cancer #1
Table 9: Ovarian cancer #1
Table 10: Pancreatic cancer #1
Table 12: Pan-cancer #2
Table 13: Pan-cancer #3
Table 14: Pan-cancer #4
Table 15: Pan-cancer #5
Table 16: Blood cancer #2
Table 17: Breast cancer #2
Table 18: Colorectal cancer #2
Table 19: Esophageal cancer #2
Table 20: Head and neck cancer #2
Table 21: Hepatobiliary cancer #2
Table 22: Lung cancer #2
Table 23: Ovarian cancer #2
Table 24: Pancreatic cancer #2

The panels can include probes configured to hybridize to a modified fragment obtained from processing of the cfDNA molecules, where each of the cfDNA molecules corresponds to or is derived from one or more genomic regions included in the list provided as Tables 1-24. The genomic regions provided in Tables 1-10 and 12-13 were identified by the process outlined in FIG. 4 using the CCGA data set. Tables 14-24 represent subsets of Tables 1-13. Tables 1-10 list the genomic regions in the following column format, starting from the left-most column: chromosome on which the target genomic region is located, start and stop position of the target genomic region, whether the target genomic region is hypermethylated or hypomethylated, and an annotation (if known) of any gene located within 10,000 bp of the targeted region of the genome. Tables 12-24 have the following column formatting, starting from the left-most column: chromosome on which the target genomic region is located and start and stop position of the target genomic region on the chromosome. The chromosome numbers and the start and stop positions are provided relative to a known human reference genome, hg19. The sequence of the human reference genome, hg19, is available from Genome Reference Consortium with a reference number, GRCh37/hg19, and also available from Genome Browser provided by Santa Cruz Genomics Institute.

Generally, a probe can be designed to overlap any of the CpG sites included within the start/stop ranges of any of the targeted regions (e.g., anomalous fragments) included in Tables 1-24.

Lengthy table referenced here

US12435375-20251007-T00001

Please refer to the end of the specification for access instructions.

Lengthy table referenced here

US12435375-20251007-T00002

Please refer to the end of the specification for access instructions.

Lengthy table referenced here

US12435375-20251007-T00003

Please refer to the end of the specification for access instructions.

Lengthy table referenced here

US12435375-20251007-T00004

Please refer to the end of the specification for access instructions.

Lengthy table referenced here

US12435375-20251007-T00005

Please refer to the end of the specification for access instructions.

Lengthy table referenced here

US12435375-20251007-T00006

Please refer to the end of the specification for access instructions.

Lengthy table referenced here

US12435375-20251007-T00007

Please refer to the end of the specification for access instructions.

Lengthy table referenced here
US12435375-20251007-T00008

Please refer to the end of the specification for access instructions.

Lengthy table referenced here
US12435375-20251007-T00009

Please refer to the end of the specification for access instructions.

Lengthy table referenced here
US12435375-20251007-T00010

Please refer to the end of the specification for access instructions.

Lengthy table referenced here
US12435375-20251007-T00011

Please refer to the end of the specification for access instructions.

Lengthy table referenced here
US12435375-20251007-T00012

Please refer to the end of the specification for access instructions.

Lengthy table referenced here
US12435375-20251007-T00013

Please refer to the end of the specification for access instructions.

Lengthy table referenced here
US12435375-20251007-T00014

Please refer to the end of the specification for access instructions.

Lengthy table referenced here
US12435375-20251007-T00015

Please refer to the end of the specification for access instructions.

Lengthy table referenced here
US12435375-20251007-T00016

Please refer to the end of the specification for access instructions.

Lengthy table referenced here
US12435375-20251007-T00017

Please refer to the end of the specification for access instructions.

Lengthy table referenced here
US12435375-20251007-T00018

Please refer to the end of the specification for access instructions.

Lengthy table referenced here
US12435375-20251007-T00019

Please refer to the end of the specification for access instructions.

Lengthy table referenced here
US12435375-20251007-T00020

Please refer to the end of the specification for access instructions.

Lengthy table referenced here
US12435375-20251007-T00021

Please refer to the end of the specification for access instructions.

Lengthy table referenced here
US12435375-20251007-T00022

Please refer to the end of the specification for access instructions.

Lengthy table referenced here
US12435375-20251007-T00023

Please refer to the end of the specification for access instructions.

Lengthy table referenced here
US12435375-20251007-T00024

Please refer to the end of the specification for access instructions.

Example 4: Cancer Assay Panel (TCGA)

A panel capable of detecting the presence and/or stage of cancer generally (i.e., cancer vs non-cancer) was generated. The panel includes probes configured to hybridize to a modified fragment obtained from processing of the cfDNA molecules, wherein each of the cfDNA molecules corresponds to or is derived from one or more genomic regions in Table 11. The genomic regions in Table 11 were identified using the techniques described in the remainder of this document, as well as by targeting viral sequences/genomes, data set from the Cancer Genome Atlas (TCGA) which is developed as a result of the collaboration between the National Cancer Institute (NCI) and the National Human Genome Research Institute (NHGRI). The data set provides comprehensive, multi-dimensional maps of the key genomic changes in 33 types of cancer.

Table 11 lists the genomic regions in the following column format, starting from the left-most column: chromosome on which the target genomic region is located, start and stop position of the target genomic region, whether the target genomic region is hypermethylated or hypomethylated, and an annotation (if known) of any gene located within 10,000 bp of the targeted region of the genome. The chromosome numbers and the start and stop positions are provided relative to a known human reference genome, hg19. The sequence of the human reference genome, hg19, is available from Genome Reference Consortium with a reference number, GRCh37/hg19, and also available from Genome Browser provided by Santa Cruz Genomics Institute.

Generally, a probe is designed overlap with any of the CpG sites included within the start/stop ranges of the targeted regions (e.g., anomalous fragments) included in Table 11.

To identify genomic regions for use in the targeted panel from TCGA, 450K Illumina array TCGA data for BRCA (breast cancer), COAD (colon adenocarcinoma), LIHC (liver hepatocellular carcinoma), LUAD (lung adenocarcinoma), and LUSC (lung squamous cell carcinoma) was used. Since TCGA array data are at CpG site levels, they are prone to result in false positives. To avoid false positives, CpG sites were converted into 350 bp bins across the genome. Beta values of each bin was calculated as the mean of CpG beta values in that bin. The below table summarizes number of bins (bin count) having different ranges of mean CpG values (CpG/bin).

| CpG/bin | 1 | 2...5 | 6...10 | 11...16 | 16...20 | 20...25 |
|---|---|---|---|---|---|---|
| bin count | 220424 | 83644 | 6354 | 271 | 30 | 3 |

Bins with less than 2 CpGs were excluded from the analysis. Next, bins were selected with beta difference of >0.95 between normal and cancer tissues. For LIHC (Liver Hepatocellular Carcinoma) analysis 0.9 was used as the threshold. Those of skill in the art will appreciate that other thresholds for each of the parameters above may be used to select which CpG sites to target.

Total number of bins under analysis and the number of selected bins for each cancer type are summarized below. As indicated in the below table, more than 50% of the targeted genomic regions identified by this analysis overlap with the genomic regions selected using CCGA data set as provided in Example 3. However, 3459 CpG sites were in new genomic regions, which were not identified from the study using CCGA.

| Cancer Type | All bins count | Selected bins on low noise regions |
|---|---|---|
| BRCA | 2622 | 314 |
| COAD | 3282 | 779 |
| LIHC | 649 | 109 |
| LUAD | 3308 | 334 |
| LUSC | 2110 | 130 |
| Total size (Mbp) | 2.54 | 0.66 |
| Non_overlapping with CCGA targets | | 0.26 |

Additional liver specific markers were also added to the target genomic regions. To select these markers, 49 HCC (Hepatocellular Carcinoma) Tumor/Normal pairs were used from TCGA liver methylation dataset, by Illumina Infinium 450K array. A differential methylation analysis was performed on individual CpGs on the M value and hypermethylated CpGs with fold change >8 were selected. Only hypermethylated CpGs were selected in this version since they are more relevant in gene expression regulation. The clustered CpGs (defined by selected CpGs within 150 bp of another selected CpG) were combined into clusters, and expanded singletons into regions with a maximum length of 300 bp, provided all CpGs within the cluster or region are concordantly and significantly hypermethylated (mean fold change >4, minimum fold change >2).

Table 11 also includes some regions that have been reported in literature to be associated with different types of cancer. Other regions, such as SEPT9 and SHOX2, were also included in Table 11.

Table 11 also includes some target regions able to detect common driver mutations as well. To this end, regions studied in the Cohen et al, 2018 paper (Cohen et al., Detection and localization of surgically resectable cancers with a multi-analyte blood test, Science, 2018) are also included, as well as all protein variants in the oncoKB set.

Regarding the selection of viral sequences for inclusion in Table 11, for each cancer mentioned above, a model was fit with all possible combinations of viruses for diagnosis. Models within 10% of the top score were stored. All viruses that were present in any top model for any cancer were kept. This eliminated JCV-PLYCG and HPV8-ZM130, and kept HBV and HCV.

Five hundred sites were partitioned across the viral genomes. Sites were allocated to mirror the proportion of top models in which each virus was included. Within the genome of each virus, sites were distributed at intervals of not less than 250 bp. Sites were proposed with probability proportional to the CCGA data set read distribution. This distribution was chosen as a proxy for both uniqueness relative to human (specificity) and conservation across viral strains (sensitivity). Each proposed site was rejected if it was within 250 bp of an existing site, otherwise it was accepted. However, if the number of sites was sufficient to span the genome, sampling was uniform and any excess sites were allocated to other genomes. Reallocation of sites to other genomes was performed such that the final result was as close to the target allocation as possible.

Example 5: Performance of an Assay Panel for Diagnosis of Cancer

Performance of a panel described herein was evaluated by applying the binary rank score L2-regularized kernel logistic regression classifier, as described herein (see, e.g., FIG. 6A; see also PCT/US2019/022122 and U.S. Ser. No. 16/352, 602), to distinguish cancer sample from non-cancer samples utilizing three computationally distinct processes: (1) analysis of WGBS data ("Mscore.testV1"), (2) analysis of WGBS data with 10-fold cross-validation ("Mscore.testV1.cv"), and (3) analysis of WGBS data computationally filtered to limit classification to sequence reads of cfDNA molecules derived from the targeting genomic regions listed in Table 12 ("Mscore.testV1.cv.panel"). The sequence reads evaluated utilizing all three processes were obtained from the CCGA study described herein.

Figures 14A, 14B:
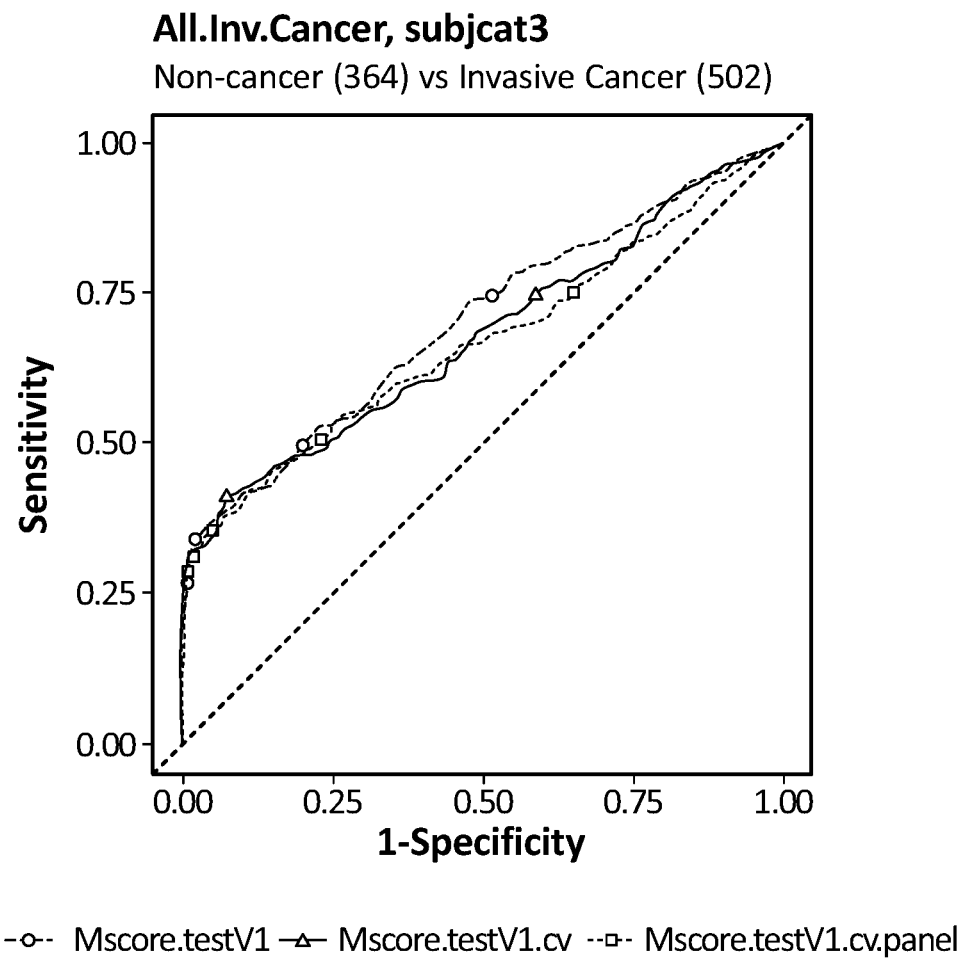
FIG. 14A shows sensitivity at 95% specificity of a cancer classifier applied to three different sources of data—Mscore.testV1, Mscore.testV1.cv, and Mscore.testV1.cv.panel.
FIG. 14B shows Receiver-Operator Characteristic (ROC) curves for performance analysis of the cancer classifier on the three different data sets.

Output scores were pooled and used to construct a Receiver operator characteristic (ROC) curve for performance analysis and to estimate sensitivity and specificity. Non-cancer samples were used to estimate specificity after correcting interfering signal. The relationship between sensitivity and specificity is depicted by receiver operator characteristic curves provided in FIG. 14B and sensitivity at 95% specificity for each data set is provided in FIG. 14A.

The data show high specificity of the classifier regardless of the computational approach used. The area under the curve (AUC) values and the sensitivity at 95% specificity were similar across the three computationally distinct processes. This result shows that the classifier is as effective in diagnosing cancer when analysis is restricted to targeted genomic regions, selected as described herein, as it is with unfiltered WGBS data. There was essentially no loss in performance when the analysis was restricted sequence reads of cfDNA molecules derived from targeted genomic regions listed in Table 12. By using targeted sequence reads obtained from use of the panel rather than entire nucleic acids sequencing, the panel-based method can increase sequencing depth of the target regions and lower costs compared to WGBS while providing similar degrees of sensitivity and specificity.

Example 6: Diagnosis of Cancer using Cancer Assay Panel

Blood samples are collected from a group of individuals previously diagnosed with cancer, and another group of individuals without cancer. cfDNAs are extracted from the blood samples and treated with bisulfite to convert unmethylated cytosines to uracils. The bisulfite treated samples are applied to the cancer assay panel designed as provided herein. Unbound cfDNAs are washed and cfDNAs bound to the probes are collected. The collected cfDNAs are amplified and sequenced. The sequencing data confirm that the probes specifically enrich cfDNAs having methylation patterns indicative of cancer and samples from the cancer group include significantly more of the differentially methylated cfDNAs compared to the non-cancer group.

Incorporation by Reference

All publications, patents, patent applications and other documents cited in this application are hereby incorporated by reference in their entireties for all purposes to the same extent as if each individual publication, patent, patent application or other document were individually indicated to be incorporated by reference for all purposes.

Equivalents

It is to be understood that the figures and descriptions of the present disclosure have been simplified to illustrate elements that are relevant for a clear understanding of the present disclosure, while eliminating, for the purpose of clarity, many other elements found in a typical system. Those of ordinary skill in the art may recognize that other elements and/or steps are desirable and/or required in implementing the present disclosure. However, because such elements and steps are well known in the art, and because they do not facilitate a better understanding of the present disclosure, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment, thereby providing a framework for various possibilities of described embodiments to function together.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

While various specific embodiments have been illustrated and described, the above specification is not restrictive. It will be appreciated that various changes can be made without departing from the spirit and scope of the description(s). Many variations will become apparent to those skilled in the art upon review of this specification.

LENGTHY TABLES

The patent contains a lengthy table section. A copy of the table is available in electronic form from the USPTO web site (https://seqdata.uspto.gov/?pageRequest=docDetail&DocID=US12435375B2). An electronic copy of the table will also be available from the USPTO upon request and payment of the fee set forth in 37 CFR 1.19(b)(3).

What is claimed is:

1. An assay panel for enriching nucleic acids, wherein the assay panel comprises at least 1,000 different polynucleotide probes;
   wherein each of the at least 1,000 different polynucleotide probes comprises a nucleic acid sequence that comprises:
      (1) a first sequence that is identical to the sequence of at least 45 contiguous nucleotides within a target genomic region,
      (2) a second sequence that varies with respect to the sequence of at least 45 contiguous nucleotides within the target genomic region by one or more transitions comprising one or more transitions that occur at a nucleotide corresponding to a CpG site in the target genomic region, or
      (3) a third sequence that varies with respect to the sequence of at least 45 contiguous nucleotides within the target genomic region by comprising an adenine in place of a guanine;
   wherein the at least 1,000 different polynucleotide probes comprise at least 500 different pairs of polynucleotide probes;
   wherein each pair of the at least 500 different pairs of polynucleotide probes comprises two different polynucleotide probes tiled with respect to the same target genomic region;
   wherein the two different polynucleotide probes of each pair of the at least 500 pairs of polynucleotide probes comprise (i) an identical overlapping sequence comprising 30 contiguous nucleotides of the first, second or third sequence, and (ii) a different non-overlapping sequence of 15 contiguous nucleotides of the first, second or third sequence; and
   wherein each of the at least 1,000 different polynucleotide probes is conjugated to an affinity moiety.

2. The assay panel of claim 1, wherein each of the at least 1,000 different polynucleotide probes comprises an adenine at each position corresponding to an unmethylated cytosine in a DNA molecule from the target genomic region.

3. The assay panel of claim 2, wherein each of the at least 1,000 different polynucleotide probes comprises:
   a) an adenine at each position corresponding to a cytosine of a CpG site of the DNA molecule from the target genomic region; or
   b) a guanine at each position corresponding to a cytosine of a CpG site of the DNA molecule from the target genomic region.

4. The assay panel of claim 1, wherein the target genomic region comprises at least five CpG dinucleotides and wherein at least 80% of the at least five CpG dinucleotides are either methylated or unmethylated in an individual with cancer.

5. The assay panel of claim 1, wherein at least 10% of the at least 1,000 different polynucleotide probes lack guanine (G).

6. The assay panel of claim 1, wherein the at least 1,000 different polynucleotide probes together comprise at least 200,000 nucleotides.

7. The assay panel of claim 1, wherein (a) the target genomic region is a region of a human genome; and (b) none of the at least 1,000 different polynucleotide probes comprises a contiguous 45 bases having at least 90% sequence complementarity to at least 20 off-target regions in a GRCh37/hg19 genome.

8. The assay panel of claim 1, wherein each of the at least 1,000 different polynucleotide probes comprises at least 75 nucleotides.

9. The assay panel of claim 1, further comprising a plurality of virus-specific probes,
   wherein each of the plurality of virus-specific probes comprises a sequence that (i) is complementary to a sequence of a viral genome or (ii) varies from a sequence complementary to a sequence of a viral genome by comprising an adenine at each position corresponding to an unmethylated cytosine in a nucleic acid fragment from the viral genome.

10. The assay panel of claim 9, wherein the viral genome is a MCV, EBV, HBV, HCMV, HCV, HHV5, HPV16, or HPV18 genome.

11. The assay panel of claim 1, wherein the target genomic region comprises at least 500 different target genomic regions.

12. The assay panel of claim 11, wherein the at least 500 different target genomic regions comprise at least 0.2 Mb.

13. The assay panel of claim 11, wherein the at least 500 different target genomic regions of a GRCh37/hg19 genome are selected from Table 11, Table 12, Table 13,

---

Lengthy table referenced here

US12435375-20251007-T00025

Please refer to the end of the specification for access instructions.

Lengthy table referenced here

US12435375-20251007-T00026

Please refer to the end of the specification for access instructions.

Lengthy table referenced here

US12435375-20251007-T00027

Please refer to the end of the specification for access instructions.

Lengthy table referenced here

US12435375-20251007-T00028

Please refer to the end of the specification for access instructions.

Lengthy table referenced here

US12435375-20251007-T00029

Please refer to the end of the specification for access instructions.

14. A composition comprising DNA that has been processed to convert unmethylated cytosine to uracil and the assay panel of claim 1.

15. The assay panel of claim 1, wherein the target genomic region comprises at least 50 target genomic regions of a GRCh37/hg19 genome selected from one or more of Tables 16-24 as follows:

TABLE 16

| chr | start | end | chr | start | end | chr | start | end |
|---|---|---|---|---|---|---|---|---|
| chr1 | 15251121 | 15251211 | chr1 | 15480854 | 15480892 | chr1 | 64240031 | 64240118 |
| chr1 | 64240618 | 64240673 | chr1 | 183774245 | 183774363 | chr1 | 202183372 | 202183401 |
| chr1 | 214724532 | 214724561 | chr1 | 232765226 | 232765301 | chr1 | 233750126 | 233750302 |
| chr2 | 14772762 | 14772823 | chr2 | 14774475 | 14774567 | chr2 | 46526303 | 46526331 |
| chr2 | 75427370 | 75427399 | chr2 | 101436638 | 101436708 | chr2 | 103236166 | 103236277 |
| chr2 | 151342979 | 151343218 | chr2 | 171571265 | 171571315 | chr2 | 171571890 | 171571997 |
| chr2 | 189157513 | 189157617 | chr2 | 235860803 | 235860808 | chr2 | 236402772 | 236402901 |
| chr2 | 236403271 | 236403419 | chr2 | 238395907 | 238395961 | chr3 | 37901952 | 37901953 |
| chr3 | 45187297 | 45187328 | chr3 | 126373521 | 126373619 | chr3 | 126373669 | 126373704 |
| chr3 | 133748141 | 133748206 | chr3 | 133748552 | 133748576 | chr3 | 153838819 | 153838870 |
| chr3 | 153839519 | 153839559 | chr3 | 153839641 | 153839775 | chr3 | 171527953 | 171527971 |
| chr4 | 24914639 | 24914668 | chr4 | 152246133 | 152246237 | chr4 | 170947288 | 170947325 |
| chr4 | 184019693 | 184019736 | chr4 | 184020107 | 184020179 | chr5 | 34656933 | 34657034 |
| chr5 | 72416247 | 72416262 | chr5 | 72733094 | 72733185 | chr5 | 107005984 | 107006186 |
| chr5 | 121413538 | 121413590 | chr6 | 1312001 | 1312095 | chr6 | 1312680 | 1312708 |
| chr6 | 1314089 | 1314101 | chr6 | 26987968 | 26988166 | chr6 | 42928322 | 42928454 |
| chr7 | 27275514 | 27275532 | chr7 | 28995658 | 28995978 | chr7 | 28996458 | 28996495 |
| chr7 | 32997125 | 32997454 | chr7 | 50860227 | 50860393 | chr7 | 50860980 | 50861103 |
| chr7 | 51384328 | 51384440 | chr7 | 51384916 | 51384951 | chr7 | 55086481 | 55086601 |
| chr7 | 55086984 | 55087533 | chr7 | 121945823 | 121945920 | chr7 | 155602752 | 155602805 |
| chr8 | 25041747 | 25041864 | chr8 | 95651539 | 95651599 | chr8 | 95651637 | 95651655 |
| chr8 | 102505798 | 102505934 | chr8 | 120220429 | 120220592 | chr9 | 14312995 | 14313096 |
| chr9 | 21559295 | 21559381 | chr9 | 21559678 | 21559702 | chr9 | 38620642 | 38620725 |
| chr9 | 110251389 | 110251418 | chr9 | 110252364 | 110252455 | chr9 | 134421818 | 134421835 |
| chr10 | 21462534 | 21462607 | chr10 | 30026077 | 30026090 | chr10 | 33624167 | 33624230 |
| chr10 | 33624493 | 33624550 | chr10 | 72973131 | 72973180 | chr10 | 116164249 | 116164341 |
| chr11 | 12132525 | 12132559 | chr11 | 12399041 | 12399145 | chr11 | 12399181 | 12399222 |
| chr11 | 12695482 | 12695496 | chr11 | 12695573 | 12695611 | chr11 | 12696612 | 12696746 |
| chr11 | 16628820 | 16628933 | chr11 | 33037468 | 33037556 | chr11 | 66790622 | 66790655 |
| chr11 | 120039834 | 120039865 | chr11 | 129245747 | 129245810 | chr11 | 130318961 | 130318997 |
| chr11 | 134201503 | 134201543 | chr11 | 134201842 | 134202084 | chr12 | 16500577 | 16500621 |
| chr12 | 56882365 | 56882380 | chr12 | 107486551 | 107486672 | chr12 | 107487195 | 107487855 |
| chr12 | 107712274 | 107712303 | chr13 | 100634315 | 100634382 | chr14 | 34420251 | 34420288 |
| chr14 | 61747389 | 61747528 | chr14 | 61747583 | 61747816 | chr14 | 61748002 | 61748033 |
| chr15 | 62456923 | 62456952 | chr15 | 71055770 | 71055815 | chr15 | 96874363 | 96874416 |
| chr15 | 98504115 | 98504144 | chr15 | 99193207 | 99193345 | chr15 | 99193350 | 99193465 |
| chr16 | 54964949 | 54965114 | chr16 | 68771167 | 68771298 | chr16 | 80966400 | 80966431 |
| chr16 | 84402245 | 84402319 | chr16 | 84853289 | 84853376 | chr17 | 42061337 | 42061381 |
| chr17 | 72427854 | 72427963 | chr17 | 72428345 | 72428381 | chr17 | 75207840 | 75207944 |
| chr17 | 80693343 | 80693554 | chr18 | 19750309 | 19750346 | chr18 | 21269350 | 21269390 |
| chr18 | 21269660 | 21269740 | chr18 | 78005004 | 78005051 | chr19 | 462182 | 462235 |
| chr19 | 33792412 | 33792524 | chr20 | 1206856 | 1207034 | chr20 | 6748926 | 6749036 |
| chr20 | 18039824 | 18039897 | chr20 | 22564236 | 22564265 | chr20 | 50384768 | 50384896 |
| chr21 | 38070706 | 38070765 | chr22 | 31198493 | 31198637 | | | |

TABLE 17

| chr | start | end | chr | start | end | chr | start | end |
|---|---|---|---|---|---|---|---|---|
| chr1 | 2336398 | 2336427 | chr1 | 2521025 | 2521062 | chr1 | 6507964 | 6508126 |
| chr1 | 21573736 | 21574203 | chr1 | 23885071 | 23885088 | chr1 | 155043332 | 155043657 |
| chr1 | 167823371 | 167823461 | chr1 | 185073819 | 185073966 | chr2 | 44497709 | 44497842 |
| chr2 | 61135116 | 61135137 | chr2 | 127863602 | 127863725 | chr3 | 12977068 | 12977144 |
| chr3 | 183728814 | 183728926 | chr5 | 43007937 | 43007966 | chr5 | 176764101 | 176764169 |
| chr6 | 41773521 | 41773844 | chr6 | 43748464 | 43748616 | chr7 | 907657 | 907709 |
| chr7 | 6188652 | 6188831 | chr7 | 6188926 | 6189061 | chr7 | 55410020 | 55410126 |
| chr7 | 127371130 | 127371234 | chr7 | 129800244 | 129800434 | chr7 | 131041516 | 131041596 |
| chr7 | 134918504 | 134918637 | chr8 | 61777576 | 61777622 | chr8 | 142367673 | 142367790 |
| chr8 | 144668567 | 144668667 | chr8 | 144668910 | 144668972 | chr9 | 34224349 | 34224474 |
| chr9 | 34372806 | 34372983 | chr9 | 129401098 | 129401195 | chr9 | 139888946 | 139888980 |
| chr10 | 6003403 | 6003625 | chr10 | 22047362 | 22047601 | chr11 | 232864 | 233062 |
| chr11 | 63641073 | 63641104 | chr12 | 110353415 | 110353451 | chr13 | 28239910 | 28240164 |
| chr14 | 102564465 | 102564502 | chr16 | 3802982 | 3803074 | chr16 | 85699690 | 85699921 |
| chr17 | 26961771 | 26961833 | chr17 | 42092191 | 42092220 | chr17 | 70026544 | 70026667 |
| chr18 | 74755509 | 74755577 | chr19 | 14181306 | 14181682 | chr19 | 33468019 | 33468055 |
| chr19 | 38782560 | 38782589 | chr19 | 40829794 | 40830032 | chr19 | 45570402 | 45570450 |
| chr19 | 45574774 | 45574782 | chr19 | 45574837 | 45574888 | chr20 | 6022813 | 6023045 |
| chr20 | 32301800 | 32301953 | chr20 | 60620233 | 60620412 | chr20 | 60772886 | 60773878 |
| chr21 | 37775035 | 37775141 | chr21 | 46935740 | 46935936 | chr22 | 21977315 | 21977347 |
| chr22 | 23801460 | 23801567 | chr22 | 24560376 | 24560522 | chr22 | 39830356 | 39830457 |
| chr22 | 41657234 | 41657350 | | | | | | |

TABLE 18

| chr | start | end | chr | start | end | chr | start | end |
|---|---|---|---|---|---|---|---|---|
| chr1 | 3659551 | 3659643 | chr1 | 3659672 | 3659716 | chr1 | 3663533 | 3663562 |
| chr1 | 12123244 | 12123276 | chr1 | 38511662 | 38511757 | chr2 | 12858453 | 12858499 |
| chr2 | 29338159 | 29338748 | chr2 | 29338810 | 29338969 | chr2 | 31360307 | 31360590 |
| chr2 | 31360631 | 31360693 | chr2 | 31360695 | 31360756 | chr2 | 31360804 | 31360831 |
| chr2 | 31456893 | 31457039 | chr2 | 100937837 | 100938164 | chr2 | 100938481 | 100938545 |
| chr2 | 100938575 | 100938799 | chr2 | 100938801 | 100938810 | chr2 | 100938985 | 100939155 |
| chr2 | 144694753 | 144695135 | chr2 | 172367022 | 172367125 | chr2 | 241542045 | 241542344 |
| chr3 | 142791152 | 142791173 | chr3 | 142839563 | 142839578 | chr3 | 142839580 | 142839607 |
| chr3 | 179168977 | 179169016 | chr4 | 718082 | 718112 | chr4 | 79689652 | 79689732 |
| chr4 | 156297417 | 156297556 | chr4 | 156297980 | 156298073 | chr5 | 38845676 | 38845705 |
| chr5 | 82769015 | 82769061 | chr5 | 111987788 | 111987818 | chr5 | 146257500 | 146257602 |
| chr6 | 73331516 | 73331851 | chr6 | 73331876 | 73332169 | chr6 | 73332392 | 73332674 |
| chr6 | 73332987 | 73333099 | chr6 | 127440332 | 127440510 | chr6 | 127440512 | 127440524 |
| chr6 | 151815056 | 151815089 | chr6 | 152957954 | 152957995 | chr6 | 163834315 | 163834383 |
| chr6 | 163834406 | 163834533 | chr6 | 163836569 | 163836900 | chr7 | 2728069 | 2728108 |
| chr7 | 28449277 | 28449291 | chr7 | 44364839 | 44364903 | chr7 | 69064591 | 69064772 |
| chr7 | 69064834 | 69064858 | chr7 | 76033251 | 76033289 | chr7 | 90226290 | 90226363 |
| chr7 | 106797775 | 106797804 | chr7 | 107483695 | 107483918 | chr7 | 134143808 | 134143908 |
| chr7 | 140027009 | 140027043 | chr7 | 149411542 | 149411728 | chr7 | 149411835 | 149412304 |
| chr7 | 150069099 | 150069346 | chr7 | 150070022 | 150070058 | chr8 | 53853998 | 53854027 |
| chr8 | 80803674 | 80803831 | chr8 | 97507150 | 97507246 | chr8 | 143533745 | 143533774 |
| chr9 | 37026964 | 37026993 | chr9 | 93698030 | 93698051 | chr9 | 140024843 | 140024919 |
| chr9 | 140024957 | 140025023 | chr10 | 3641379 | 3641396 | chr10 | 7450525 | 7450567 |
| chr10 | 7452350 | 7452550 | chr10 | 7453492 | 7453521 | chr10 | 49731643 | 49731749 |
| chr10 | 64578319 | 64578355 | chr10 | 101089410 | 101089439 | chr10 | 125851518 | 125851645 |
| chr10 | 125852300 | 125852498 | chr10 | 125852754 | 125853191 | chr10 | 133795401 | 133795430 |
| chr11 | 2040108 | 2040148 | chr11 | 3169689 | 3169835 | chr11 | 94275795 | 94275813 |
| chr11 | 94473683 | 94473769 | chr11 | 94473803 | 94473984 | chr11 | 94502453 | 94502489 |
| chr12 | 104850506 | 104850537 | chr12 | 104850578 | 104850592 | chr12 | 104851078 | 104851186 |
| chr13 | 26625302 | 26625502 | chr13 | 28366066 | 28366122 | chr13 | 36920350 | 36920379 |
| chr13 | 36920629 | 36920769 | chr13 | 73619661 | 73619698 | chr13 | 95364499 | 95364528 |
| chr13 | 95364771 | 95364800 | chr13 | 95620022 | 95620057 | chr13 | 110959797 | 110959860 |
| chr15 | 45670503 | 45670839 | chr15 | 48937059 | 48937095 | chr15 | 48937428 | 48937646 |
| chr15 | 48937710 | 48937987 | chr15 | 79383948 | 79383977 | chr15 | 83776497 | 83776596 |
| chr16 | 10276758 | 10276799 | chr16 | 10276801 | 10276841 | chr16 | 71715780 | 71715809 |
| chr17 | 32908287 | 32908371 | chr17 | 46125007 | 46125061 | chr17 | 47574091 | 47574149 |
| chr17 | 80535383 | 80535469 | chr19 | 3578139 | 3578223 | chr19 | 10823679 | 10823708 |
| chr19 | 50316245 | 50316330 | chr19 | 57862640 | 57862783 | chr20 | 4803922 | 4804008 |
| chr20 | 33547579 | 33547585 | chr20 | 36531800 | 36531910 | chr20 | 37434553 | 37434722 |
| chr20 | 37434737 | 37434744 | chr20 | 39317088 | 39317196 | chr21 | 27012374 | 27012431 |
| chr21 | 45508618 | 45508647 | chr22 | 39853522 | 39853590 | chr22 | 39853592 | 39853592 |

TABLE 19

| chr | start | end | chr | start | end | chr | start | end |
|---|---|---|---|---|---|---|---|---|
| chr1 | 3663875 | 3663921 | chr1 | 9712075 | 9712104 | chr1 | 11538796 | 11538821 |
| chr1 | 11539176 | 11539205 | chr1 | 11539411 | 11539440 | chr1 | 29450492 | 29450543 |
| chr1 | 38512386 | 38512415 | chr1 | 53068387 | 53068425 | chr1 | 91869989 | 91870018 |
| chr1 | 170633608 | 170633637 | chr1 | 202679216 | 202679327 | chr1 | 209381133 | 209381165 |
| chr1 | 230561780 | 230561824 | chr1 | 244014222 | 244014376 | chr2 | 31456683 | 31456712 |
| chr2 | 56410918 | 56410996 | chr2 | 56411692 | 56411733 | chr2 | 228029471 | 228029500 |
| chr3 | 37493520 | 37493621 | chr3 | 46924935 | 46924964 | chr3 | 49907094 | 49907130 |
| chr3 | 55519220 | 55519228 | chr3 | 98620892 | 98620980 | chr4 | 331323 | 331352 |
| chr4 | 57687721 | 57687782 | chr4 | 75858574 | 75858611 | chr4 | 87515338 | 87515367 |
| chr4 | 155665446 | 155665475 | chr5 | 129240069 | 129240101 | chr6 | 53212553 | 53213932 |
| chr6 | 71665639 | 71665723 | chr6 | 168719984 | 168720019 | chr7 | 409827 | 409872 |
| chr7 | 409887 | 409892 | chr7 | 54609992 | 54610006 | chr7 | 87104817 | 87105101 |
| chr7 | 87257964 | 87258054 | chr7 | 106685283 | 106685345 | chr7 | 113726510 | 113726539 |
| chr8 | 107282164 | 107282195 | chr8 | 110704002 | 110704029 | chr8 | 110704098 | 110704144 |
| chr9 | 21974208 | 21974237 | chr9 | 36037069 | 36037098 | chr9 | 112403365 | 112403394 |
| chr9 | 132805319 | 132805445 | chr9 | 132805750 | 132805893 | chr10 | 116853876 | 116853908 |
| chr10 | 134755905 | 134755934 | chr11 | 20618293 | 20618322 | chr11 | 20618527 | 20618556 |
| chr11 | 64410724 | 64410759 | chr11 | 107461624 | 107461653 | chr11 | 114113023 | 114113052 |
| chr12 | 8850659 | 8850744 | chr12 | 95267525 | 95267554 | chr12 | 133463737 | 133463876 |
| chr12 | 133758049 | 133758107 | chr13 | 46961495 | 46961533 | chr13 | 49794118 | 49794179 |
| chr13 | 78492724 | 78492748 | chr13 | 92050761 | 92050814 | chr14 | 51561766 | 51562012 |
| chr15 | 53082444 | 53082491 | chr15 | 65669860 | 65669899 | chr15 | 83378213 | 83378370 |
| chr15 | 91643361 | 91643586 | chr16 | 23313465 | 23313522 | chr16 | 23313780 | 23313836 |
| chr16 | 80838052 | 80838143 | chr17 | 14204213 | 14204242 | chr17 | 14204528 | 14204620 |
| chr17 | 40333045 | 40333226 | chr17 | 42907565 | 42907630 | chr17 | 48071021 | 48071050 |
| chr17 | 51901005 | 51901034 | chr17 | 56327272 | 56327301 | chr17 | 56833708 | 56833953 |
| chr19 | 10527166 | 10527243 | chr19 | 12163452 | 12163672 | chr19 | 12163894 | 12163923 |
| chr19 | 12175446 | 12175504 | chr19 | 12476501 | 12476556 | chr19 | 12606382 | 12606511 |
| chr19 | 23433144 | 23433223 | chr19 | 24216976 | 24217023 | chr19 | 33685545 | 33685581 |
| chr19 | 35264086 | 35264092 | chr19 | 37263533 | 37263584 | chr19 | 37341762 | 37341962 |
| chr19 | 37569394 | 37569554 | chr19 | 38085255 | 38085759 | chr19 | 38085958 | 38086066 |
| chr19 | 38146063 | 38146247 | chr19 | 38146458 | 38146568 | chr19 | 52097690 | 52097732 |
| chr19 | 53031202 | 53031215 | chr19 | 53193859 | 53193893 | chr19 | 58740087 | 58740118 |
| chr20 | 4230571 | 4230600 | chr20 | 20348527 | 20348605 | chr20 | 20349575 | 20349604 |
| chr20 | 39317751 | 39318138 | chr20 | 62680682 | 62680739 | chr21 | 33244922 | 33245040 |
| chr21 | 33245716 | 33245718 | chr21 | 33246038 | 33246190 | chr22 | 21368588 | 21368617 |
| chr22 | 24820331 | 24820396 | chr22 | 44208422 | 44208448 | | | |

TABLE 20

| chr | start | end | chr | start | end | chr | start | end |
|---|---|---|---|---|---|---|---|---|
| chr1 | 898655 | 898690 | chr1 | 1856437 | 1856466 | chr1 | 1910416 | 1910445 |
| chr1 | 2375149 | 2375355 | chr1 | 10166522 | 10166551 | chr1 | 32180398 | 32180427 |
| chr1 | 97185263 | 97185357 | chr1 | 177150774 | 177150803 | chr1 | 246488176 | 246488316 |
| chr3 | 154797384 | 154797416 | chr4 | 146853952 | 146853981 | chr4 | 185089697 | 185089797 |
| chr5 | 57878711 | 57878752 | chr5 | 87976104 | 87976308 | chr5 | 87976526 | 87976559 |
| chr5 | 174220972 | 174221001 | chr7 | 44097691 | 44097876 | chr8 | 67025064 | 67025365 |
| chr9 | 140709047 | 140709174 | chr9 | 140727472 | 140727511 | chr9 | 140727846 | 140727930 |
| chr10 | 524755 | 524770 | chr11 | 392577 | 392720 | chr11 | 1027541 | 1027574 |
| chr11 | 66454425 | 66454454 | chr11 | 94884131 | 94884160 | chr12 | 54399617 | 54399646 |
| chr13 | 114807745 | 114807815 | chr14 | 21100749 | 21100778 | chr14 | 21100802 | 21100831 |
| chr16 | 1397455 | 1397484 | chr16 | 2128578 | 2128682 | chr16 | 2129033 | 2129332 |
| chr16 | 88757467 | 88757496 | chr17 | 1536129 | 1536146 | chr17 | 7348886 | 7348997 |
| chr17 | 17062575 | 17062752 | chr17 | 17123964 | 17123993 | chr18 | 32557847 | 32557864 |
| chr18 | 74501145 | 74501183 | chr19 | 1308066 | 1308081 | chr19 | 1775077 | 1775239 |
| chr19 | 58144495 | 58144701 | chr21 | 39047777 | 39047838 | chr21 | 44283611 | 44283774 |
| chr22 | 36902292 | 36902381 | chr22 | 42096003 | 42096190 | chr22 | 47023045 | 47023191 |
| chr22 | 47054687 | 47054700 | chr22 | 50943094 | 50943262 | chrX | 3746613 | 3746642 |

TABLE 21

| chr | start | end | chr | start | end | chr | start | end |
|---|---|---|---|---|---|---|---|---|
| chr1 | 213123890 | 213123919 | chr2 | 1653023 | 1653230 | chr5 | 17512115 | 17512144 |
| chr6 | 26284812 | 26284898 | chr7 | 6543151 | 6543216 | chr7 | 64330412 | 64330470 |
| chr10 | 7213532 | 7213535 | chr10 | 7424627 | 7424687 | chr11 | 68409559 | 68409588 |
| chr12 | 105478324 | 105478359 | chr15 | 99456300 | 99456329 | chr16 | 47177526 | 47177606 |
| chr16 | 88942120 | 88942160 | chr17 | 29298081 | 29298184 | chr17 | 29298186 | 29298463 |

TABLE 21-continued

| chr | start | end | chr | start | end | chr | start | end |
|---|---|---|---|---|---|---|---|---|
| chr17 | 42402885 | 42402917 | chr17 | 62777336 | 62777450 | chr18 | 77309534 | 77309563 |
| chr22 | 40075158 | 40075302 | | | | | | |

TABLE 22

| chr | start | end | chr | start | end | chr | start | end |
|---|---|---|---|---|---|---|---|---|
| chr1 | 12251874 | 12251958 | chr1 | 29586244 | 29586563 | chr1 | 50891347 | 50891376 |
| chr1 | 78511638 | 78511718 | chr1 | 91180277 | 91180306 | chr1 | 156010529 | 156010548 |
| chr1 | 161471751 | 161471779 | chr1 | 180204063 | 180204092 | chr1 | 200012190 | 200012191 |
| chr1 | 223936996 | 223937014 | chr1 | 228645141 | 228645244 | chr1 | 228645306 | 228645536 |
| chr2 | 43451910 | 43452327 | chr2 | 55289095 | 55289274 | chr2 | 106060616 | 106060792 |
| chr2 | 111875279 | 111875518 | chr2 | 118981668 | 118981738 | chr2 | 162272990 | 162273057 |
| chr2 | 175192104 | 175192136 | chr2 | 175193269 | 175193324 | chr2 | 175200141 | 175200170 |
| chr2 | 177001532 | 177001561 | chr2 | 223158970 | 223158999 | chr2 | 223165435 | 223165503 |
| chr2 | 223169835 | 223169864 | chr2 | 223176152 | 223176181 | chr2 | 230795536 | 230795565 |
| chr2 | 236877263 | 236877367 | chr2 | 242523908 | 242523985 | chr3 | 50402318 | 50402944 |
| chr3 | 181442377 | 181442410 | chr3 | 184057527 | 184057557 | chr4 | 3446992 | 3447021 |
| chr4 | 41750224 | 41750262 | chr4 | 42398843 | 42398872 | chr4 | 83323507 | 83323677 |
| chr4 | 166414897 | 166414921 | chr5 | 6687381 | 6687431 | chr5 | 10333726 | 10333762 |
| chr5 | 43215539 | 43215562 | chr5 | 50264821 | 50264850 | chr6 | 10416119 | 10416148 |
| chr6 | 18035868 | 18036015 | chr6 | 26332179 | 26332218 | chr6 | 28303563 | 28303571 |
| chr6 | 28303847 | 28304263 | chr6 | 50691066 | 50691095 | chr6 | 126068093 | 126068158 |
| chr6 | 152623016 | 152623493 | chr6 | 154970559 | 154970587 | chr7 | 2238119 | 2238235 |
| chr7 | 5262472 | 5262562 | chr7 | 27136761 | 27136790 | chr7 | 27195483 | 27195492 |
| chr7 | 113722940 | 113722969 | chr7 | 156801417 | 156801446 | chr8 | 108509544 | 108509650 |
| chr8 | 128931157 | 128931261 | chr8 | 142292553 | 142292774 | chr9 | 21965102 | 21965372 |
| chr9 | 21965686 | 21965757 | chr9 | 96721121 | 96721275 | chr9 | 96722477 | 96722548 |
| chr9 | 126349070 | 126349104 | chr10 | 3678618 | 3678637 | chr10 | 71327726 | 71327755 |
| chr10 | 102986586 | 102986758 | chr10 | 118890981 | 118891010 | chr10 | 124910364 | 124910439 |
| chr10 | 131937393 | 131937428 | chr11 | 67781387 | 67781564 | chr12 | 28127931 | 28127997 |
| chr12 | 28128620 | 28129054 | chr12 | 64783186 | 64783308 | chr12 | 72332642 | 72332696 |
| chr12 | 117474066 | 117474125 | chr14 | 37124038 | 37124067 | chr14 | 55765286 | 55765686 |
| chr14 | 73318472 | 73318629 | chr14 | 91691167 | 91691306 | chr14 | 91766189 | 91766450 |
| chr14 | 102682120 | 102682149 | chr15 | 37402975 | 37403087 | chr15 | 37403116 | 37403127 |
| chr15 | 65862054 | 65862121 | chr15 | 68125459 | 68125496 | chr16 | 142650 | 142775 |
| chr16 | 667548 | 667561 | chr16 | 677973 | 677993 | chr16 | 1407819 | 1407846 |
| chr16 | 2281250 | 2281314 | chr16 | 30907011 | 30907049 | chr16 | 30907123 | 30907148 |
| chr16 | 79623805 | 79623854 | chr16 | 85517346 | 85517388 | chr17 | 27181284 | 27181371 |
| chr17 | 37757154 | 37757217 | chr17 | 46655149 | 46655178 | chr17 | 46675420 | 46675449 |
| chr17 | 46691988 | 46692022 | chr17 | 46801219 | 46801277 | chr17 | 59539492 | 59539601 |
| chr17 | 75733979 | 75734108 | chr18 | 31902794 | 31902944 | chr18 | 55850846 | 55850987 |
| chr18 | 77550281 | 77550367 | chr19 | 8576915 | 8577000 | chr19 | 10407091 | 10407120 |
| chr20 | 44452732 | 44453063 | chr22 | 18328128 | 18328268 | chr22 | 19706634 | 19706677 |
| chr22 | 22058204 | 22058238 | chr22 | 28838201 | 28838292 | chr22 | 29445753 | 29445923 |

TABLE 23

| chr | start | end | chr | start | end | chr | start | end |
|---|---|---|---|---|---|---|---|---|
| chr1 | 2331364 | 2331437 | chr1 | 90309344 | 90309490 | chr1 | 219347395 | 219347472 |
| chr1 | 234620965 | 234620979 | chr1 | 245494496 | 245494578 | chr2 | 47200592 | 47200621 |
| chr2 | 47249735 | 47249848 | chr2 | 178973004 | 178973042 | chr2 | 209225238 | 209225275 |
| chr2 | 220080582 | 220080941 | chr2 | 240319921 | 240320012 | chr3 | 193419703 | 193419732 |
| chr4 | 1008741 | 1008806 | chr4 | 1282516 | 1282545 | chr4 | 57777438 | 57777577 |
| chr6 | 43639549 | 43639710 | chr7 | 127615922 | 127615951 | chr7 | 138042222 | 138042288 |
| chr7 | 140180180 | 140180298 | chr8 | 59058942 | 59059233 | chr8 | 141596887 | 141597022 |
| chr8 | 143558473 | 143558604 | chr8 | 144203654 | 144203708 | chr8 | 144303563 | 144303592 |
| chr10 | 135018033 | 135018070 | chr11 | 66658258 | 66658290 | chr11 | 120998702 | 120998825 |
| chr14 | 105512064 | 105512395 | chr16 | 4431127 | 4431189 | chr17 | 7368948 | 7369139 |
| chr17 | 77084519 | 77084667 | chr19 | 56201644 | 56201812 | chr22 | 46931261 | 46931332 |

TABLE 24

| chr | start | end | chr | start | end | chr | start | end |
|---|---|---|---|---|---|---|---|---|
| chr1 | 2472175 | 2472301 | chr1 | 6186512 | 6186546 | chr1 | 16475032 | 16475207 |
| chr1 | 17445858 | 17445943 | chr1 | 53705675 | 53705701 | chr1 | 62793238 | 62793267 |
| chr1 | 91182806 | 91182835 | chr1 | 98515143 | 98515191 | chr1 | 98519024 | 98519056 |
| chr1 | 115631868 | 115631915 | chr1 | 115880364 | 115880395 | chr1 | 156815693 | 156815745 |
| chr1 | 182584084 | 182584340 | chr1 | 182584404 | 182584613 | chr1 | 217307385 | 217307437 |
| chr1 | 240256664 | 240256780 | chr2 | 5833900 | 5833932 | chr2 | 7164468 | 7164704 |
| chr2 | 7571718 | 7571747 | chr2 | 18059782 | 18059841 | chr2 | 47193958 | 47193960 |
| chr2 | 99439478 | 99439507 | chr2 | 131594990 | 131595019 | chr2 | 145282120 | 145282149 |
| chr2 | 171822429 | 171822480 | chr3 | 5137961 | 5138019 | chr3 | 13679285 | 13679319 |
| chr3 | 38030619 | 38030782 | chr3 | 140770070 | 140770099 | chr3 | 152877667 | 152877696 |
| chr3 | 184319829 | 184319843 | chr3 | 184319874 | 184319891 | chr3 | 195601240 | 195601312 |
| chr3 | 195602364 | 195602435 | chr4 | 1093537 | 1093558 | chr4 | 1331676 | 1331705 |
| chr4 | 5892136 | 5892194 | chr4 | 7758477 | 7758561 | chr4 | 42154663 | 42154697 |
| chr4 | 57803529 | 57803558 | chr4 | 113431916 | 113431930 | chr4 | 183064875 | 183064966 |
| chr4 | 184921856 | 184921885 | chr5 | 1930991 | 1931005 | chr5 | 2753049 | 2753078 |
| chr5 | 3595850 | 3595876 | chr5 | 17218196 | 17218225 | chr5 | 76940341 | 76940374 |
| chr5 | 138273818 | 138273845 | chr6 | 711143 | 711293 | chr6 | 26199138 | 26199167 |
| chr6 | 26199687 | 26199716 | chr6 | 52344376 | 52344405 | chr6 | 72596273 | 72596315 |
| chr7 | 1970843 | 1970872 | chr7 | 20826885 | 20826939 | chr7 | 45614930 | 45615020 |
| chr7 | 100808467 | 100808502 | chr8 | 41166306 | 41166374 | chr9 | 77113806 | 77113825 |
| chr9 | 135456477 | 135456544 | chr9 | 140033002 | 140033050 | chr10 | 73157868 | 73158027 |
| chr10 | 85954426 | 85954457 | chr10 | 128994871 | 128994903 | chr10 | 130338728 | 130338761 |
| chr10 | 133849599 | 133849628 | chr11 | 27744451 | 27744480 | chr11 | 131564971 | 131565073 |
| chr12 | 4274272 | 4274409 | chr12 | 4379358 | 4379491 | chr12 | 4382007 | 4382162 |
| chr12 | 5541101 | 5541177 | chr12 | 79257223 | 79257351 | chr12 | 94544023 | 94544052 |
| chr12 | 101025381 | 101025410 | chr12 | 103889161 | 103889211 | chr12 | 127940087 | 127940189 |
| chr13 | 32605035 | 32605212 | chr13 | 32605443 | 32605596 | chr13 | 32605675 | 32605966 |
| chr14 | 32597621 | 32597657 | chr14 | 69014045 | 69014110 | chr14 | 92979918 | 92979991 |
| chr14 | 105714416 | 105714442 | chr14 | 105715248 | 105715393 | chr15 | 68128595 | 68128597 |
| chr15 | 74818773 | 74818789 | chr15 | 89943411 | 89943440 | chr16 | 12996949 | 12997011 |
| chr16 | 89007521 | 89007558 | chr16 | 89008563 | 89008592 | chr18 | 3215043 | 3215256 |
| chr18 | 57364659 | 57364691 | chr18 | 75362932 | 75362985 | chr19 | 869338 | 869363 |
| chr19 | 1764294 | 1764339 | chr19 | 1776505 | 1776534 | chr19 | 4054436 | 4054463 |
| chr19 | 5292813 | 5292844 | chr19 | 12996170 | 12996280 | chr19 | 41018717 | 41018746 |
| chr19 | 42028503 | 42028549 | chr19 | 51228050 | 51228079 | chr19 | 52552105 | 52552120 |
| chr20 | 52311464 | 52311505 | chr20 | 59804233 | 59804235 | chr20 | 62321824 | 62321881 |
| chr22 | 22006004 | 22006243 | chr22 | 41634394 | 41634423. | | | |

16. The assay panel of claim 11, wherein at least 30% of the at least 500 different target genomic regions are in exons or introns.

17. The composition of claim 14, where the DNA is cell-free DNA.

18. The assay panel of claim 1, wherein the affinity moiety is not a nucleic acid affinity moiety.

19. The assay panel of claim 1, wherein the affinity moiety is a biotin moiety.

20. The assay panel of claim 1, wherein at least 80% of the at least 1,000 different polynucleotide probes comprise a nucleic acid sequence that varies with respect to the sequence of 45 contiguous nucleotides within the target genomic region by comprising exclusively CpA at sites of CpG.

21. The assay panel of claim 1, wherein each of the at least 1,000 different polynucleotide probes is identical in sequence to the sequence of 45 contiguous nucleotides within the target genomic region.

22. The assay panel of claim 1, wherein each of the at least 1,000 different polynucleotide probes comprises a nucleic acid sequence that varies with respect to the sequence of 45 contiguous nucleotides within the target genomic region by one or more transitions comprising one or more transitions that occur at a nucleotide corresponding to a CpG site in the target genomic region.

23. The assay panel of claim 1, wherein each of the at least 1,000 different polynucleotide probes comprises a nucleic acid sequence that varies with respect to the sequence of 45 contiguous nucleotide within the target genomic region by comprising an adenine in place of a guanine.

24. The assay panel of claim 1, wherein the overlapping and non-overlapping sequences together are at least 75 nucleotides in length.

25. The assay panel of claim 1, wherein the non-overlapping sequences are at least 50 nucleotides in length.

26. The assay panel of claim 1, wherein each of the at least 1,000 different polynucleotide probes is less than 300 nucleotides in length.

* * * * *